(12) United States Patent
Joyce et al.

(10) Patent No.: US 9,098,958 B2
(45) Date of Patent: *Aug. 4, 2015

(54) CONVERGENT COMMUNICATIONS PLATFORM AND METHOD FOR MOBILE AND ELECTRONIC COMMERCE IN A HETEROGENEOUS NETWORK ENVIRONMENT

(75) Inventors: Simon James Joyce, Bangkok (TH); Prafulla C. Gupta, Pagosa Springs, CO (US); Ashok Kumar Reddy Eanuga, Budd Lake, NJ (US); Manohar Sitaram Vaidya, Hyderabad (IN); Kalyan Chakravarthy Kasturi, Hyderabad (IN); Richa Gupta, Hyderabad (IN); Suresh Kumar Munnangi, Hyderabad (IN); Varma Laxmi Jagannadha Siva Kumar Jampana, Hyderabad (IN); Prasad Naganjaneya Vara Undavalli, Hyderabad (IN); Kondal Rao Nallajerla, Secunderabad (IN); Krishna Mohan Sistla, Hyderabad (IN); Amba Prasad Gudipati, Hyderabad (IN); Bhanu Murthy Nallagonda, Secunderabad (IN); Surya Sekhar Lakshmi Velpuri, Hyderabad (IN); Veerabhadra Rao Kalluri, Hyderabad (IN); Radhakrishnan Subhashree, Hyderabad (IN); Sundaram Mohan Kumar, Hyderabad (IN); Muralidhar Goparaju, Hyderabad (IN); Raju Wadalkar, Mumbel (IN); Fernando Manoel Alves Santos, Jr., São Paulo (BR); Narendra Kumar Velagala, Secunderabad (IN); Anil Kumar Reddy Nakkala, Hyderabad (IN); Anjayya Chowdary Tummala, Secunderabad (IN); Krishna Mohan Venkata Kompella, Hyderabad (IN); Ravi Kiran Machiraju, Hyderabad (IN); Srinivas Seetamsetty, Hyderabad (IN); Gopal Vooradi, Secunderabad (IN); Sesh Kumar Venkata Hara Naga Burugula, Hyderabad (IN); Ranganatham Veluru, Hyderabad (IN)

(73) Assignee: U-PAID SYSTEMS, LTD., Paris (FR)

( * ) Notice: Subject to any disclaimer, the term of this patent is extended or adjusted under 35 U.S.C. 154(b) by 1235 days.

This patent is subject to a terminal disclaimer.

(21) Appl. No.: 09/894,890

(22) Filed: Jun. 29, 2001

(65) Prior Publication Data

US 2002/0052754 A1     May 2, 2002

Related U.S. Application Data

(63) Continuation-in-part of application No. 09/395,868, filed on Sep. 14, 1999, now Pat. No. 6,320,947.

(60) Provisional application No. 60/100,440, filed on Sep. 15, 1998, provisional application No. 60/100,470, filed on Sep. 15, 1998.

(51) Int. Cl.
| | |
|---|---|
| *H04M 3/42* | (2006.01) |
| *G07F 7/08* | (2006.01) |
| *G06Q 20/00* | (2012.01) |
| *G06Q 20/32* | (2012.01) |
| *G06Q 20/36* | (2012.01) |
| *G06Q 20/40* | (2012.01) |
| *G06Q 30/02* | (2012.01) |
| *H04M 15/00* | (2006.01) |
| *H04M 17/00* | (2006.01) |
| *H04Q 3/00* | (2006.01) |
| *H04W 12/12* | (2009.01) |

(52) U.S. Cl.
CPC .............. *G07F 7/0866* (2013.01); *G06Q 20/00* (2013.01); *G06Q 20/32* (2013.01); *G06Q 20/322* (2013.01); *G06Q 20/363* (2013.01); *G06Q 20/403* (2013.01); *G06Q 30/0283* (2013.01); *H04M 15/00* (2013.01); *H04M 15/68* (2013.01); *H04M 15/8038* (2013.01); *H04M 15/854* (2013.01); *H04M 17/00*

(2013.01); *H04Q 3/0029* (2013.01); *H04M 2215/0196* (2013.01); *H04M 2215/32* (2013.01); *H04M 2215/34* (2013.01); *H04M 2215/7442* (2013.01); *H04M 2215/8166* (2013.01); *H04Q 2213/13003* (2013.01); *H04Q 2213/1305* (2013.01); *H04Q 2213/1313* (2013.01); *H04Q 2213/1315* (2013.01); *H04Q 2213/1322* (2013.01); *H04Q 2213/1324* (2013.01); *H04Q 2213/1332* (2013.01); *H04Q 2213/1334* (2013.01); *H04Q 2213/13093* (2013.01); *H04Q 2213/13095* (2013.01); *H04Q 2213/13098* (2013.01); *H04Q 2213/13103* (2013.01); *H04Q 2213/13106* (2013.01); *H04Q 2213/13109* (2013.01); *H04Q 2213/13134* (2013.01); *H04Q 2213/13152* (2013.01); *H04Q 2213/13176* (2013.01); *H04Q 2213/13204* (2013.01); *H04Q 2213/13274* (2013.01); *H04Q 2213/13282* (2013.01); *H04Q 2213/13331* (2013.01); *H04Q 2213/13345* (2013.01); *H04Q 2213/13349* (2013.01); *H04Q 2213/13372* (2013.01); *H04Q 2213/13377* (2013.01); *H04Q 2213/13389* (2013.01); *H04Q 2213/13405* (2013.01); *H04W 12/12* (2013.01)

(58) Field of Classification Search
CPC ... H04W 4/24; H04W 8/183; H04L 29/08108
USPC ........ 455/414.1, 414.2, 414.3, 406, 407, 408, 455/432.1, 432.3, 456.3, 456.1, 433.1, 417, 455/414; 705/53, 400; 379/144, 114.15
See application file for complete search history.

(56) References Cited

U.S. PATENT DOCUMENTS

| | | |
|---|---|---|
| 4,087,630 A | 5/1978 | Browning et al. |
| 4,439,636 A | 3/1984 | Newkirk et al. |
| 4,807,275 A | 2/1989 | Enstrom |
| 4,825,130 A | 4/1989 | Enstrom |
| 4,975,942 A | 12/1990 | Zebryk |
| 5,003,584 A | 3/1991 | Benyacar et al. |
| 5,086,457 A | 2/1992 | Barraud et al. |
| 5,148,474 A | 9/1992 | Haralambopoulos et al. |
| 5,206,899 A | 4/1993 | Gupta et al. |
| 5,222,120 A | 6/1993 | McLeod et al. |
| 5,265,033 A | 11/1993 | Vajk et al. |
| 5,276,444 A | 1/1994 | McNair |
| 5,301,223 A | 4/1994 | Amadon et al. |
| 5,317,628 A | 5/1994 | Misholi et al. |
| 5,321,735 A | 6/1994 | Breeden et al. |
| 5,349,636 A | 9/1994 | Irribarren |
| 5,353,335 A | 10/1994 | D'Urso et al. |
| 5,359,642 A | 10/1994 | Castro |
| 5,440,621 A | 8/1995 | Castro |
| 5,450,477 A | 9/1995 | Amarant et al. |
| 5,469,497 A | 11/1995 | Pierce et al. |
| 5,511,114 A | 4/1996 | Stimson et al. |
| 5,519,769 A | 5/1996 | Weinberger et al. |
| 5,524,142 A | 6/1996 | Lewis et al. |
| 5,537,464 A | 7/1996 | Lewis et al. |
| 5,557,516 A | 9/1996 | Hogan |
| 5,557,539 A | 9/1996 | Fitch |
| 5,572,005 A | 11/1996 | Hamilton et al. |
| 5,577,100 A | 11/1996 | McGregor et al. |
| 5,577,109 A | 11/1996 | Stimson et al. |
| 5,586,173 A | 12/1996 | Misholi et al. |
| 5,586,175 A | 12/1996 | Hogan et al. |
| 5,590,181 A | 12/1996 | Hogan et al. |
| 5,608,778 A | 3/1997 | Partridge, III |
| 5,615,251 A | 3/1997 | Hogan et al. |
| 5,621,787 A | 4/1997 | McKoy et al. |
| 5,633,909 A | 5/1997 | Fitch |
| 5,633,919 A | 5/1997 | Hogan et al. |
| 5,634,084 A | 5/1997 | Malsheen et al. |
| 5,638,430 A | 6/1997 | Hogan et al. |
| 5,661,781 A | 8/1997 | DeJager |
| 5,668,855 A | 9/1997 | Misholi et al. |
| 5,671,280 A | 9/1997 | Rosen |
| 5,677,955 A | 10/1997 | Doggett et al. |
| 5,692,037 A | 11/1997 | Friend |
| 5,692,132 A | 11/1997 | Hogan |
| 5,694,464 A | 12/1997 | Mashinsky |
| 5,699,528 A | 12/1997 | Hogan |
| 5,704,046 A | 12/1997 | Hogan |
| 5,712,908 A | 1/1998 | Brinkman et al. |
| 5,717,604 A | 2/1998 | Wiggins |
| 5,719,926 A | 2/1998 | Hill |
| 5,721,768 A | 2/1998 | Stimson et al. |
| 5,722,067 A | 2/1998 | Fougnies et al. |
| 5,737,395 A | 4/1998 | Irribarren |
| 5,737,414 A | 4/1998 | Walker et al. |
| 5,745,556 A | 4/1998 | Ronen |
| 5,749,075 A | 5/1998 | Toader et al. |
| 5,778,313 A | 7/1998 | Fougnies |
| 5,784,442 A | 7/1998 | Foti |
| 5,787,403 A | 7/1998 | Randle |
| 5,793,762 A | 8/1998 | Penners et al. |
| 5,825,863 A | 10/1998 | Walker |
| 5,826,185 A | 10/1998 | Wise et al. |
| 5,828,740 A | 10/1998 | Khuc et al. |
| 5,841,966 A | 11/1998 | Irribarren |
| 5,852,812 A | 12/1998 | Reeder |
| 5,854,975 A | 12/1998 | Fougnies et al. |
| 5,857,152 A * | 1/1999 | Everett .......................... 455/406 |
| 5,864,610 A | 1/1999 | Ronen |
| 5,867,566 A | 2/1999 | Hogan et al. |
| 5,870,473 A | 2/1999 | Boesch et al. |
| 5,878,215 A | 3/1999 | Kling et al. |
| 5,893,076 A | 4/1999 | Hafner et al. |
| 5,897,621 A | 4/1999 | Boesch et al. |
| 5,899,982 A | 5/1999 | Randle |
| 5,909,483 A | 6/1999 | Weare et al. |
| 5,909,486 A | 6/1999 | Walker et al. |
| 5,915,007 A | 6/1999 | Klapka |
| 5,915,093 A | 6/1999 | Berlin et al. |
| 5,915,226 A | 6/1999 | Martineau |
| 5,919,266 A | 7/1999 | Sud et al. |
| 5,920,562 A | 7/1999 | Christie et al. |
| 5,923,734 A | 7/1999 | Taskett |
| 5,930,767 A | 7/1999 | Reber et al. |
| 5,943,320 A | 8/1999 | Weik et al. |
| 5,943,406 A | 8/1999 | Leta et al. |
| 5,953,398 A * | 9/1999 | Hill .......................... 379/121.04 |
| 5,956,391 A | 9/1999 | Melen et al. |
| 5,959,485 A | 9/1999 | Roohparvar |
| 5,960,069 A | 9/1999 | Felger |
| 5,960,416 A | 9/1999 | Block |
| 5,966,429 A | 10/1999 | Scherer |
| 5,974,146 A | 10/1999 | Randle et al. |
| 5,978,678 A * | 11/1999 | Houde et al. ................. 455/433 |
| 5,978,775 A | 11/1999 | Chen |
| 5,991,748 A | 11/1999 | Taskett |
| 6,006,257 A | 12/1999 | Slezak |
| 6,009,469 A | 12/1999 | Mattaway et al. |
| 6,014,636 A | 1/2000 | Reeder |
| 6,023,499 A | 2/2000 | Mansey et al. |
| 6,035,025 A | 3/2000 | Hanson |
| 6,035,281 A | 3/2000 | Crosskey et al. |
| 6,036,086 A | 3/2000 | Sizer, II et al. |
| 6,047,267 A | 4/2000 | Owens et al. |
| 6,047,284 A | 4/2000 | Owens et al. |
| 6,058,173 A | 5/2000 | Penfield et al. |
| 6,058,300 A * | 5/2000 | Hanson .......................... 455/406 |
| 6,061,664 A | 5/2000 | Pieterse et al. |
| 6,070,067 A * | 5/2000 | Nguyen et al. ................. 455/407 |
| 6,070,185 A | 5/2000 | Anupam et al. |
| 6,081,791 A | 6/2000 | Clark |
| 6,091,944 A | 7/2000 | Friend |
| 6,092,053 A | 7/2000 | Boesch et al. |
| 6,092,055 A | 7/2000 | Owens et al. |
| 6,097,939 A | 8/2000 | Jacobs |
| 6,104,704 A | 8/2000 | Buhler et al. |
| 6,115,458 A | 9/2000 | Taskett |

| | | | |
|---|---|---|---|
| 6,115,714 A | 9/2000 | Gallagher et al. | |
| 6,119,109 A | 9/2000 | Muratani et al. | |
| 6,122,632 A | 9/2000 | Botts et al. | |
| 6,137,870 A | 10/2000 | Scherer | |
| 6,157,823 A | 12/2000 | Fougnies et al. | |
| 6,173,174 B1 | 1/2001 | Jacobs | |
| 6,185,198 B1 | 2/2001 | LaDue | |
| 6,185,414 B1 | 2/2001 | Brunner et al. | |
| 6,188,751 B1 | 2/2001 | Scherer | |
| 6,188,752 B1 * | 2/2001 | Lesley | |
| 6,195,542 B1 * | 2/2001 | Griffith | 455/406 |
| 6,205,207 B1 | 3/2001 | Scherer | |
| 6,205,433 B1 | 3/2001 | Boesch et al. | |
| 6,208,719 B1 | 3/2001 | Lo et al. | |
| 6,213,390 B1 | 4/2001 | Oneda | |
| 6,226,364 B1 | 5/2001 | O'Neil | |
| 6,236,851 B1 | 5/2001 | Fougnies et al. | |
| 6,246,755 B1 | 6/2001 | Walker et al. | |
| 6,320,947 B1 * | 11/2001 | Joyce et al. | 379/114.2 |
| 6,356,752 B1 | 3/2002 | Griffith | |
| 6,377,938 B1 | 4/2002 | Block et al. | |
| 6,434,378 B1 | 8/2002 | Fougnies | |
| 6,434,379 B1 | 8/2002 | Despres et al. | |
| 6,453,306 B1 | 9/2002 | Quelene | |
| 6,480,710 B1 | 11/2002 | Laybourn et al. | |
| 6,496,690 B1 | 12/2002 | Cobo et al. | |
| 6,535,593 B1 | 3/2003 | Cashiola | |
| 6,633,630 B1 | 10/2003 | Owens et al. | |
| 6,684,072 B1 * | 1/2004 | Anvekar et al. | 455/432.1 |
| 6,694,300 B1 | 2/2004 | Walker et al. | |
| 6,760,417 B1 | 7/2004 | Wallenius | |
| 7,437,331 B1 | 10/2008 | Rosenberger | |
| 2002/0065774 A1 | 5/2002 | Young et al. | |
| 2002/0156729 A1 | 10/2002 | Nilson | |
| 2003/0014367 A1 | 1/2003 | Tubinis | |
| 2003/0031160 A1 | 2/2003 | Gibson Ang et al. | |
| 2003/0119478 A1 | 6/2003 | Nagy et al. | |

FOREIGN PATENT DOCUMENTS

| | | |
|---|---|---|
| DE | 43 12 362 A1 | 10/1994 |
| DE | 199 38 201 A1 | 2/2001 |
| DE | 19938201 A1 | 2/2001 |
| EP | 0 258 654 A1 | 3/1988 |
| EP | 0 587 259 A2 | 3/1994 |
| EP | 0 698 987 A2 | 2/1996 |
| EP | 0 921 487 A2 | 6/1999 |
| EP | 1 107 198 A2 | 6/2001 |
| EP | 1107198 A2 | 6/2001 |
| EP | 1107198 A3 | 7/2002 |
| GB | 2 171 877 A | 9/1986 |
| HU | 218 134 B | 6/2000 |
| HU | 218 405 B | 8/2000 |
| HU | 220 728 B1 | 5/2002 |
| HU | 0220734 | 5/2002 |
| JP | 60-174547 | 9/1985 |
| JP | 61-210754 | 9/1986 |
| JP | 61-245664 | 10/1986 |
| JP | 2-123862 A1 | 5/1990 |
| JP | 2-131650 | 5/1990 |
| JP | 02-241171 | 9/1990 |
| JP | 3-250297 | 11/1991 |
| JP | 04-257092 | 9/1992 |
| JP | 05-28457 | 10/1993 |
| JP | 5-284221 A1 | 10/1993 |
| JP | 6-121075 | 4/1994 |
| JP | 07-15564 | 1/1995 |
| JP | 7-93428 | 4/1995 |
| JP | 7-250165 A1 | 9/1995 |
| JP | 07-327094 | 12/1995 |
| JP | 8-102789 A1 | 4/1996 |
| JP | 09-214640 | 8/1997 |
| JP | 09-245104 | 9/1997 |
| JP | 09-259085 | 10/1997 |
| JP | 9-259193 | 10/1997 |
| JP | 9-297789 | 11/1997 |
| JP | 9-305441 | 11/1997 |
| JP | 9-312708 | 12/1997 |
| JP | 10-27196 | 1/1998 |
| JP | 10-269290 | 10/1998 |
| JP | 11-68964 | 3/1999 |
| JP | 11-338924 A1 | 12/1999 |
| JP | 2000-148861 | 5/2000 |
| JP | 2000-250988 A1 | 9/2000 |
| JP | 2000-513170 | 10/2000 |
| JP | 2000-331095 | 11/2000 |
| JP | 2000-332750 | 11/2000 |
| JP | 2001-22271 | 1/2001 |
| JP | 2001-504299 | 3/2001 |
| JP | 2003-90868 | 3/2003 |
| JP | 2003-162575 | 6/2003 |
| JP | 5-284257 | 10/2003 |
| JP | 2005-345269 | 12/2005 |
| KR | 2000-0012298 | 3/2000 |
| KR | 2000-0067216 | 11/2000 |
| KR | 2001-0006431 | 1/2001 |
| KR | 2000-0050374 | 5/2002 |
| WO | 96/15633 | 5/1996 |
| WO | WO 96/15616 | 5/1996 |
| WO | WO96/15616 | 5/1996 |
| WO | WO9634483 | 10/1996 |
| WO | 96/38801 | 12/1996 |
| WO | WO9714124 | 4/1997 |
| WO | WO97/22191 | 6/1997 |
| WO | WO 97/22191 | 6/1997 |
| WO | WO 97/33416 | 9/1997 |
| WO | WO9741530 | 11/1997 |
| WO | WO97/48078 | 12/1997 |
| WO | WO 97/48078 | 12/1997 |
| WO | WO98/18251 | 4/1998 |
| WO | WO 98/18251 | 4/1998 |
| WO | WO 98/21874 | 5/1998 |
| WO | WO98/21874 | 5/1998 |
| WO | 98/30013 | 7/1998 |
| WO | 98/47112 | 10/1998 |
| WO | 98/47116 | 10/1998 |
| WO | WO 98/52131 | 11/1998 |
| WO | WO98/52131 | 11/1998 |
| WO | 99/18713 | 4/1999 |
| WO | 99/44165 | 9/1999 |
| WO | 00/16568 | 3/2000 |
| WO | WO 00/32004 | 6/2000 |
| WO | 00/56085 | 9/2000 |
| WO | WO 00/58948 | 10/2000 |
| WO | 00/69201 | 11/2000 |
| WO | WO 01/03090 | 1/2001 |
| WO | 01/11857 A1 | 2/2001 |
| WO | 01/13341 A1 | 2/2001 |
| WO | 01/41419 A1 | 6/2001 |
| WO | 01/43390 A2 | 6/2001 |
| WO | 01/43390 A3 | 6/2001 |
| WO | 01/59648 A1 | 8/2001 |
| WO | 02/063528 A1 | 8/2002 |
| WO | 03/010951 | 2/2003 |

OTHER PUBLICATIONS

U.S. Appl. No. 09/851,382, filed May 9, 2001, Simon James Joyce et al., Upaid Systems, Ltd.
U.S. Appl. No. 09/395,868, filed Sep. 14, 1999, Simon James Joyce et al., Upaid Systems, Ltd.
[Unassigned]*, filed Mar. 14, 2002, Simon James Joyce et al., Upaid Systems, Ltd.
English translation of Notice of Grounds for Rejection mailed Sep. 6, 2002 from the Japanese Patent Office for Japanese Patent Application 2000-570981.
U.S. Appl. No. 10/684,396, filed Oct. 15, 2003, Simon James Joyce et al, Upaid Systems.
U.S. Appl. No. 09/851,382, filed May 9, 2001, Joyce, et al., Upaid Systems, Ltd.
U.S. Appl. No. 09/395,868, filed Sep. 14, 1999, Joyce, et al. Upaid Systems, Ltd.
U.S. Appl. No. 10/114,047, filed Apr. 3, 2002, Joyce, et al., Upaid Systems, Ltd.
U.S. Appl. No. 10/096,912, filed Mar. 14, 2002, Joyce, et al., Upaid Systems, Ltd.

Search Report for Hungarian Patent Application P0400342 mailed Jun. 22, 2004.
"CompuServe Puts Info in the Phone";Silicon Times Reports, No. 1144, Nov. 1995; printed from www.atariarchives.org/cfm/08/09/03.0495.php on May 12, 2010, 2 pp.
T. Brock, "CompuServe, Premier meld e-mail and voice mail", Business First;Aug. 1996; printed from louisville.bizjournals.com/louisville/stores/1996/08/260smailb3.html;2 pp.
"Compuserve markets new hitech CallingAll Calling Card"; Discount Long Distance Digest; No. 62; Vantek Communications; Nov. 1995; 31 pp.
D. Klepp; "Managing the network revenue stream", Telephony, vol. 225, No. 2, Nov. 29, 1993, pp. 32-33.
"Listen to Your E-mail via Phonecard!"; Discount Long Digest News; Jun. 1996; 2pp.
"Premiere Revenues up 149%"; Discount Long Distance Digest News; Aug. 1996; 2pp.
Form S-4 Registration Statement of Premiere Technologies, Inc. to Securities and Exchange Commission; filed Apr. 22, 1997; 25 pp.
"Prepaid Callular Services Presentation for: GTE Mobilnet By: COMINEX"; May 9, 1996; 14 pp.
"Opening Brief Cellular Service, Inc. on the Reseller Switch Proposal"; Public Utilites Commission of the State of California Investigation on the Commission's own motion into the regulation of cellular radiotelephone utilities; No. I.88-11-040; Nov. 7, 1991; pp. 1-40.
U.S. Appl. No. 11/931,883, filed Oct. 31, 2007, Simon James Joyce et al., Upaid System, Ltd.
International Search Report for PCT/US99/20910 mailed Dec. 2, 1999.
Written Opinion for PCT/US99/20910 mailed Sep. 20, 2000.
Corrected International Preliminary Examination Report for PCT/US99/20910 mailed Mar. 28, 2001.
International Search Report for PCT/GB02/02997 mailed Aug. 14, 2003.
Written Opinion for PCT/GB02/02997 mailed Sep. 8, 2003.
International Preliminary Examination Report for PCT/GB02/02997 mailed Dec. 30, 2003.
Office Action for Japanese Pat. Appl. No. 2010-044607 mailed Oct. 24, 2011.
Search Report for Hungarian Pat. Appl. No. P00103516 mailed Jun. 22, 2004.
Office Action for U.S. Appl. No. 09/395,868 mailed Jul 18, 2000.
Notice of Allowance for U.S. Appl. No. 09/395,868 mailed Jan. 23, 2001.
Notice of Allowance for U.S. Appl. No. 09/851,382 mailed Nov. 29, 2001.
Office Action for U.S. Appl. No. 10/114,047 mailed Jun, 21, 2002.
Office Action for U.S. Appl. No. 10/114,047 mailed Dec. 31, 2002.
Office Action for U.S. Appl. No. 10/114,047 mailed May 6, 2003.
Notice of Allowance for U.S. Appl. No. 10/114,047; mailed Sep. 9, 2003.
Office Action for U.S. Appl. No. 10/684,396 mailed Mar. 25, 2005.
Office Action for U.S. Appl. No. 10/684,396 mailed Nov. 15, 2005.
Office Action for U.S. Appl. No. 10/684,396 mailed Jun. 29, 2006.
Notice of Allowance for U.S. Appl. No. 10/684,396 mailed Feb. 23, 2007.
Notice of Allowance for U.S. Appl. No. 10/684,396 mailed Aug. 8, 2007.
Office Action for U.S. Appl. No. 11/931,883 mailed Sep. 3, 2008.
Office Action for U.S. Appl. No. 10/096,912 mailed Dec. 14, 2004.
Office Action for U.S. Appl. No. 10/096,912 mailed Oct. 6, 2005.
Office Action for U.S. Appl. No. 10/096,912 mailed Jun. 19, 2006.
Notice of Allowance for U.S. Appl. No. 10/096,912 mailed Mar. 22, 2007.
Statement of Grounds of Opposition to Australian Pat. Appl. No. 770646 dated Aug. 26, 2004.
Office Action for Australian Pat. Appl. No. 2004202305 mailed Nov. 16, 2006.
Office Action for Australian Pat. Appl. No. 2008203852 mailed Feb. 19, 2010.
Office Action for Australian Pat. Appl. No. 2002311491 mailed Nov. 16, 2006.
Office Action for Australian Pat. Appl. No. 2008203853 mailed Sep. 19, 2008.
Office Action for Australian Pat. Appl. No. 2010200439 mailed Nov. 30, 2010.
Search Report and Office Action for Brazilian Pat. Appl. No. PI9913963-4 mailed Jun. 21, 2011.
Office Action for Canadian Pat. Appl. No. 2,354,058 mailed Oct. 31, 2007.
Office Action for Canadian Pat. Appl. No. 2,354,058 mailed Apr. 29, 2010.
Office Action for People's Republic of China Pat. Appl. No. 99810934.7 mailed Aug. 1, 2003.
Office Action for People's Republic of China Pat. Appl. No. 02813067.7 mailed Nov. 25, 2006.
Office Action for People's Republic of China Pat. Appl. No. 02813067.7 mailed Nov. 2, 2007.
Office Action for People's Republic of China Pat. Appl. No. 200410047421.6 mailed Sep. 1, 2006.
Decision on Rejection for People's Republic of China Pat. Appl. No. 200410047421.6 mailed Jan. 16, 2009.
Notification of Reexamination for People's Republic of China Pat. Appl. No. 200410047421.6 mailed Jun. 24, 2010.
Office Action for European Pat. Appl. No. 99 946 879.6 mailed Mar. 14, 2002.
Office Action for European Pat. Appl. No. 99 946 879.6 mailed Apr. 24, 2002.
Summons to Attend Oral Proceedings for European Pat. Appl. No. 99 946 879.6 mailed Sep. 12, 2002.
Minutes of Oral Proceedings for European Pat. Appl. No. 99 946 879.6 mailed Dec. 11, 2002.
Decision to Refuse European Pat. Appl. No. 99 946 879.6 mailed Mar. 5, 2003.
Communication of the Technical Board of Appeal for European Pat. Appl. No. 99 946 879.6 mailed Nov. 28, 2003.
Communication of the Technical Board of Appeal for European Pat. Appl. No. 99 946 879.6 mailed Aug. 2, 2004.
Summons to Oral Proceedings and Communication of the Technical Board of Appeal for European Pat. Appl. No. 99 946 879.6 mailed Apr. 22, 2005.
Office Action for European Pat. Appl. No. 02 738 410.6 mailed Nov. 5, 2008.
Office Action for European Pat. Appl. No. 02 738 410.6 mailed Dec. 21, 2008.
Office Action for European Pat. Appl. No 5023397.2 mailed Jul 3, 2008.
Search Report for Hungarian Pat. Appl. No. P0103516 mailed Jun. 22, 2004.
English translation of Office Action for Hungarian Pat. Appl. No. P0400342 mailed Apr. 7, 2010.
Office Action for Indian Pat. Appl. No. 5694/DELNP/2005 mailed Jun. 29, 2010.
Office Action for Indonesian Pat. Appl. No. W-00200100857 mailed Apr. 30, 2003.
Office Action for Indonesian Pat. Appl. No. W-00200302608 mailed Apr. 27, 2007.
Notice of Deficiencies in Israel Pat. Appl. No. 159629 dated Jun. 30, 2008.
Notice of Deficiencies in Israel Pat. Appl. No. 159629 dated Jan. 21, 2009.
Notice of Deficiencies in Israel Pat. Appl. No. 159629 dated Dec. 30, 2009.
Office Action for Japanese Pat. Appl. No. 2000-570981 mailed Jan. 7, 2002.
Office Action for Japanese Pat. Appl. No. 2000-570981 mailed Apr. 4, 2003.
Examiner's Report on Appeal for Japanese Pat. Appl. No. 2000-570981 mailed Sep. 24, 2003.
Office Action for Japanese Pat. Appl. No. 2000-570981 mailed Dec. 1, 2003.
Office Action for Japanese Pat. Appl. No. 2003-203261 mailed Aug. 28, 2009.
Office Action for Japanese Pat. Appl. No. 2010-044607 mailed Feb. 14, 2011.

Office Action for Japanese Pat. Appl. No. 2003-509751 mailed Jul. 7, 2008.
Office Action for Japanese Pat. Appl. No. 2003-509751 mailed Apr. 3, 2009.
Office Action for Japanese Pat. Appl. No. 2003-509751 mailed Apr. 19, 2010.
Office Action for Korean Pat. Appl. No. 10-2003-7017164 mailed Aug. 7, 2009.
Decision to Refuse a Patent for Korean Pat. Appl. No. 10-2003-7017164 mailed Feb. 22, 2010.
Office Action for Korean Pat. Appl. No. 10-2003-7017164 mailed Mar. 14, 2011.
English translation of Office Action for Korean Pat. Appl. No. 10-2009-7020893 mailed Apr. 30, 2011.
Office Action for Korean Pat. Appl. No. 10-2003-7011297 mailed Mar. 14, 2011.
Office Action for Mexican Pat. Appl. No. PA/a/2001/002722 dated Oct. 14, 2004.
Office Action for Mexican Pat. Appl. No. PA/a/2001/002722 dated Aug. 4, 2005.
Office Action for Mexican Pat. Appl. No. PA/a/2001/002722 dated Dec. 9, 2005.
English translation of Office Action for Mexican Pat. Appl. No. PA/a/2003/011821 dated May. 22, 2008.
English translation of Office Action for Mexican Pat. Appl. No. PA/a/2003/011821 dated Oct. 30, 2008.
English translation of Office Action for Mexican Pat. Appl. No. PA/a/2003/011821 dated Aug. 18, 2009.
English translation of Office Action for Mexican Pat. Appl. No. PA/a/2003/011821 dated Jun. 11, 2010.
English translation of Office Action for Mexican Pat. Appl. No. PA/a/2003/011821 dated Jul. 5, 2011.
English translation of Office Action for Mexican Pat. Appl. No. PA/a/2006/005947 dated May. 20, 2008.
English translation of Office Action for Mexican Pat. Appl. No. PA/a/2006/005947 dated Oct. 19, 2008.
Office Action for Norwegian Pat. Appl. No. 20011295 dated Oct. 11, 2007.
Office Action for Norwegian Pat. Appl. No. 20011295 dated Sep. 30, 2008.
Office Action for Norwegian Pat. Appl. No. 20011295 dated Nov. 30, 2009.
Office Action for Norwegian Pat. Appl. No. 20011295 dated Nov. 4, 2010.
Office Action for Norwegian Pat. Appl. No. 20035769 dated Aug. 29, 2011.
Search Report for Norwegian Pat. Appl. No. 20035769 dated Aug. 29, 2011.
English translation of Office Action for Polish Pat. Appl. No. P347068 dated Aug. 10, 2006.
English translation of Office Action for Polish Pat. Appl. No. P347068 dated Mar. 7, 2007.
English translation of Office Action for Polish Pat. Appl. No. P347068 dated Sep. 5, 2007.
English translation of Office Action for Polish Pat. Appl. No. P368067 dated May 30, 2008.
English translation of Office Action for Polish Pat. Appl. No. P368067 dated Oct. 6, 2008.
English translation of Office Action for Polish Pat. Appl. No. P368067 dated Feb. 26, 2009.
English translation of Office Action for Polish Pat. Appl. No. P368067 dated Mar. 8, 2010.
English translation of Office Action for Romanian Pat. Appl. No. a 2001 00290 dated Feb. 22, 2007.
Office Action for Romanian Pat. Appl. No. No. a 2001 00290 dated Oct. 17, 2007.
Office Action for Romanian Pat. Appl. No. a 2001 00290 dated Apr. 21, 2008.
Office Action for Romanian Pat. Appl. No. a 2004 00004/2003-097 dated Sep. 14, 2011.
Office Action for Vietnamese Pat. Appl. No. 1-2004-00077 dated Nov. 4, 2005.

European Written Opinion mailed Apr. 29, 2013 for corresponding European Application No. 02738410.6.
Decision to Grant Korean Patent Application No. 10-2010-7011297 mailed Nov. 27, 2012.
Office Action mailed Mar. 21, 2013 for corresponding Norwegian Application No. 20121157.
Office Action mailed Feb. 22, 2013 for corresponding Norwegian Application No. 20110211.
G. De Zen et al., "Value-Added Internet: a Pragmatic TINA-Based Path on the Internet and PSTN Integration", Proceedings of Global Convergence of Telecommunications and Distributed Object Computing, Nov. 1997, pp. 1-8.
S. Willens et al., "Remote Authentication Dial in User Service (RADIUS) draft-ietf-nasreq-radius-01.txt (c)", Network Working Group, May 1994, pp. 1-35.
T. Anschutz; "A Historical Perspective of CSTA"; IEEE Communications Magazine; Apr. 1996; pp. 30-35.
C. Rigney; "RADIUS Accounting"; Network Working Group; RFC 2059; Jan. 1996; pp. 1-2.
"Open Development, GTE Telecommunication Services and GTE Card Services plan to market wireless industry's most comprehensive prepaid wireless system"; Business Wire; Mar. 25, 1996; 2 pp.
"Calling card contains new twist"; Computing Canada; Feb. 15, 1996; printed from AllBusiness.com; 3 pp.
"Open Development introduces next-generation prepaid calling card system supporting more than 100 million accounts"; Business Wire; Nov. 27, 1995; 2 pp.
"Priority Call Introduces Oryx View Internet Aid"; Radio Comm. Report, Business Section; Sep. 1, 1997; p. 46.
"GTE TSI Announces First Network-Based Prepaid Wireless Service That Enables Subscribers to Both Make and Receive Calls Throughout North America and Debit Them to Their Prepaid Account"; Sep. 8, 1997; printed from www.synivers.com/content/cfm?page_id=348&press_release_id=59&year=1997; 2 pp.
W. Hefner; Discount Long Distance Digest, vol. 1, No. 28; Jun. 28, 1994; 16 pp.
"National Applied Computer Technologies (NACT), a wholly-owned subsidiary of GST Telecommunications (AMEX:GST), has launched the STX switch, the companies latest platform based switching system"; Business Wire; May 23, 1996; printed from AllBusiness.com; 1 p.
Hemmings; "Comments on Notice of Proposed Rulemaking in the Matter of Federal Communications Commission 96-93 by Brite Voice Systems, Inc."; Apr. 8, 1996; printed from www.info-ren.org/projects/universal-service/commentshtml/39.html in 2009; pp. 1-6.
"Cellular carriers using prepaid offering to tap new segments"; Mobile Phone News; Oct. 7, 1996; printed from findarticles.com/p/articles/mi_m3457/is_n40_v14/ai_18813388/pg_2/ in 2009; pp. 1-2.
Receipts for shipment of equipment by National Applied Computer Technologies on Dec. 27, 1991; 9 pp.
Office Action for Canadian Pat. Appl. No. 2,354,058 dated Apr. 11, 2012.
Office Action for People's Republic of China Pat. Appl. No. 200410047421.6 dated Sep. 28, 2012.
Office Action for Japanese Pat. Appl. No. 2009-231974 mailed Jul. 30, 2012.
English translation of Decision to Grant Korean Pat. Appl. No. 10-2009-7020893 mailed Mar. 21, 2012.
Office Action for Korean Pat. Appl. No. 10-2010-7011297 mailed Sep. 28, 2011.
Office Action for Mexican Pat. Appl. No. PA/a/2003/011821 dated Aug. 9, 2012.
Office Action for Norwegian Pat. Appl. No. 20035769 dated May. 30, 2012.
English Transl of Office Action for Romanian Pat. Appl. No. a2001-00290 mailed Dec. 6, 2012.
Office Action for Japanese Pat. Appl. No. 2009-231974 mailed Nov. 16, 2012.
Office Action for Brazilian Pat. Appl. No. PI 9913963-4 dated Jun. 21, 2011.
Office Action for Brazilian Pat. Appl. No. PI 9913963-4 dated Oct. 1, 2012.

Office Action for Canadian Pat. Appl. No. 2,354,058 dated Feb. 11, 2013.
K. Asatani, "Standardization on Multimedia Communications: Computer-Telephony-Integration-Related Issues", IEEE Communications Magazine, Jul. 1998, pp. 105-109.
Chou et al., "Computer Telephony Integration and Its Applications", IEEE Communications Surveys & Tutorials, First Quarter 2000, vol. 3 No. 1, pp. 2-11.
Lin et al, "Mobile Prepaid Phone Services", IEEE Personal Communications, Jun. 2000, pp. 6-14.
Niese et al., "An Automated Testing Environment for CTI Systems Using Concepts for Specification and Verification of Workflows", Annual Review of Communication, 2000, 10 pp.
"IP Telephony with Tapi 3.0"; Microsoft Windows 2000 Server White Paper; 1999; pp. 1-34.
Faynberg et al.; The Intelligent Network Standards; McGraw-Hill; 1997; pp. 2-16, 21, 22.
"Brite Voice Systems, Inc.—BVSI—Profile"; printed May 1, 2009 from Business.com.
"Intervoice to acquire Brite Voice Systems"; May 3, 1999; printed. Apr. 22, 2009 from.findarticles.com/p/aarticles/mi_qa3755/is_199905/ai_n8831152/; 1 p.
J. Hill; "An Analysis of the RADIUS Authentication Protocol"; 2001; 11 pp.
"Brite Voice Systems Inc 10K405 for Dec. 31, 1998"; filed Mar. 31, 1999; pp. 1-56.
"Brite to Provide Prepaid Managed Services to U S West Wireless"; Business Wire; Dec. 16, 1998; printed Apr. 22, 2009 from findarticles.com; pp. 3-4.
"Brite Selected by Ericsson as Partner to Supply Messaging, Intelligent Peripherals and Speech Recognition"; AllBusiness.com; Jan. 12, 1999; pp. 1-2.
"Brite Products Awarded 'Product of the Year' by CTI Magazine"; AllBusiness.com; Jan. 4, 1999; pp. 1-2.
"Intervoice Inc. —INTV Quarterly Report (10-Q) Item 1. Legal Proceedings"; filed Oct. 15, 2002; printed from Edgar Online; pp. 1-3.
"Brite Increases Speed and Subscriber Capacity of Its Enhanced Serveices Platform by Using Sun's . . . "; AllBusiness.com; Jan. 18, 1999; pp. 1-3.
Spicer et al.; "Brite expands prepaid service for PRTC-Brite Voice Systems, Inc.; Puerto Rico Telephone Co"; Mobile Phone News; Jun. 15, 1998; 1 p.
"Brite Awarded $15 Million Contract to Supply Service for One of the World's . . . "; AllBusiness.com; Sep. 24, 1998; pp. 1-2.
"Choosing the Best: CTI Magazine's 1998 Products of the Year"; 1999; accessed 2008 or 2009 at TMCnet.com.
"XL-MAX—Scalable Class V Platform for IP and TDM Networks"; 2005; printed from www.nact.com; 2 pp.
"World Access to Buy Stake Nact Telecommunications"; The New York Times; Jan. 3, 1998, New York edition, Section D, p. 3.
"WebConnect—Web-based Account Management and Provisioning System for NACT Telecom Solutions"; 2005; printed from www.nact.com; 2 pp.
"NTS 2000—Centralized Adminsitration and Account Management for NACT Telecom Solutions"; 2005; printed from www.nact.com; 2 pp.
"NACT Forms Alliance with Telephone Electronics Corporation"; News from NACT; Sep. 1991; 1 p.
"NACT Releases XL-MAX a New Scalable Class 5 Platform!"; printed from www.nact.com in 2009; 2 pp.
"Prepaid Solutions"; printed from www.nact.com in 2009; 1 p.
"Prepaid Solutions—Web-based Customer Service and Agent Management"; printed from www.nact.com in 2009; 1 p.
"Prepaid Solutions—Seamless and Cost-effective Scalability"; printed from www.nact.com in 2009; 1 p.
"Prepaid Solutions—NACT vs PC and Router-based Solutions"; printed from www.nact.com in 2009; 1 p.
"Prepaid Solutions—Intelligent Switching and Signaling"; printed from www.nact.com in 2009; 1 p.
"Prepaid Solutions—Centralized Provisioning & Account Management"; printed from www.nact.com in 2009; 1 p.
"XL-MAX Application"; printed from www.nact.com in 2009; 2 pp.

"WebConnect"; printed from www.nact.com in 2009; 1 p.
"Account Connect API"; printed from www.nact.com in 2009; 1 p.
"NTS 2000 Features"; printed from www.nact.com in 2009; 1 p.
"VoIP-7"; printed from www.nact.com in 2009; 2 pp.
"Vo1P-7 vs. Current VoIP"; printed from www.nact.com in 2009; 2 pp.
"MCU II"; printed from www.nact.com in 2009; 1 p.
"IPAX Features"; printed from www.nact.com in 2009; 1 p.
"Dual IPAX"; printed from www.nact.com in 2009; 1 p.
"NACT Teleedommunications Inc. 10-K filed on Dec. 29, 1997"; printed from EDGAR Online Apr. 23, 2009; 96 pp.
"MCU II High Availability—Applications Extender for NACT Telecom Solutions"; 2005; printed from www.nact.com; 2 pp.
"IPAX Highly Scalable Intelligent Switching Gateway"; 2005; printed from www.nact.com; 2 pp.
"Breaking New Ground in Telecommunications"; Frontier Corporation Annual Report; 1996; pp. 1-27.
"USWEST Launches New Calling Card"; Discount Long Distance Digest News; No. 78; Mar. 12, 1997; 2 pp.
"openMEDIA Cellular Prepaid"; (undated) 6 pp.
"openMEDIA Prepaid"; (undated) 7 pp.
"openMEDIA—The Next Generation Enhanced Services Platform"; (undated) 11 pp.
"Open Development Corporation—The Premier Provider of Enhanced Services Platforms"; (undated); 11 pp.
"Glenayre Demonstrating Prepaid Wireless Products at ExpoComm Mexico '98"; PRNewswire; Feb. 10, 1998; 2 pp.
"GTE TSI Offers Prepaid Service with North American Roaming"; Radio Comm. Report, Business Section; Sep. 15, 1997; p. 37.
"NACT"; printed from www.telephoneworld.com/buyersguides/company/nact on Apr. 23, 2009; 1 p.
"NACT Inc"; printed from www.zoominfo.com/Search/CompanyDetail on Apr. 22, 2009; 1 p.
"Brite to Expand Sprint PCS Prepaid Service"; Sep. 23, 1988; printed from AllBusiness.com on Apr. 22, 2009; 3 pp.
"Excel, Inc. and Brite Voice Systems Enter Strategic Partnership"; Business Wire; Sep. 8, 1997; printed from www.allbusiness.com/media-telecommunications/7046549-1.html on Apr. 22, 2009; pp. 1-2.
"Intervoice to acquire Brite Voice Systems for 1.2 times revenue"; Weekly Growth Report; May 3, 1999; printed on Apr. 22, 2009 from findarticles.com/p/articles/mi_qa3755/is_199905/ai_n8831152/; 1 p.
"Nortel (Northern Telecom) and Brite Voice Systems Deliver Worldwide Prepaid Calling Solution"; Pr Newswire; Jun. 30, 1998; printed from prnewswire.com on Apr. 22, 2009; pp. 1-2.
"Brite's Prepaid Solutions Now Used By Over Two Million Subscribers"; Business Wire; Apr. 15, 1999; printed from allbusiness.com on Apr. 22, 2009; pp. 1-2.
"Telecom Business Names and Brite Voice Systems as 'TOP250' Firm in the Competitive Telecom Industry"; Business Wire; Jul. 30, 1998; printed from www.allbusiness.com/media-telecommunications/863838-1.html on Apr. 22, 2009; pp. 1-2.
Slakmon et al.; "The Potential of Prepaid Phone Card Services"; Alcatel Telecommunications Review; 2nd Quarter 1998; pp. 139-144.
"QUALCOMM Introduces Open Software Platform for Wireless Internet Applications and Services"; Qualcomm Brew; Jan. 31, 2001; printed from brew.qualcommm.com Mar. 6, 2007; pp. 1-4.
"Tu-Ka Kansai, Brite and Marubeni Join Forces to Deliver First Wireless Prepaid Service to the Japanese Market"; Business Wire; Feb. 8, 1999; printed from BNET Business Network; pp. 1-5.
"IPAX"; 2009; printed from www.nact.com; 1 p.
"Brite Voice Systems Inc. 10-K405 for Dec. 31, 1996"; printed from www.secinfo.com on Jan. 6, 2009; pp. 1-46.
Schneider; "Sprint PCS/BRITE Prepaid Maintenance and Operations Procedure"; Aug. 4, 1997; pp. 1-21 (SEALED).
"BriteDEBIT 3.0 Functional Design Specification"; Brite Voice Systems, Inc.; 1996; pp. 15-48 (SEALED).
M.L. Gregory; Letter from Ruppman Marketing Technologies to Sprint Spectrum, L.P. dated May 29, 1997; 1 p. (SEALED).
File History of U.S. Appl. No. 8/121,074, filed Sep. 14, 1993 and abandoned Sep. 19, 1995; 110 pp. (SEALED).

"NACT VoIP Industry Tutorial"; Apr. 11, 2001; pp. 1-14 (SEALED).
"Specific Agreement No. 97-0294, by and Between Brite Voice Systems, Inc. and Sprint Spectrum L.P. for Wireless Prepaid Calling Service"; Aug. 4, 1997; pp. 1-193 (SEALED).
Office Action for U.S. Appl. No. 13/864,122 mailed Sep. 16, 2013.
Office Action for U.S. Appl. No. 13/864,122 mailed Mar. 28, 2014.
Office Action for U.S. Appl. No. 13/864,122 mailed Aug. 15, 2014.
Office Action for Australian Pat. Appl. No. 2011253537 mailed Aug. 20, 2013.
Office Action for Brazilian Pat. Appl. No. PI0211306-6 dated Sep. 22, 2014 partial.
Decision to Refuse & Minutes of Oral Proceedings in European Appl. No. 02738410.6 mailed Nov. 22, 2013.
Hearing Notice for Indian Pat. Appl. 5694/DELNP/2005 dated Jun. 4, 2013.
English translation of Office Action for Israel Pat. Appl. No. 159629 dated Sep. 10, 2013.
English translation of Notification before Allowance for Israel Pat. Appl. No. 159629 dated Oct. 1, 2014.
English translation of Notification before Allowance for Israel Pat. Appl. No. 231176 dated Sep. 30, 2014.
Office Action for Japanese Pat. Appl. No. 2012-039072 dated Sep. 17, 2013.
Office Action for Japanese Pat. Appl. No. 2010-234897 dated Jun. 28, 2013.
Office Action for Japanese Pat. Appl. No. 2010-234897 dated Aug. 4, 2014.
Office Action for Japanese Pat. Appl. No. 2013-029412, dated Mar. 28, 2014.
Office Action for Japanese Pat. Appl. 2012-237180, dated Dec. 9, 2013.
Office Action for Japanese Pat. Appl. 2012-237180, dated Dec. 2, 2014.
Office Action for Norwegian Pat. Appl. No. 20110211 mailed Aug. 26, 2014.
Office Action for Romanian Pat. Appl. a 2001 00290 dated Sep. 11, 2013.
Office Action for Romanian Pat. Appl. a 2001 00290 dated Feb. 28, 2014.
Office Action for Romanian Pat. Appl. a 2004 0004 dated Dec. 17, 2013.
Reasons of Approval of Romanian Pat. Appl. a 2004 0004 dated Nov. 28, 2014.
Office Action dated May 23, 2013 in corresponding Canadian Patent Application No. 2,452,287.
Examination Report for Canadian Appln. No. 2,452,287 dated Feb. 17, 2015.
Partial English translation of Office Action for Japanese Pat. Appl. 2012- 237180, dated Dec. 2, 2014 (Ref. FE in IDS filed Jan. 23, 2015).
Notice of Allowance for Japanese Pat. Appl. 2013-029412, dated Jan. 13, 2015.
Communication from Japanese Patent Office for Japanese Patent Application No. 2003-509751; mailed Jul. 7, 2008.

\* cited by examiner

*Primary Examiner* — Wesley Kim
*Assistant Examiner* — Richard Chan
(74) *Attorney, Agent, or Firm* — Staas & Halsey LLP

(57) ABSTRACT

A method and apparatus for providing mobile commerce, electronic commerce, customer care and communication services via a plurality of networks, including receiving in a roaming network from a user device, an identification number and a request for a service, forwarding from the roaming network, to a home network, the identification number, the request for the service, and adding a service provider identification number that relates to a service provider and a cost or rate of the service, if the service is to be charged, verifying, by a convergent communication platform located on the home network, that the identification number relates to a valid user account, that the user device is authorized to receive the service and that the valid user account has sufficient value to pay for the service, providing an authorization to the service provider, if the identification number relates to the valid user account, the user device is authorized to receive the service and the valid user account has sufficient value, if the service is to be charged and charging the valid user account on a real time basis, if necessary, for providing the service, if the service is to be charged.

27 Claims, 31 Drawing Sheets

| TYPE OF CHARGE | CHARGE DECIDED BY | AMOUNT COLLECTED BY | AMOUNTS DUE TO THE | | BASIS FOR DECIDING CHARGING |
|---|---|---|---|---|---|
| | | | HOME NETWORK (HN) | ROAMING NETWORK (RN) | |
| AIRTIME: | | | | | |
| MOC IN HOME NETWORK | HN | | 100% | | CONSOLIDATED A/T CHARGES TO CUSTOMERS; |
| MTC IN HOME NETWORK | HN | | 100% | | 15% SURCHARGE ASSUMED FOR ABOVE WORKINGS |
| MOC IN VISITING NETWORK | RN | | 13.04% | 86.96% | |
| MTC IN VISITING NETWORK | RN | | 13.04% | 86.96% | |
| PSTN: PUBLIC SWITCHED TELEPHONE NETWORK | | | | | |
| MOC IN HOME NETWORK | HN | | 100% | | SURCHARGE DECIDED BY THE HN |
| MOC IN VISITING NETWORK | RN | | SURCHARGE | ACTUAL | |
| MTC IN VISITING NETWORK | RN | | ACTUAL + SURCHARGE | | |
| SERVICE TAX (5%): | | | | | |
| ON CARDS | GOVT. | HN | 100% | | |
| ON COUPONS IN HPLMN | GOVT. | HN | 100% | | |
| ON COUPONS IN VPLMN | GOVT. | RN | | 100% | |
| RENTALS: | HN | HN | 100% | | |
| RECHARGE FEE: | HN | | 100% | | |

FIG. 8

| Rules for Contract | | | | | |
|---|---|---|---|---|---|
| Merchant | Condition | Value | Unit | Timestamp | Currancy |
| Sify@Info.com | | 90 | Percentage | 0 | |
| Indya@Indya.com | | 50 | Unit | 1 | |
| Satyam Online | After receipt | 5 | Percentage | null | |
| Recliff | | 100 | Amount | 0 | |

| Contract | Valid From | Valid Till | |
|---|---|---|---|
| EpaidProral | 11/23/00 | 11/23/00 | [Rules] |
| ContractParker | 1/22/01 | 1/22/01 | [Rules] |
| TEST | 1/22/01 | 1/22/01 | [Rules] |
| NEWTEST | 11/23/00 | 11/23/00 | [Rules] |
| aaa | 12/12/00 | 12/12/00 | [Rules] |

FIG. 29

| | | | | |
|---|---|---|---|---|
| Merchant: Sify@Info.com | | | | |
| Contract: | Contract for Si | | | * |
| Valid From: | 31 ▼ | January ▼ | 2000 ▼ | * |
| Valid Till: | 31 ▼ | January ▼ | 2001 ▼ | * |

Rules

| Condition | Payment Mode | Value | TimeStamp |
|---|---|---|---|
| - ▼ | Percentage ▼ | 25 | 2 |

Secondary Merchants

| Merchant | Condition | Payment Mode | Value | TimeStamp |
|---|---|---|---|---|
| Indya@Indya.com ▼ | After Receipt ▼ | Amount ▼ | 200 | |
| KotakMahindrains ▼ | - ▼ | Percentage ▼ | 40 | 4 |
| DTDCCourier ▼ | After Receipt ▼ | Unit ▼ | 3 | |

Save    Save & Add More Rules

CONVERGENT COMMUNICATIONS PLATFORM AND METHOD FOR MOBILE AND ELECTRONIC COMMERCE IN A HETEROGENEOUS NETWORK ENVIRONMENT

CROSS-REFERENCE TO RELATED APPLICATIONS

This application is a continuation-in-part application of U.S. application Ser. No. 09/395,868, filed Sep. 14, 1999 now U.S. Pat. No. 6,320,947, which claims the priority of U.S. application Ser. Nos. 60/100,440 and 60/100,470, both filed Sep. 15, 1998, the contents of each being incorporated herein by reference.

BACKGROUND OF THE INVENTION

1. Field of the Invention

The present invention relates to a convergent communications system for providing services to individual and corporate customers worldwide. More specifically, the invention relates to a convergent communications system that provides mobile commerce, electronic commerce and communication services through existing communication switches without specific hardware located at those switches. This system supports the use of pre-paid and post-paid accounts across heterogeneous networks to provide a large range of advanced communication services regardless of a customer's location.

2. Description of the Related Art

It is known to pay for services ahead of time (pre-paid), as well as establishing a credit account for services (post-paid). A post-paid account is established based on the credit worthiness of a customer, and the corporate entity establishing the post-paid account then vouches for the continued credit worthiness of a customer. Post-paid accounts are well known and widely used.

For example, it is known to establish a post-paid telephone access account. A customer can then make long distance phone calls or access the phone network when roaming in a visiting network, different from a home network, by using the post-paid account. The telephone company then guarantees payment to any other companies providing roaming services based on the customer's credit worthiness. In addition, for several years mobile operators have offered roaming services to their customers. Typically, mobile operators enter into a roaming agreement with partner operators in different geographies, such as other countries, and allow their customers to use their mobile phones in these partner countries or different networks. The home network stands as payment guarantor for the calls made by their customers in visiting networks. Visiting networks provide the facility of making and receiving calls to the home network subscribers and collect, process and forward the usage data to the caller's home network for payment. The home network then pays the visiting network.

At a periodic interval, the home network telephone company bills its customer and collects the money from the customer. Typically, such transactions involve significant time delays, e.g., anywhere between a few days to a few months. Therefore, the home network must stand as payment guarantor to the visiting network for the calls made by its customers. Due to this, currently the home network is able to offer roaming only to its post-paid customers (whose creditworthiness is established). With the increase in the pre-paid subscriber base, teleco operators worldwide want to offer roaming services to their pre-paid customers as well. Today, due to the inherent nature of non-real-time processing of call usage for roaming customers, operators are not in a position to offer true pre-paid roaming to their customers.

Further, it is known to establish a post-paid credit account with a bank or other lending institution, and then use that post-paid account to purchase goods and services. Occasionally, a post-paid credit account and roaming telephone services can be combined, such as when a credit card number is exchanged over a wireless telephone link to order services. There are limitations to this system. For example, customers may wish to limit their financial exposure in an account, or may not wish to establish credit with the telephone company. These customers can establish a pre-paid account. However, existing pre-paid account arrangements have several limitations.

For example, a pre-paid mobile or wireless phone user may want to use his/her wireless phone while in a territory covered by another phone company. As used hereafter, this is referred to as a visiting or roaming territory or network. While the pre-paid customer may have sufficient credit to complete the phone call using other accounts, such as a credit card, the customer has not established "credit" with the phone company of the roaming territory, or even his original phone company ("home network" or "home territory"), by virtue of being a pre-paid customer. Thus, a pre-paid customer in a roaming territory ("a pre-paid roamer") has no way of having his/her pre-paid home phone company account debited while roaming, unless the roaming network phone company has an agreement with the home network phone company, and has specific hardware at each switch to monitor the call, and debit the customer's pre-paid account. As these agreements are generally impractical to create, there exists no effective pre-paid roaming.

Pre-paid telephony has existed in the telecommunications industry. A customer or user is required to pay a certain amount of money in advance to the communications service provider, and the service provider allows the customer to use the communications services for that pre-paid amount. Once the user account balance reaches zero, the service provider cuts-off the service. The customer then has to recharge his/her account by paying the communications service provider additional funds. The pre-paid account thus needs to be maintained as current.

To enable pre-paid communications services, service providers need to control the actual use of funds in the customer pre-paid account in real time (i.e., as the service is being delivered) and the service provider needs a system that can calculate the use of the account funds as the customer call is progressing in real time. There are several systems available in the marketplace for the service providers that allow for such a real time usage control. Commercially available technologies today enable service providers to control the calls in real time or near real time using several methods.

A first method is a pre-paid platform working as a service node to the telephony-switching network. Calls might flow through the pre-paid platform, or the service node pre-paid platform may control the calls in a semi-intelligent network fashion (i.e., where the platform instructs the switching network to connect/disconnect without calls actually being routed through the system). A pre-paid platform can therefore work as an intelligent network node on the IN (intelligent network) enabled telephony-switching networks.

It is also possible to offer pre-paid services based on processing of Call Data Records ("CDR's") periodically at very short intervals. Switching systems allow for the usage information to be passed onto the service provider's billing system, for example, through a hot-CDR port where the telephone company switches are configured to supply the usage information to the billing system at frequent intervals. It is also possible to offer pre-paid services based on programming a card to take advantage of Advice of Charge ("AoC") parameters, which restricts the call usage. However, since using Call Data Records is prone to fraud, mobile operators worldwide are discontinuing their use. Also AoC does not offer flexibility in configuring a rate of use.

Traditional pre-paid systems require the call control equipment, i.e., both the software and hardware, to be co-located with the switch. The pre-paid system is connected with the telecommunication switch over a signaling link (e.g., SS7, MF2RC, or ISDN-PRI, etc). When a caller makes a phone call, the switch routes the signaling information over the signaling link to the pre-paid system. Then the pre-paid system authorizes the call and asks the switch to connect the call. The pre-paid system also initiates a rating process for that call. The rating process keeps track of the usage of the pre-paid account of the caller and when the balance runs out, the system asks the switch to disconnect the call.

Deployment of this type of system for pre-paid roaming is inefficient. For pre-paid roaming, all the participating and often heterogeneous networks need to have the same pre-paid system. This means, that multiple pre-paid call control equipment needs to be deployed for each participating network. This can be a logistic nightmare for several reasons. First, initial deployment of equipment at all participating networks can be time consuming and expensive. Second, regular operations and maintenance (e.g., tariff plan updates, management information system information, etc.) are logistically difficult on a daily basis.

In addition, roaming services require data clearing and settlement of financial transactions. Multiparty settlements across various network systems can be very complex. Customer account set up and management across networks can be very complex and any delay could result in enormous inconsistencies and confusion for customers. Customers could exhaust their pre-paid account balance while in a visiting network. The customer should be able to add money or "recharge" his/her account from a visiting network. Customer recharge from a visiting network poses several issues including: how to allow for a customer account recharge when the customer is not a customer of the visiting network service provider, how to manage the financial transaction related to payment management and settlement of recharge amounts (e.g., issues related to dealer commissions, the recharge service facilitation process and transfer of money between the home network and visiting network, etc.).

If the customer requires some help regarding his/her account, e.g., billing information or additional service, etc., the question arises of whom will he/she contact for customer service. The visiting network may not have all the information related to the customer, and the information at the home network is not necessarily be current. The visiting network may want to offer value-added services like simple messaging service ("SMS"), data services, and call related services (e.g., call conferencing, call waiting, etc.) to the roaming customer (which value-added services are available to the same customer in the home network while he/she is not roaming). An additional problem arises when information between the home network and visiting network needs to be synchronized for a pre-paid roaming customer.

Most telephone companies today have in-house information technology ("IT") systems for operational and business management. Their current pre-paid systems are integrated with such in-house operational and business management systems. Telephone companies would like to have the same level of integration between their pre-paid roaming system and in-house IT systems so that they can manage their business efficiently. Deployment of several pre-paid roaming systems could mean several integrations. This could be, by itself, time-consuming and expensive.

For a post-paid customer, telephone companies are willing to take the customer payment or financial risk as the home network has already evaluated the creditworthiness of the customer and the home network is willing to underwrite that payment risk. However, in case of a pre-paid customer, the home network may not even know whom the customer is, e.g., it could be an anonymous customer. This means that both the visiting network and home network need to have constant agreements for all types of transactions (e.g., communication services as well as commerce transactions).

Telephone companies also offer customer care to their customers. However, telephone companies offer customer care to their subscribers only when the subscribers are in their home network. If the subscriber is roaming, he can dial into the home network's customer care center and use this facility. Offering customer care beyond the home network service area, however, is difficult due to the fact that customer information is not available at the visiting network. Some telephone company operators are able to provide limited customer care at the visiting networks. However, so far such systems can only accommodate post-paid customers.

With the increase in the pre-paid subscriber base and with growing mobile commerce opportunities, customer care becomes very important for pre-paid customers. Broadly speaking, customers have several requirements from a customer care service perspective: information related to service available at the visiting network or territory location (e.g., can the customer send a fax using his/her mobile phone), information related to the local territory (e.g., who is the nearest doctor), information related to how to use the visiting network service (e.g., how the customer make a call to XYZ destination; how does the customer send a fax using his/her mobile phone which is supplied by a visiting network vendor), account inquiry services (e.g., what is the current balance in the customer's pre-paid account; what are the last five transactions the customer has done and how much did the transactions cost), account/service profile information modification services (e.g., the customer may want to change his/her address; the customer may want to subscribe to a new service so that he/she can send a fax), disputes/complaints (e.g., the customer had tried ten times and the call dropped every time and hence the customer does not want to pay for the call; the customer never made a call to XYZ destination), recharging of the customer's pre-paid account from various sources (e.g., the customer has run out of funds in his/her account, and he/she wants to top up using a recharge voucher, his/her bank account, cash or some other means).

The telephone company business is complex. Any teleco service delivery requires various systems to work in tandem to manage customer expectations, e.g., making service available, as well as providing complete and accurate information at the right place at the right time so that the customer is served efficiently. Telephone company systems also need to make sure that internal operations of the telephone company are optimized. That means complete and accurate information needs to be made available at the right time and the right place for the internal staff of the telephone company to use it to effectively manage business. Telephone company systems also need to make sure that they co-exist or are compatible with other third party telephone companies and service providers so that they can collectively offer service to the customers, and manage their business, share revenues, etc. To cater to such large and complex needs of telephone companies/service providers, there is no one single system that can offer the entire functionality. Typically, suppliers, integrators, and telephone companies work together to customize and integrate several different systems to cater to a particular telephone company's needs.

As the pre-paid communication service business was initially anticipated to be a separate service, telephone companies typically have adopted a single company-specific system that can control the calls in real time (or near real time with varied definitions of the phrase "real time"). As the pre-paid communications business has started to grow at a rapid pace worldwide, service providers feel a need to integrate their pre-paid systems with other systems so as to effectively serve their customers and manage business.

However, pre-paid roaming poses several challenges to the telephone company industry. All the participating networks need to have a common understanding of how to manage the call flow, how to offer services, and how to manage business. However, with several systems integrated in several manners across various networks there are quite a few challenges to pre-paid roaming. One fundamental issue is how to achieve a "seamless" service to the customer and effective business management across several participating networks, often heterogeneous or different types of networks. For example, one service provider operator may have an excellent customer care center whereas another operator may not have such a high quality customer care center, or one operator may have a high quality voucher generation/management system while the other operator is managing most of these processes manually. Simple or complex integration of several different systems together does not offer a business solution due to varied permutations and combinations for the telephone companies. Also, it is impractical to expect one or more of the telephone companies to abandon their existing systems and adopt an entirely new system no matter how qualitatively good the new system is.

Known pre-paid systems are single box solutions, which allow for limited integration with external systems. Even in a situation where it is feasible to integrate, it is not possible for other systems to enter into the pre-paid system at various levels. That is, integration to replace some of the functionality of the pre-paid system is not possible. Integration to add additional functionality is what needs to be achieved. This is a major limitation for the telephone companies to effectively manage their business. For example, if a telephone company already has a Personal Identification Number (PIN) generation system, if it would like to deploy a pre-paid system for roaming, it needs to use the PIN generation capability of the new pre-paid roaming system rather than the old system. That means, the telephone company now needs to have two separate PIN generation systems—one for non-roaming subscribers and another for roaming subscribers. This causes a lot of confusion in the marketplace and mere integration with a third party system will not solve the problem. There are other such problems, e.g., distribution management, customer administration, etc.

In addition to the foregoing, when mobile operators enable mobile commerce for a pre-paid roamer in a converged communications and commerce environment, there is a need for financial settlements to various parties involved in the commerce transaction made by the pre-paid roaming customer. Settlement of commerce transactions could additionally involve the following: payments related to commerce transactions may need to be distributed across one or more of the following entities: merchant (provider of goods/service either manufacturer, reseller or distributor or a combination of several such entities), portal (mobile portal or any other type of portal including a voice portal ("Vortal"), e-commerce portal, etc.), Internet service provider (an independent agency or mobile operator itself or portal itself), mobile phone company (home network, visiting network, or both), virtual service provider (either content service provider or infrastructure service provider or a branding agency or any combination), bank/credit card agency or any other financial institution (one or more involved in the transaction), third party payment agency (e.g., a merchant aggregator, payment processing agency, e-wallet, or any such payment processing agency), goods/service delivery agency (e.g., a courier company, bandwidth supplier, and insurance agency). It is also possible that mobile service providers may offer some bundled packages (e.g., if the customer buys $50 worth of goods while roaming, a roaming surcharge on telephony is waived, etc.). This means any settlement system should be capable of arriving at the various settlement amounts based on the tariff plans and roaming agreements between the various parties involved in the commerce transaction.

It is anticipated that mobile handling devices (phones, PDAs, etc.) will be used for all types of payments especially micro payments. Typically, a customer would use his mobile phone to pay for small value items, such as soft drinks at vending machines, cigarettes, newspapers, books, parking tolls, and other such low value payments which are generally known in the industry as the micro payments.

Existing technologies today allow for such payments to take place in one of the following ways: a customer can use his/her mobile phone and at the time of payment he/she can use his/her credit card or bank's debit card for payment. This means, payment would go thru the banking/credit account of the customer rather than the customer's telephony account. This method has limitations in that it assumes that all customers have either a bank debit card or a credit card. Present growth of pre-paid mobile telephony worldwide indicates that there is a big segment of the market that either does not have any banking/credit relationship or simply does not wish to use their banking/credit relationship for telephony. This is particularly true in certain developing countries with poor banking arrangements. Debit/Credit card assumption also limits the total number of customers who can conduct mobile commerce, and therefore the telephony company may only be playing a very limited role in mobile commerce. Telephone company revenues normally are restricted to the telephony connections and services they have provided. However, a customer could use his/her mobile telephony account for payment of a commercial transaction. That is, the cost of goods/services will be charged to the customer's telephony account. At the end of the month, the customer would get a teleco bill, which include the cost of the goods/services purchased. This method has limitations in that it assumes that the customer is a post-paid account customer. That means the system does not accommodate a pre-paid customer and thus cannot conduct a mobile commerce transaction. Instead, the system assumes that the payment risk is carried by the telephone company or by the merchant. At the end of the billing period, if the customer does not pay his/her bill, the telephone company/merchant has to absorb the financial risk.

Customers can have an e-wallet account, which is an account with a Personal Identification Number. Every time, the customer purchases goods, he or she can key in the PIN, and the e-wallet company (e.g., IPIN) can issue a payment guarantee. In this method, e-wallet works as a pre-paid account and only if the money balance is available in the account will a purchase transaction be authorized. This method has limitations because every time a purchase is requested, a user is required to identify him/herself (e.g., using a PIN, which is typically of 12 digits or more). This identification process itself can act as a deterrent and customers may not be interested going through the process for small value purchases. The telephony company again would only be playing a very limited role in the mobile commerce, as its revenues or charges are restricted to the telephony connection it has provided.

To simplify the mobile commerce purchase process, industry is seeking innovative technologies, such as Bluetooth, which allows for direct communication between vending machines and a customer's mobile phone. These technologies, however, also have limitations in that merchants as well as the customer need to be equipped with instruments that are capable of handling these technologies. This means higher set-up costs. Cost economics may not justify the investment at least in the earlier years, and these technologies do not address the issues related to payment risk. These systems assume that all the customers are trust worthy and will honor their payments. In real life, this is not the case. In addition, these technologies do not address the issues related to pre-paid customers. Pre-paid customers could be anonymous, which means neither the telephone company nor the merchant knows who the purchaser is.

In the electronic commerce world today, read/write memory devices are becoming more popular. Read/write memory devices have the capability to store an account balance, and other information related to the customer. Read/write memory devices do not need any network connection to the back-end systems. Read/write memory device readers can be deployed at the merchant's premises and a walk-in customer can use his card to make payments. This mechanism has been found to be useful as it is simple to use both for the merchant and customer, and allows for prepayment.

Every time a service is used, the payment related to that service is deducted from the customer's pre-paid account. It is clear that money in a pre-paid account will reach a zero balance at some point in time. Hence, there is a need by the customer to recharge his/her pre-paid account. There are several commercially available systems in the marketplace that offer pre-paid facilities and most of them offer account recharge. Currently available systems allow for account recharge: by issue of a recharge voucher (the voucher having a unique number, known as PIN, with a certain predetermined value, e.g., $20), which can be used by the customer. The customer dials into an Interactive Voice Response ("IVR") System of the service provider and by way of a guided menu, the customer will be able to recharge his/her pre-paid account by punching in the unique PIN number.

Such a recharge system has limitations in that service providers need to print recharge vouchers and then distribute the vouchers. This is a big logistics and cost problem. Also, there is a potential fraud risk with several types of frauds feasible, for example, leakage of PINs to unauthorized users, unauthorized users randomly trying several numbers and matching the right number, and unauthorized parties printing fake recharge vouchers, like counterfeit currency. Moreover, service providers can offer only predetermined amounts of money per voucher. Although they may offer several types of vouchers, each voucher will have a predefined amount. This means that a customer cannot choose the exact amount of recharge he/she would like to do. Further, there is the inability of service providers to offer a credit facility to pre-paid customers. Increasing use of pre-paid accounts in the highly developed and credit-driven countries indicate that customers are increasingly using pre-paid accounts for convenience and easy use, rather than any credit related issues. Such customers do not like to pay upfront payments for services which they have not yet used. With a credit limit (with assurance of guaranteed payment by third parties like banks, etc.), such a method would increase the number of customers selecting pre-paid accounts.

In situations where a pre-paid amount is programmed onto a card that could be used by a customer (e.g., a SIM card, smart card, magnetic card or any other type of card), the customer can take his card to the nearest outlet where there are special programming machines available for recharging the card. These types of prepayments have been used in the past. However, as mobile commerce becomes increasingly popular, it is anticipated that customers would like to use such solutions for micro payments. Programming the pre-paid amount onto the cards offers convenience to the customer as he/she need not punch in a long (often 12 digits or more) code for a very low value transaction. However, such an account recharge arrangement has limitations in that customers can go to only a limited set of recharge outlets every time they need to recharge. Such cards cannot be recharged at other places. Service providers also do not like to update or recharge very large amounts to these cards due to issues related to fraud (e.g., unauthorized parties with access to equipment that can write large money amounts on the cards), and the inability of service providers to offer a credit facility to pre-paid customers.

In regular commerce transactions (e.g., using credit cards/debit cards at a physical store or shop), transaction validation is typically conducted by swiping the card and physical signature verification. Sometimes, as a protection from fraud, credit card/debit card agencies ask the merchant establishment/customer to call the bank. The bank then will use additional security measures like asking a mother's maiden name, date of birth, etc., to assure that the customer is not an unauthorized person. In the Internet and mobile Internet situations today, these additional security measures do not exist and fraud exists as noted above with various of the available no change pre-paid account systems. Due to limited security, fraud on internet/mobile Internet related transactions is estimated to be very high.

SUMMARY OF THE INVENTION

One exemplary embodiment of the invention disclosed in the parent U.S. patent application, Ser. No. 09/395,868, relates to pre-paid calls and other communication services using a simple telephone switch. The simple telephone switch had a computer telephone interface ("CTI") card inserted that routed advanced functions to a second, secure channel. The second, secure channel was connected via the telephone network, the Internet, or any other Internet protocol network to the communication platform. The communication platform was able to then send authorization for the call, connection instructions, and other commands to the simple telephone switch such that the customer had access to advanced functions.

The use of the second, secure channel for authorizing payment and handling call control enables several exemplary embodiments as detailed herein, with modifications to the communication system, to create numerous improvements to pre-paid roaming services. For example, in addition to the above described pre-paid roaming, the invention herein provides an improved convergent communications device for mobile commerce, electronic commerce, account recharge, multiparty settlement transactions, integrated customer care or any other commercial transaction.

Thus, a first exemplary embodiment of the invention is a convergent communications system that resides in a centralized location, accessible from any location via the internet, a publicly switched telephone network, a SS7 signaling line, a telephone number, or any other means now known or later devised. A pre-paid roaming call can then be handled at a local phone switch by signaling from the local phone switch to the centralized convergent communications platform that the customer is attempting to access his/her account.

The convergent communications platform can then authorize the telephone call after completing several steps. The first step is to check that the customer is actually an authorized customer. The second step is to check that the customer has authorized the use of this particular service. The third step is to check the customer's account balance in the centralized convergent communications system. If the request comes from a customer that has authorized the service and has sufficient account balance, the centralized convergent communications platform can issue an authorization number to the local telephone switch.

When the customer completes the telephone call, the local phone switch can then send a notification of completion of service, along with an elapsed time of the call to the centralized convergent communications platform. If the customer runs out of money in his account during the phone call, the centralized convergent communications platform can send a message via the second line to the switch to have the telephone call terminated. In either case, the pre-paid roaming customer can access his/her account and utilize the pre-paid services.

In the telecom world, different networking technologies exist in different geographies. It is the desire of the customer to travel from one place to another, e.g., from Europe to USA, and still be connected on the phone in the roaming territory with the same telephone number. Today, roaming is possible between two networks of the same type (e.g., roaming from one GSM network to another GSM network; or one AMPS network to another AMPS network, etc,). However, due to the differences in technologies, it is not possible for customers to roam between one network type to another network type (e.g., a customer with a GSM phone can not roam in a CDMA network; a customer with a AMPS phone can not roam in a GSM network). Non-roaming capability is because each technology operates at a different frequency. Therefore, mobile handsets are not compatible, call flow management in each of the telephone company network technologies is different, and subscriber identification processes in each network type is different. For example, in a GSM network a subscriber or customer is identified on the basis of IMSI, SIM Serial Number and MSISDN; in a CDMA network a subscriber or customer is identified based on MIN and ESN; and in an AMPS network a subscriber is identified based on ESN.

This problem of roaming across heterogeneous networks may be solved with either of the following two solutions: Customers can purchase a multi-band mobile handset which allows for the paging signal from the handset to be recognizable by multiple networks (e.g., a tri-band handset allows the subscriber to use the same phone in Europe as well as the USA), or roaming customers can go to the roaming service provider and temporarily rent a hand set of the different roaming network standard. Telephone companies can also ensure that the customer can be reached on the same telephone number by way of call forwarding.

However, these roaming solutions are feasible only for post-paid subscribers. They do not work for pre-paid subscribers for enabling pre-paid roaming because all the participating networks would need to work in tandem to authenticate, rate, and charge the customer home network pre-paid account. There are no commercial technologies available today in the marketplace, which can support pre-paid roaming across heterogeneous networks.

With the growth in the pre-paid subscriber base, telephone companies worldwide would like to offer pre-paid roaming across heterogeneous networks. Therefore, there is a need for a solution that can: cater to the different requirements of heterogeneous network types, obtain the relevant call control information and subscriber information from the calling or roaming network, create and send the relevant call control information and subscriber information to the home network of the subscriber, obtain not only the subscriber authentication in terms of validity of subscriber, but also authenticate the subscriber based on the profile of services that are allowed for the subscriber, pass the approval/rejection back to the calling or roaming network in the format that is required by the calling or roaming network, rate the call usage in real time, if the call is set up by the calling network or the network where the subscriber is currently present, provide usage information, and conduct multi-party settlements of the services provided across heterogeneous networks.

A customer care solution for roaming subscribers, particularly pre-paid roamers, also should have at least the following capabilities: the ability to identify the roaming subscriber when the subscriber calls into the customer care center ("CCC"); the ability to communicate to the home network and obtain information related to the customer account (balance, previous transaction history, etc.) and customer service profile (what services are allowed for the particular customer); the ability to process the customer's requests for information delivery/query response; the ability to take action on either customer account or service profile (e.g., credit/reverse amounts for dropped calls; activate new services for the customer, etc.); the ability by the subscriber to connect to the customer care system at the visiting network so that customer care can be provided (e.g., integration with the local interactive voice systems, customer care applications, etc.); and the ability to update the home database of the customer so as to maintain the customer account information integrity and allow customers to recharge his/her pre-paid account while roaming.

Pre-paid roaming also poses several challenges with respect to multiparty settlements for converged communication services. In post-paid roaming, it is the home network that collects the money from the customer. Therefore, all visitor networks send the roaming customer usage data (either directly or via a data clearing/settlement house) to the home network for settlements. In pre-paid roaming, it is possible that a customer A purchases the initial subscription from network X, but uses the pre-paid amount in network Y and recharges his account in network Z. In this scenario, there is no business obligation for network Z to pay network Y even though network Z is holding the recharge amount paid by the customer A. Moreover, network X is guaranteeing the customer payments without actually holding the money paid by the customer A. Also, for providing the payment collection or recharge service, network Z may like to charge a service fee to network X.

Currently available roaming settlement solutions only take care of settlements for telephony services that are post-paid services. They do not address the needs of the pre-paid telephony services (single or converged services), nor do they address the settlement needs of commerce transactions conducted by a pre-paid roamer subscriber in the visiting network. Hence, there is a need for a solution for a method and system that: allows for multiparty settlements of converged services and communication transactions; and allows for configuring the settlement rules for each service and commerce transaction. These rules should allow for settlements between: merchants (provider of goods/services, e.g., either manufacturer, reseller or distributor or a combination of several such entities), portals (mobile portal or any other type of portal including electronic-commerce portals, etc.), Internet service providers (independent agencies or mobile operators or portals), mobile phone companies (home network, visiting network, or both), virtual service providers (content service providers or infrastructure service providers or branding agencies or any combination), bank/credit card agencies or any other financial institutions (one or more involved in a commerce transaction), third party payment agencies (e.g., merchant aggregators, payment processing agencies or e-wallets or any such payment processing agencies), goods/service delivery agencies (e.g., courier companies, bandwidth suppliers), and insurance agencies.

Settlement rules also should allow configuration for various situations such as: (1) settlement in real time, (2) settlement with a time delay (e.g., after 2 days or 30 days, etc), (3) settlement based on confirmation of certain condition (e.g., a courier is paid only when the goods are delivered, whereas an insurance agency is paid before shipment of goods), (4) settlement based on a business relationship between the parties (e.g., a courier agency offers discounts based on volumes—that means the settlement process would take into account several deliveries rather than just one delivery), and (5) settlement based on performance (e.g., a portal is paid a small value each time an advertisement is delivered to the roaming subscriber and it gets paid a larger value if the roaming subscriber actually purchases the goods/services). Settlements should also take into account a roaming contract between participating networks (e.g., roaming surcharge). Settlements should also take into account any regulatory requirements (e.g., appropriation of taxes and settlement with government agencies).

For pre-paid services and commerce transactions to be successful, especially in mobile commerce, there is a need for a method and system that allows for recharge from any of the following: recharge voucher, direct linkage to the guarantor account (credit/debit/any other type of account), recharge by the customer from the mobile phone, or a fixed phone, directly debiting the guarantor account (credit/debit/any other type of account), recharge by the customer from a bank's ATM, or recharge by cash payment at a cash counter. Each pre-paid customer also should be able to configure his own criteria for recharge in the following manner: recharge only from phone (mobile or fixed), recharge from the net (internet, mobile internet or any other types of public or private networks), recharge only when the customer specifically asks for recharge (either thru IVR, net, or walk in, or any other manner), recharge when the balance is going below a certain value automatically from another particular account (bank debit or credit or any other type of account), do not recharge the account, but use another account as a payment guarantee for the pre-paid account, recharge several sub-accounts with pre-configured limits from the main account, recharge on a periodic basis (e.g., daily, monthly, weekly, etc.), and a recharge amount to be determined based on usage criteria as defined by the user (e.g., look at the past seven days usage and recharge the average amount; or the recharge amount should be equal to the value of the most expensive transaction conducted in the past 'x' number of days, etc.).

In a pre-paid convergent communications environment, transaction validation/authentication (whether a communications service or a commerce transaction, or a combination of both) should have several steps or checks to validate the user, as well as the availability of a credit limit or pre-paid monies associated with the account. Any solution for the communications access, internet or mobile/internet access, commerce transaction (whether done in a physical shop or on the net/mobile-net) should allow for: validation of a customer based on PIN, password, telephony related security features, or a combination of some or all of these, validation of whether the requested service/transaction is authorized or not for that particular customer pre-paid account (service profile validation), validation of availability of sufficient balance in the customer pre-paid account for the services/transaction (balance could be in the pre-paid account balance, or a credit account balance or any other type of real or virtual account associated with the customer pre-paid account).

Based on rules configured by the service provider (bank, telco or merchant or any other type of service provider), additional validations can be conducted. For example, the service provider may: ask for additional information from the user (e.g., mother's maiden name, date of birth or value of the previous transaction done, or value of the previous bill, previous recharge or matching of a personal question and answer pre-defined by the customer), ask for special passwords for high value transactions (e.g., more than $20) or high volume of transactions (e.g., more than fifteen transactions in a day, or more than fifty transactions in a month, etc.) Based on rules configured by the end user or customer, the service provider may conduct additional validations.

For example, the customer/user may request: additional passwords for certain types of transactions (e.g., buying of airline tickets), additional information to be requested by the system (e.g., date of birth, friend's name, special passwords) in case of a transaction value higher than a set of previous transactions (e.g., asking a special password if the current transaction value is 50% more than a total of the past five days transactions together). Based on rules configured by the customer/user, the system should be able to block certain types of transactions (e.g., all e-/mobile commerce transactions allowed with exception of pornography or money transfers between countries where currency restrictions exists).

Based on the rules configured as above, it should be possible for the customer care agent to talk to the customer over the phone (i.e., the system should allow for voice communication for transaction authorization while the transaction being authorized is under progress). Depending on the rules configured by the service provider, it should be possible for not charging the customer for such voice communication/additional security information usage (e.g., toll free access).

Thus, one aspect of the invention is to provide a method for providing mobile commerce, electronic commerce, customer care and communication services via a plurality of networks, the method including receiving in a roaming network from a user device, an identification number and a request for a service, forwarding from the roaming network, to a home network, the identification number, the request for the service, and adding a service provider identification number that relates to a service provider and a cost or rate of the service, if the service is to be charged, verifying, by a convergent communication platform located on the home network, that the identification number relates to a valid user account, that the user device is authorized to receive the service and that the valid user account has sufficient value to pay for the service, providing an authorization to the service provider, if the identification number relates to the valid user account, the user device is authorized to receive the service and the valid user account has sufficient value, if the service is to be charged, and charging the valid user account on a real time basis, if necessary, for providing the service, if the service is to be charged.

Another aspect of the invention is to provide an apparatus that provides mobile commerce services via a plurality of networks, the apparatus having a receiver that receives a request for a service, the request including an identification number from a user device located on a roaming network, and the service requested, a service provider identification number related to the service provider and a cost of the requested service from the roaming network, a verifier that verifies that the identification number relates to a valid user account, that the user device is authorized to receive the service and that the valid user account has sufficient value to pay for the service, a sender that provides an authorization to the service provider, if the identification number relates to the valid user account, the user device is authorized to receive the service and the valid user account has sufficient value and a charger that charges the valid user account for providing the service.

Yet another aspect of the invention is to provide a method for providing pre-paid roaming communication services via a plurality of networks, the method including receiving in a roaming network, from a user device, an identification number and a destination device number, forwarding from the roaming network, to a home network, the identification number, the destination device number, and adding a service provider identification number and a cost of a roaming communication service, verifying, by a convergent communication platform located on the home network, that the identification number relates to a valid user account, that the user device is authorized to receive the service and that the user account has sufficient value to pay for an initial use of the service, providing an authorization to the roaming network, if the identification number relates to a valid user information, the user device is authorized to receive the service and the account has sufficient value to pay for an initial use of the service, charging the valid user account for providing the service and sending a signal the user account balance reaches a predetermined level.

Another aspect of the invention is to provide an apparatus that provides pre-paid roaming communication services via a plurality of networks, the apparatus including a receiver that receives a request for a communication service, the request including an identification number and a destination device number from a user device located on a roaming network and a service provider identification number related to the service provider and a cost of the service from the roaming network, a verifier that verifies that the identification number relates to a valid user account, that the user device is authorized to receive the communication service on the roaming network and that the valid user account has sufficient value to pay for the service, a sender that provides an authorization to the service provider, if the identification number relates to the valid user account, the user device is authorized to receive the service and the valid user account has sufficient value and that sends a signal if the valid user account reaches a predetermined level and a charger that charges the valid user account for providing the service.

A further aspect of the invention is to provide a method of providing customer care services via a plurality of networks, the method including receiving in a roaming network, from a user device, an identification number and a request for a customer care service, forwarding from the roaming network, to a home network, the identification number, the request for the customer care service, and adding a service provider identification number, verifying, by a convergent communication platform located on the home network, that the identification number relates to a valid user account and connecting the user device to the customer care service, if the identification number relates to the valid user account.

Another aspect of the invention is to provide an apparatus that provides customer care services via a plurality of networks, the apparatus including a receiver that receives a request for a customer care service, the request including an identification number from a user device located on a roaming network and a service provider identification number related to a service provider from the roaming network, a verifier that verifies that the identification number relates to a valid user account, that the user device is authorized to receive the customer care service and a connector that connects the user device to a customer care provider that can provide the customer care service, if the identification number relates to a valid user account.

Yet another aspect of the invention is to provide a method of recharging a pre-paid account for services to be provided via a convergent communications platform, the method including receiving a request for authorization to use a customer account located on the convergent communications platform, determining that the customer account does not have a sufficient balance for the service to be provided, determining that the customer account has authorized a recharge mechanism, recharging the customer account using the recharge mechanism and authorizing the use of the customer account for service via the convergent communications platform.

A further aspect of the invention is to provide an apparatus that recharges a pre-paid account for services to be provided via a convergent communications platform, the apparatus including a receiver that receives a request for authorization to use a customer account located on the convergent communications platform, a determiner that determines that the customer account does not have a sufficient balance for the service to be provided and that the customer account has authorized a recharge mechanism, a recharger that recharges the customer account using the recharge mechanism and a sender that sends an authorization for the use of the customer account for the service via the convergent communications platform.

Another aspect of the invention is to provide a method for settling a pre-paid transaction to a plurality of providers in a convergent communications environment, the method including charging a charge to a user account for a transaction provided via a plurality of networks on a real time basis, determining a plurality of portions of the charge that should be distributed to a plurality of providers involved in providing the pre-paid transaction via the plurality of networks and settling with the providers via the plurality of networks according to the determined plurality of portions.

Yet a further aspect of the invention is to provide an apparatus that settles a pre-paid transaction to a plurality of providers in a convergent communications environment, the apparatus including a charger that charges a user account for a transaction provided via a plurality of networks on a real time basis, a determiner that determines a plurality of portions of the charge that should be distributed to a plurality of providers involved in providing the pre-paid transaction via the plurality of networks and a sender that settles with the providers via the plurality of networks according to the determined plurality of portions.

Another aspect of the invention is to provide a method of providing mobile commerce, electronic commerce, customer care and communication services via a plurality of networks, the method including receiving in a roaming network from a user device, an identification number and a request for a service, forwarding from the roaming network, to a home network, the identification number, the request for the service, and adding a service provider identification number that relates to a service provider and a cost or rate of the service, if the service is to be charged, verifying, by a convergent communication platform located on the home network, that the identification number relates to a valid user account, that the user device is authorized to receive the service and that the valid user account has sufficient value to pay for the service, providing an authorization to the service provider, if the identification number relates to the valid user account, the user device is authorized to receive the service and the valid user account has sufficient value, if the service is to be charged and charging the valid user account on a real time basis, if necessary, for providing the service, if the service is to be charged.

In addition, an aspect of the invention is to provide an apparatus that provides mobile commerce, electronic commerce, customer care and communication services via a plurality of networks, the apparatus including a receiver that receives an identification number from a user device, and a request for a service, a service provider identification number that relates to a service provider and a cost or rate of the service, if the service is to be charged from a roaming network, a determiner that determines, by a convergent communication platform located on the home network, whether the identification number relates to a valid user account, if the user device is authorized to receive the service and if the valid user account has sufficient value to pay for the service, a sender that provides an authorization to the service provider, if the identification number relates to the valid user account, the user device is authorized to receive the service and the valid user account has sufficient value, if the service is to be charged and a charger that charges the valid user account on a real time basis, if necessary, for providing the service, if the service is to be charged.

BRIEF DESCRIPTION OF THE DRAWINGS

These and other aspects and advantages of the present invention will become more apparent and more readily appreciated from the following description of the preferred embodiments, taken in conjunction with the accompanying drawings of which:

FIG. 8 is an exemplary embodiment of a balance of charges for a convergent communications platform;

FIG. 29 is an exemplary screenshot of vendor information for settlement in a convergent communications platform;

FIG. 30 is an exemplary screenshot of adding vendor information to a convergent communications platform; and FIG. 31 is an exemplary screenshot of adding details about merchants to a convergent communications platform.

DETAILED DESCRIPTION OF THE PREFERRED EMBODIMENTS

Figure 1:
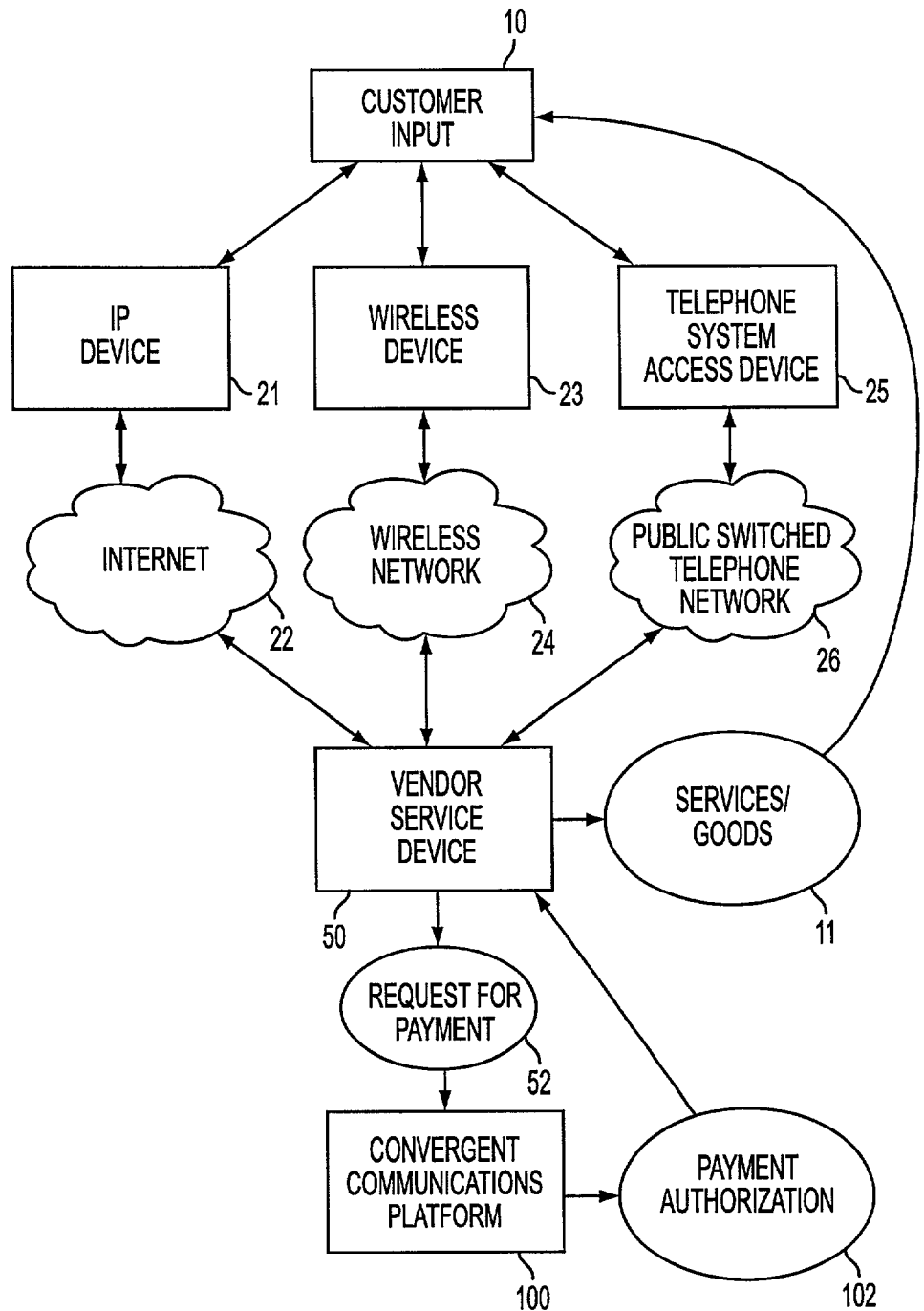
FIG. 1 is an exemplary embodiment of a system utilizing a convergent communications platform.

As described herein, the exemplary embodiments of the invention are applicable to a system, method and platform for use with heterogeneous networks and for converged (or convergent) communications, converged commerce and converged services. While various industry terms and acronyms are used, several terms have the following additional meanings as described.

Examples of heterogeneous networks are networks consisting of dissimilar or diverse technology components or constituents combined. For example, a heterogeneous network can have: different telecommunication standards, like GSM and CDMA; different versions of the same telecom standard, like GSM 900 and 1900; different switching environments, like Nokia and Ericsson; intelligent network (IN) or non-IN; different signaling, like ISDN and SS7; different operating systems, like UNIX and NT; different flavors of the same operating system, like Solaris (Sun) and AIX (IBM); different versions of the same operating system, like 2.0 and 2.1; different server hardware, like IBM and Compaq; same operators, but different network types, like KDDI CMDA and PDC in Japan; same operator, but different network, like Vodafone in different countries.

Examples of convergence are to combine a variety of technologies and media together to provide a richer level of service. For example, converged communications can combine: different media, like voice, data, messaging; mobile, fixed or satellite voice, data, messaging offered by different service providers; mobile, fixed or satellite voice, data, messaging media offered by different service providers; mobile, fixed or satellite voice, data, messaging media offered by same service provider; and mobile, fixed or satellite voice, data, messaging offered by different service providers. Converged commerce includes combining telephone, internet, e-commerce or m-commerce. Converged service includes combining communications and commerce services. Converged billing can include such features as offering a single, integrated bill for all communications services, and charges for content or goods that are delivered. Converged commerce can also refer to integrating all charges for a transaction into one transaction and cost that includes such items as surcharges, taxes, telecommunications fees, etc. Converged service can also refer to offering a single help operator that can access, view and modify a customer's account, even if the account does not reside on a local network.

A convergent interface can consist of a number of required and optional parameters, which can be configured to integrate with third party system, by analyzing the input/output parameters that the third party component(s) require, mapping the third party components to the exemplary convergent communications platform component parameters and configuring the components to resolve any conflicts. If a third party system cannot provide some optional parameters, the exemplary convergent communications platform can create dummy parameters to ensure a correct mapping.

Examples of a platform include a system that provides a base for additional endeavors. For example, a communications platform such as a telephone system allows for data to flow across it for communication in many ways. Similarly, a convergent communications platform can allow a variety of technologies to merge, allowing for enhanced mobile commerce, electronic commerce and customer care.

Examples of enhanced services include such features as reformatting. An enhanced service can, for example, reformat a data request from one system so that it is acceptable to a second system; reformat information with reference to stored information such that the reformatted information includes information not available to the originating device.

FIG. 1 is a block diagram of an exemplary system utilizing a convergent communications platform. As seen in FIG. 1, the customer via his/her input 10 connects through device IP 21, wireless device 23 or telephone system access device 25, and the internet 22, wireless network 24 or publicly switched telephone network 26 to a vendor (i.e., a service provider) service device 50. The vendor service device 50 then connects to convergent communications platform 100 via a request for payment 52. The convergent communications platform 100 then returns a payment authorization 102 to the vendor service device 50. The vendor service device 50 then can deliver or confirm delivery of the services/goods 11 back to the customer input 10.

In this exemplary system, a customer wishing to engage in mobile commerce can quickly and efficiently receive the services/goods he desires. For example, if a customer wishes to buy an MP3 file from an electronic music vendor, the transaction can work as follows.

The customer, operating the customer input 10, attempts to connect to the music vendor via the vendor's service device 50. The customer input 10 can be connected to any one of the IP device 21 the wireless device 23 or the telephone system access device 25. The IP device 21 can be a network card, a WAP connection device, an SMS messaging device, or any other now known or later devised device for connecting to an internet protocol network.

Wireless device 23 can be a mobile phone, a cellular phone, or any other device that uses radio waves or electromagnetic energy to communicate with the wireless network 24. The telephone system access device 25 can be a modem, a router, a cable modem, or any other device that can connect to the publicly switched telephone network 26.

The internet 22 can be any combination of switches, routers, hubs, microwave devices or other communications equipment that can transfer internet protocol messages from one point to another. The wireless network 24 can be any system of radio towers and switches and other devices such that a wireless device 23 can connect to a vendor service device 50.

The publicly switched telephone network 26 can be any combination of circuit switch, packet switch, or other devices suitable for connecting a telephone system access to the vendor service device 50.

If the customer input 10 was a wireless device 23 and connects through the wireless network 24 to the vendor's service device 50, the vendor service device can be a morse or numeric recognition system such that the customer input 10 can adequately specify a request to purchase the MP3 from the vendor service device 50.

The vendor service device 50 can be any combination of a web server, a voice server, an SMS messaging server, or Wireless Access Protocol (WAP) server capable of conducting mobile commerce and deliver or confirm delivery of services or goods to customer input 10. The vendor service device 50 receives the customer request for an MP3 file and generates a request for payment 52. The request for payment 52 is sent to the convergent communications platform 100.

The convergent communications platform 100 then checks that the user or customer is an authorized user, that the user's account has been authorized to conduct this type of mobile commerce, and that the customer account contains enough money or funds to enable the service. If the user's account has the correct authorization and funds, the convergent communications platform 100 generates a payment authorization 102 and sends it back to the vendor's service device 50.

The vendor's service device 50 then generates the services or goods, in this case an MP3 file, and sends the MP3 file by any of the internet 22, wireless network 24, publicly switched telephone network 26, or any other shipping network to the customer network or customer input 10.

In various exemplary embodiments, the above-mentioned steps can be automated by the system to a greater or lesser extent. In a fully automated environment, the customer input 10 may be an MP3 player connected with a wireless device 23 to a wireless network 24, that automatically sends either authorization and routing data to the vendor service device 50. Thus, all a user has to do is open the device and select that they would like to purchase a new MP3 file. The device then automatically connects to t he MP3 vendor, and displays a list of songs for the user to purchase. The user can then simply select the song he wishes to purchase, and then begin downloading the song as all other individual tasks happen in the background.

In another exemplary embodiment, additional security for authorization of a request for services/goods and payment may be utilized through the use of a pin, a smart card, a magnetic read/write device, a barcode, a magnetic strip, a raised alpha numeric character, or any other antifraud method as now known or later devised, or described in relation to FIG. 27.

Figure 2:
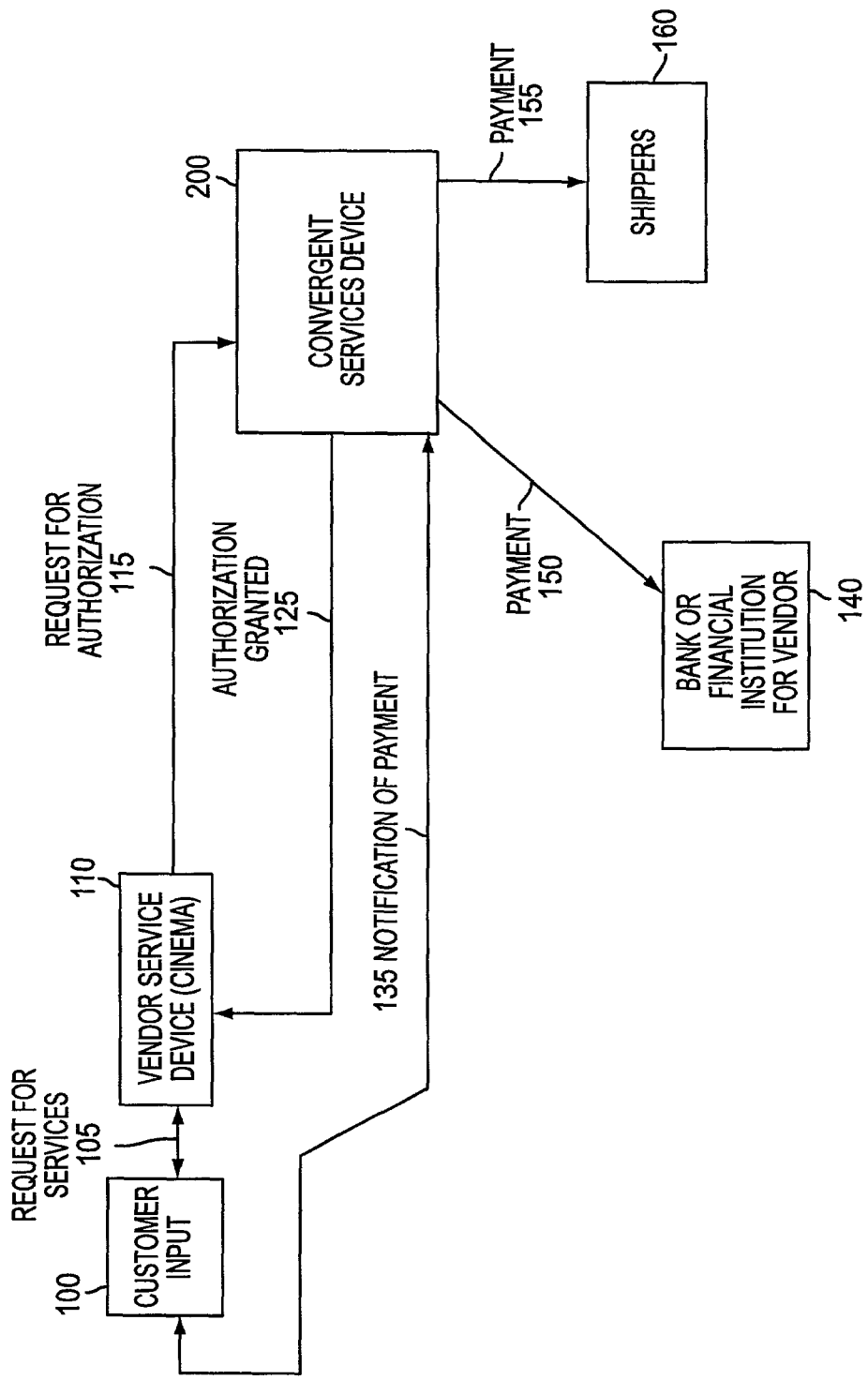
FIG. 2 is an exemplary embodiment of utilizing a convergent communications platform for mobile commerce.

FIG. 2 is a block diagram showing an exemplary system for utilizing a convergent service device in mobile(m)-commerce or electronic (e)-commerce. As shown in FIG. 2, customer input 100 sends a request for services 105 to a vendor service device 110. The vendor service device 110 then sends a request for authorization 115 to the convergent services device 200. The convergent services device 200 then sends the authorization granted 125 to the vendor service device 110, and a notification of payment 135 to the customer input device 100. The convergent services device 200 then sends a payment 150 to the bank or financial institution for the vendor 140 and payment 155 to the shipper 160.

In this exemplary embodiment, the customer via his input device 100 requests to buy tickets for a cinema. The customer can open his/her customer device 100 or activate it such that a request for services 105 is sent to the vendor service device 110. The vendor service device 110 can be any now known or later devised device for voice recognition or digit interpretation such that the user can select the particularized movie tickets for the particularized movie house that he/she wishes to visit. In addition, the vendor service device 110 can operate for any known business, not just a cinema. For example, concert tickets or other items could be purchased.

After the user enters the request for services 105 into the vendor service device 110, the vendor service device 110 can generate a request for authorization 115. The request for authorization 115, can include such information as the customer ID, the cost for the services and the vendor identifier (ID).

Once the convergent services device 200 receives the request for authorization 115, it can check the user's pre-paid account associated with the user's ID, check that the account is authorized for purchase of movie tickets, and check that the customer's account has sufficient balance. If the account has sufficient balance, the account is authorized for the transaction, and the account is a valid account, the convergent services device can send an authorization granted 125 to the vendor service device 110 and a notification of payment 135 to the customer input device 100.

The customer can then pickup the movie tickets from the movie theatre by any method now known or later devised. For example, the user can enter a dispensing machine identification number, and have the dispensing machine simply dispense the movie tickets. Other means as are known in the art, such as Federal Express delivery, entering an authorization code to a pre-existing machine, and identifying oneself to a vendor representative can be used as is well known in the art.

In various exemplary embodiments, the convergent services device 200 may not send the payment to the vendor services device 110. The convergent services device 200 may send the payment to a bank or financial institution associated with the vendor 140. Alternately, the convergent services device 200 may simply authorize a transfer from a bank or financial institution associated with the customer or user to the bank or financial institution for the vendor 140. In addition, the convergent services device 200 may authorize a payment to shipper 160 which can then perform delivery.

Figure 3:
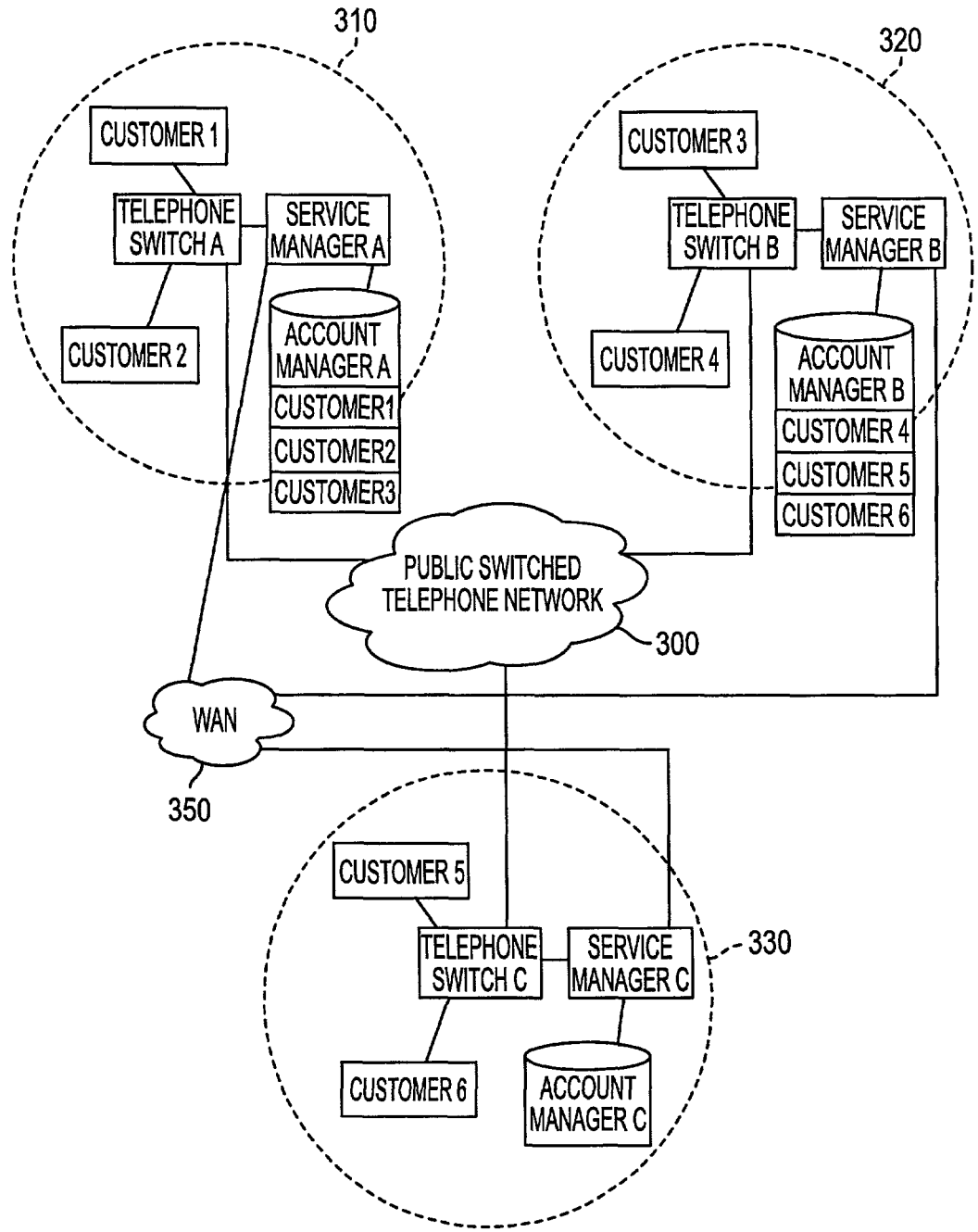
FIG. 3 is an exemplary embodiment of utilizing a convergent communications platform for pre-paid roaming.

FIG. 3 is a diagram showing an exemplary system enabling pre-paid roaming with a convergent communications platform. In FIG. 3, area 310 has customer 1, customer 2, telephone switch A, service manager A and account manager A in it. Account manager A includes the customer accounts for customer 1 customer 2 and customer 3. Area 320 has customer 3, customer 4, telephone switch B, service manager B and account manager B in it. Account manager B includes the customer accounts for customer 4, customer 5 and customer 6. Area 330 has customer 5, customer 6, telephone switch C, service manager C and account manager C in it. Area 310, area 320 and area 330 are connected by a publicly switched telephone network 300 and a wide area network (WAN) 350.

The use of the wide area network 350 has a secure passage for account information to enable pre-paid roaming. Thus, if all customers 1–6 are pre-paid customers with accounts in either area 310 or area 320, the exemplary embodiment enables them to use their pre-paid accounts regardless of the area they are in. Various examples will be described below.

Pre-paid roaming can operate as illustrated in the following steps. Customer 1 in area 310 seeking to call customer 2 in area 310 activates his/her device. When the device of customer 1 is activated, the telephone switch A picks up the signal and forwards the request for service to service manager A. Service manager A then checks with account manager A that customer 1 is a valid customer and has an account balance or funds remaining in his/her account. The service manager A also checks that customer 2 is a valid customer with an account balance or funds left in his/her account to receive the phone call. The service manager A after clearing that all accounting information is correct, completes the call.

However, if customer 1 in area 310 wishes to call customer 3 in area 320, under existing systems, there would be a problem. Customer 1 would activate his/her device, and enter in the identification number of customer 3. The telephone switch A would then receive the request for service, and forward it to service manager A. Service manager A would then check that customer 1 and customer 3 are valid customers, and attempt to complete the communication. The service manager A would then work through telephone switch A and a publicly switched telephone network 300 to attempt to reach customer 3. However, at telephone switch B, since customer 3 does not have an account with account manager B, the telephone switch B would not have authorization to complete the telephone call.

However, in various exemplary embodiments of the invention, the telephone switch B would forward the request for service to service manager B, which would realize that customer 3 does not have an account in account manager B, and would therefore forward the request through the wide area network 350 to service manager A. Service manager A would then verify that customer 3 was a valid customer with funds remaining in his/her account. Service manager A would then authorize the call through the wide area network 350 to service manager B, which would tell the telephone switch B to complete the call. If customer 1 or customer 3 were to run out of money or account balance during the course of the telephone conversation, service manager A would forward a signal to either telephone switch A or through the wide area network 350 to service manager B to discontinue the telephone conversation.

In the existing systems for pre-paid telephone service, if customer 1 wanted to contact customer 4, customer 1 would activate his/her user device to contact customer 4. The request for service would be received by telephone switch A, which would then send a signal to service manager A authorizing the service if the customer 1 pre-paid account in account manager A was current. The service manager A would then authorize the service as the receiving customer 4 was not part of its account nor on its network. The telephone switch A would then forward the request for service through the publicly switched telephone network 300 to telephone switch B. Telephone switch B would then check that customer 4 was within its area, and check with service manager B that customer 4 had an account. Service manager B checking with account manager B would verify that customer 4 was a current account holder with a remaining balance. Service manager B then would authorize telephone switch B to complete the telephone call and then customer 4 then would be contacted.

However, if customer 1 in area 310 wanted to reach customer 5 in area 330, the known system would not work for reasons detailed above. However, under various exemplary embodiments of the current invention, customer 1 would activate their access device to attempt to call customer 5. Telephone switch A would receive the request for service and forward a clearance request to service manager A. Service manager A would then check with account manager A that customer 1 was a valid customer with balance remaining and that customer 5 was not a customer on its network. Telephone switch A would then forward the request for service through the publicly switched telephone network to telephone switch C, which has customer 5 registered as being in its area. Telephone switch C would then go to service manager C which would verify that customer 5 does not have an account in account manager C. Service manager C would then ask account manager B through wide area network 350 to authorize the communication. Once the communication was authorized by the service manager B after checking in account manager B that customer 5 is a valid customer with a remaining balance, the telephone switch C would authorize and complete the phone call between customer.

Several cases can be summarized as follows.

Case 1: customer 1 and customer 2 both are in home network, customer 1 dials to customer 4.
1. Customer 1 dials customer 4.
2. Since customer 1 is a pre-paid subscriber, telephone switch A routes the signal to service manager A.
3. Service Manager A routes the signal to Account Manager A.
4. Account Manager A identifies that the personal identification of customer A belongs to the home network, the DNIS (MSISDN of customer 4) does not belong to network 310, and the call is being originated from network 310.
5. Service manager A authenticates customer 1 and replies to telephone switch A.
6. Telephone switch A sends the call to telephone switch B via the public switched telephone network (PSTN).
7. Telephone switch B receives the call via the PSTN network and routes a signal to service manager B as customer 4 is pre-paid.
8. Service manager B receives the signal and authenticates customer 4 through account manager B.
9. Service manger B sends a MAP query and locates a serving telephone switch B for customer B.
10. Service manager B sends a page signal to telephone switch B.
11. Telephone switch B starts paging customer 4.
12. As customer 4 answers the call service, service manager B starts rating for customer 4 and service manager A starts rating for customer 1.

Case 2: customer 4 is in his home network and customer 3 is roaming in customer 4's home network, and customer 3 dials to customer 4.
1. Customer 3 dials customer 4.
2. Since customer 3 is a pre-paid subscriber, telephone switch B routes a signal to service manager B.
3. Service manager B routes it to service manager A.
4. Service manager A identifies that customer 4 belongs to network 310 and customer 2 does not belong to network 310.
5. Service manager A authenticates customer 3 and routes a signal to telephone switch B.
6. Telephone switch B routes signal to service manager B as customer 4 is a pre-paid subscriber.
7. Service manger B authenticates customer 4 as belonging to network 320 through account manager B and sends a MAP query to locate the serving MSC of customer 4.
8. Telephone switch B replies back, and is instructed to call.
9. Telephone switch B starts paging for customer 4.
10. As customer 4 answers the call, service manager B starts rating for customer 4 and service manager A starts rating for customer 3.

Case 3: customer 5 and customer 3 both are roaming, and customer 5 dials to customer 3.
1. Customer 5 dials customer 3.
2. After verifying IMSI (or any such unique identifier) of customer 5, telephone switch C determines customer 5 as a pre-paid subscriber and routes a signal to service manager C, which in turn routes it to service manger B.
3. Service manager B identifies customer 5 as a roaming subscriber and authenticates it by querying to account manger B.
4. Service manager B replies back to service manager C that customer 5 is valid for further routing.
5. Service manager C routes the authorization to telephone switch C.
6. Telephone switch C routes a signal via the PSTN to telephone switch A as customer 3 is a pre-paid subscriber.
7. Service manager A authenticates customer 3 and sends a MAP query to locate serving MSC of customer 3.
8. Service manager B replies back to service manager A, which forwards the routing information to telephone switch C.
9. Telephone switch C routes the call to serving MSC, i.e. telephone switch B.
10. Telephone switch B starts paging for customer 3.
11. As customer 3 answers the call, service manager A starts rating for customer 3 and service manager C starts rating for customer 6.
12. When either party disconnects the call, service manager C updates account manager B over WAN.

Figure 4:
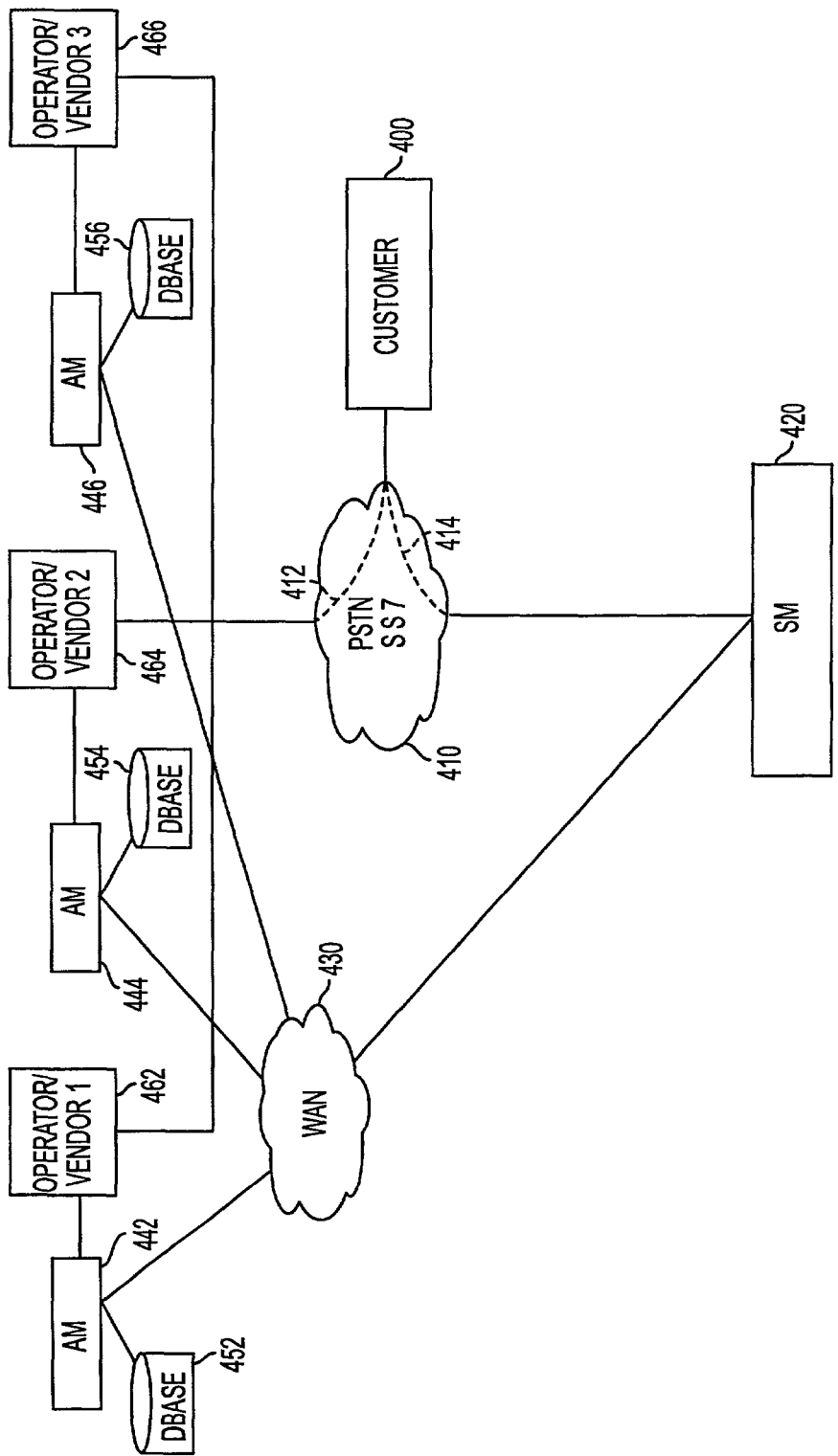
FIG. 4 is an exemplary embodiment of utilizing a convergent communications platform for customer care.

FIG. 4 is a diagram showing an exemplary embodiment of a universal or network independent customer service system. In FIG. 4, customer 400 accesses the publicly switched telephone network or SS7 network 410 via path 414 to contact service manager ("SM") 420. The service manager 420, can connect to account manager ("AM") 442, account manager 444 or account manager 446 through wide area network ("WAN") 430. Service manager 420 can then reroute customer 400 using path 412 to connect customer 400 to any of operator/vendor 1 at 462, operator/vendor 2 at 464 or operator/vendor 3 at 466 who can then access the appropriate account manager 442, 444 or 446 to give the customer his/her customer care service. Account manager 442 can connect to customer information in data base 452 or to customer information in data base 454 via wide area network 430 or customer information in data base 456 through wide area network 430. Thus, a customer can have a single telephone number to call for customer care service regardless of the customer's actual location.

Figure 5:
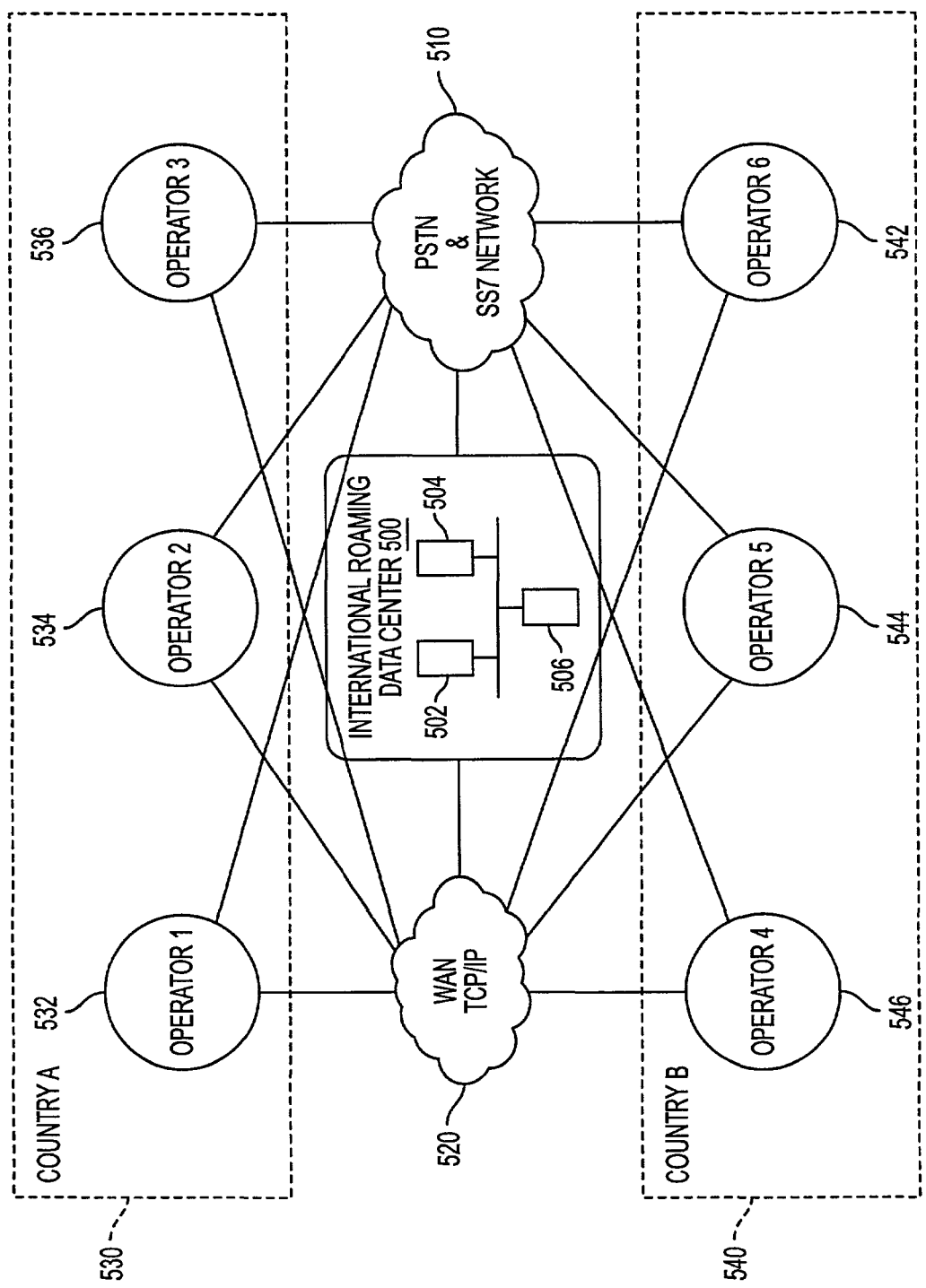
FIG. 5 is an exemplary embodiment of an international system utilizing a convergent communications platform.

FIG. 5 is a diagram showing that each operator runs multiple switches in its home country (home geographic area). Each has joined an international roaming service based on a centralized roaming data center model. This data center can be managed either by one or more telephone companies or by a third party. As shown in FIG. 5, operator 1 532, operator 2

534 and operator 3 536 are in country A 530 and are connected to both WAN or TCP/IP network 520 and PSTN & SS7 network 510. Further, operator 4 546, operator 5 544 and operator 6 542 are in country B 540 and are connected to both WAN or TCP/IP network 520 and PSTN and SS7 network 510. Both WAN or TCP/IP network 520 and PSTN and SS7 network 510 are connected to international roaming data center 500. International roaming center 500 can contain servers 502, servers 504 and servers 506.

Each of servers 502, 504 and 506 can operate as described above to authenticate customers and route requests for service. Thus, FIG. 5 shows that service managers and account managers as described above can be located at any location, not necessarily within the calling area of the home network. The network can be GSM, CDMA, TDMA, AMPS, DAMPS or any other network standard, including 2.5 G and 3 G. It is possible but not necessary to run over several SM/AM's with a switch that routes the messages to a specific convergent communications platform. The switch into the exemplary convergent communications platform system is optional in that if it is installed, the addresses can be local, to the international roaming data center. Otherwise, the addresses must be international addresses.

Customer care for roaming customers could be handled exactly as mentioned above. However, with large implementations of many operators across many countries, it would be impractical that each participating telephone company need set up call control equipment (Switch Manager servers) at all of its switching sites. A customer account management and business support system (Account Manager) would be used by all participating telephone companies to manage their respective subscribers, create/manage their rate plans, and to give the Switch Manager(s) the IMSI/MSISDN (unique subscriber identifier) information on which to identify and rate each customer call. Account Manager may or may not be distributed depending on the business situation.

Figure 6:
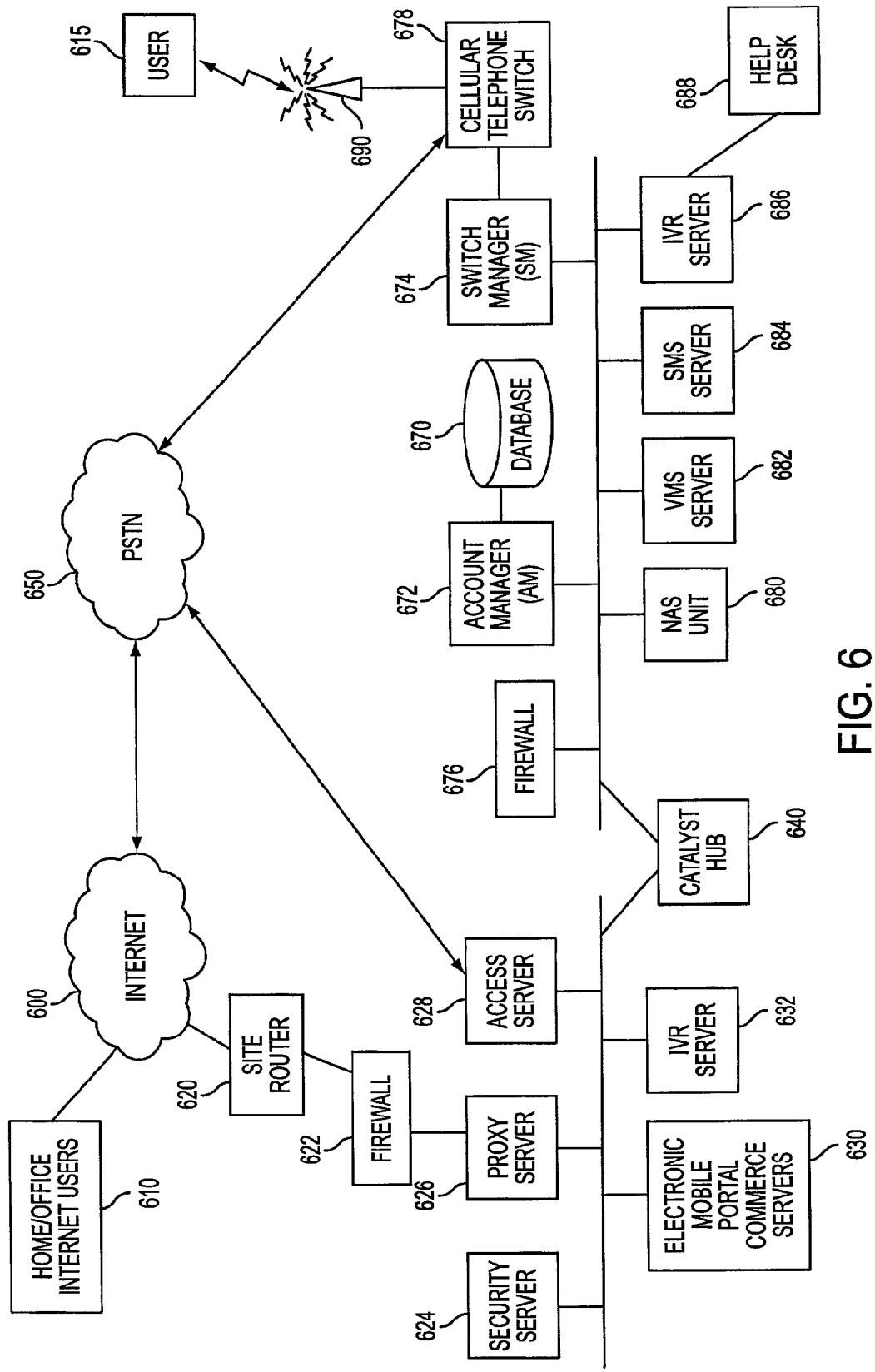
FIG. 6 is an exemplary embodiment of a system utilizing a convergent communications platform.

FIG. 6 is a diagram showing a centralized account manger 672. In one example, one Account Manager can cater to several telephone companies in a centralized fashion. In another example, it is also feasible to have multiple Account Managers deployed in a highly distributed fashion, each Account Manager catering to a specific telephone company, or any combination thereof. As shown in FIG. 6, a user 615 can connect via radio or cellular tower 690 to cellular telephone switch 678. Cellular telephone switch 678 is connected to PSTN 650 and switch manager 674. Switch manager 674 is connected via a network to interactive voice response (IVR) server 686, simple message server (SMS) 684, voice mail server (VMS) 682, network account services (NAS) unit 680, firewall 676, account manager (AM) 672 and catalyst hub 640. The IVR server 686 is connected to help desk 688. The AM 672 is connected to database 670. Catalyst hub 640 is connected to access server 628, IVR server 632, electronic mobile portal commerce servers 630, proxy server 626 and security server 624. Home/office users 610 are connected to the Internet 600, which is connected to the PSTN 650 and site router 620. Site router 620 is connected through firewall 622 to proxy server 626.

Thus, the convergent communications system as shown in FIG. 6 can enable the use of an international roaming data center, and accommodates various specialized servers for providing services. For example, NAS unit 680 can be designated as a rating calculating server. Other modifications and arrangements for accommodating various business practices can be incorporated without departing from the spirit and scope of the invention.

Thus, a switch manager can be centralized within the international roaming data center (IRDC). Each participating network can be connected to the central switch manager via signaling link (SS7, etc). Given that this is possible, each participating network operator would require only one instance of a service manager running at the IRDC to manage that operator's roaming service. It is possible to deploy several service manager instances on one single server or each instance may be running on its own dedicated server, or a combination where one service manager server acts as a back-up/stand by for the other.

The SM assigned to each operator would combine the activity of each of the SMs described in the roaming section above. The individual MSCs in each operator's region would identify callers, verify that their home networks are participating roaming partners, assign them their MSRNN, etc. When the MSC hands off the signal to the SM, however, the control traffic would not just transit the switch room, but rather transit the international SS7 network to the IRDC. SM identifies the call origination point and it would be able to determine the caller's home location. Then, the SM would take care of authorization, and rating based on the originating switch network code (and originating cell ID, etc.), and the appropriate rate tables for the MOC and MTC parts of the call.

As described above, inter-operator settlement would be handled at the IRDC. Rules based division of revenue would be managed and real-time, daily, weekly or monthly settlement of net revenues carried out. The exemplary convergent communications platform handles calls over heterogeneous networks as follows:
  1. SM & AM can be configured for multiple network types; network-specific information for GSM, CDMA, TDMA, AMPS, etc.; signaling parameter control information; subscriber authentication-specific information; and communication protocol information.
  2. Roaming agreements and rules are setup for the relationships between operators for services and commercial transactions: per unit charge, surcharges, taxation, etc, settlement format, period, account information, etc.
  3. Subscriber set up: service profile information, to include available network types for roaming, and subscriber identification information for each network type.
  4. Calls can be handled in the following manner:
     a. SM receives the incoming call signal.
     b. Identifies the network type.
     c. Checks the information required for that network type (i.e., the unique identifier).
     d. Checks whether this is a home or visiting network call.
     e. Generates a signal to the home network using the appropriate parameters required for that network type.
     f. Authenticates the user/subscriber back to the visiting network, confirming service validity from subscriber service profile
     g. Rates the call from the visiting network type to the user's account (checks balance, confirms availability).
     h. If balance runs out or call terminates: SM confirms termination, sends post transaction info to home network database and conducts settlement As the business can be increasingly competitive, mobile operators worldwide are seeking to offer several value added services, like data, fax, simple message server, and mobile commerce, to their customers on their home networks. Also, these value-added services are increasingly being offered to post-paid roamers. Mobile operators would like to offer such services to their pre-paid roaming subscriber as well, but are limited by their operator-specific equipment and systems.

Figure 7:
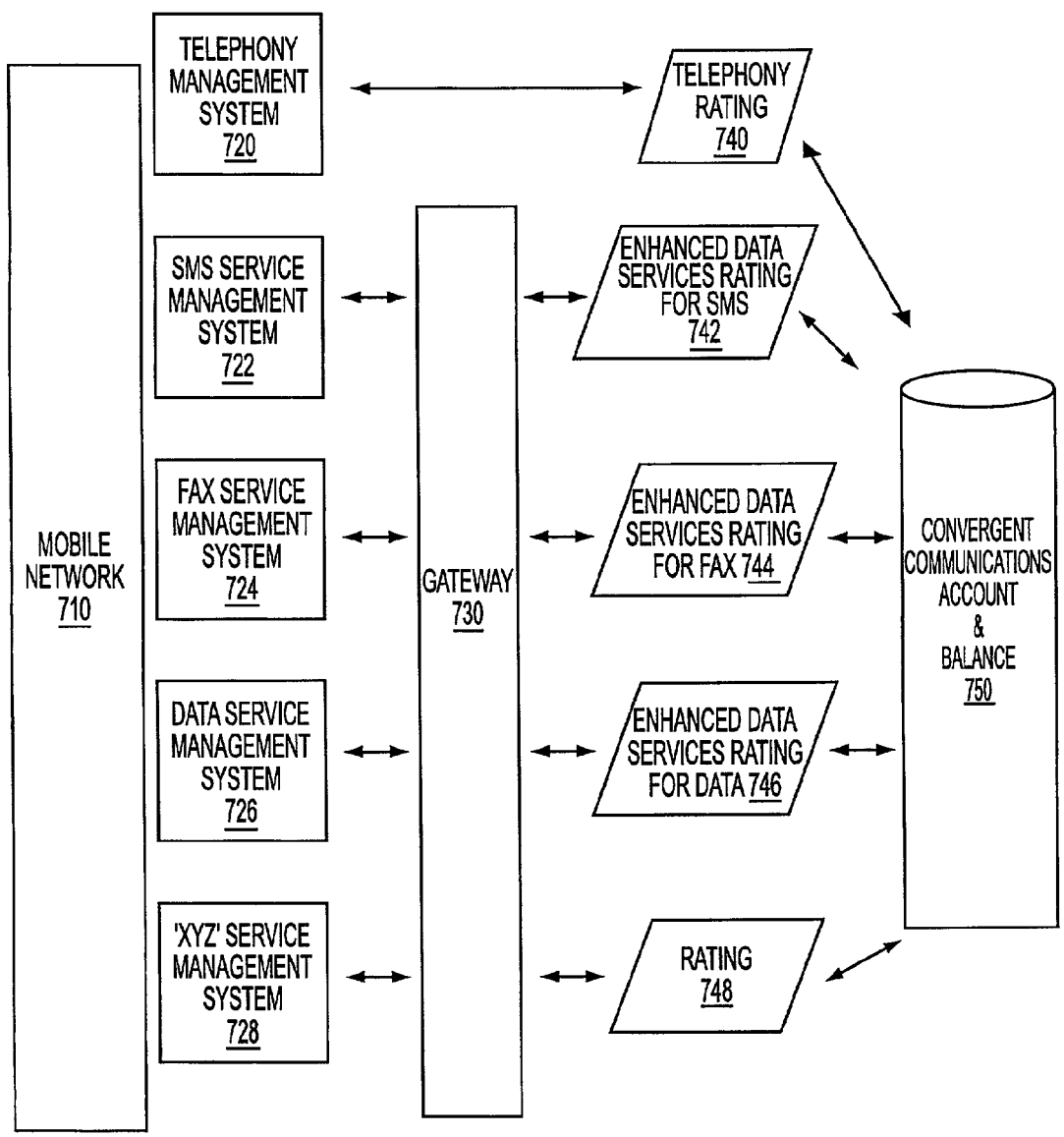
FIG. 7 is an example of the architecture for enabling enhanced data services with a convergent communications platform.

FIG. 7 is a diagram showing a mobile network 710 having a telephony management system 720, SMS service management system 722, FAX service management system 724, data service management system 726, and other "XYZ" management system 728.

Some of these services being charged to customers may be time-based and others event-based. In real life deployments, it may or may not be possible to control the authorization/usage of all the value-added services over signaling link. Telephony services can be controlled over signaling link; however, for services like fax, SMS, mobile commerce, it may not be feasible to control the authorization/usage over the signaling link.

For telephone company or other communication operators to offer such value added services to the pre-paid roaming subscribers, it is necessary that some interfaces be built where usage records are collected and processed at frequent intervals (e.g., every one minute or five minutes). However, considering the possibility of high value transactions, commerce services need to be processed in real-time as the transaction takes place.

FIG. 7 explains how an exemplary embodiment of a convergent communications platform system manages the use of such value-added services for pre-paid roamers. Mobile network 710 can access a telephony management system 720, an SMS service management system 722 and a fax service management system 724, a data service management system 726 or XYZ service management system 728. Telephony management 720 can access the telephone rating 740 which can then connect to the convergent communications platform pre-paid account and balance 750. SMS service management system 722, fax service system 724, data service management system 726, and XYZ service management system 728 can connect to gateway 730 to thereby access the enhanced data services rating for SMS 742, enhanced data services rating for fax 744, enhanced data services rating for data 746 and the enhanced data services rating 748. The enhanced data service rating for SMS 742, the enhanced data services rating for fax 744, the enhanced data services rating for data 746, and the enhanced data services rating 748 can connect to the convergent communications platform pre-paid account and balance 750.

Before a value-added service is authorized, the external system (i.e., system that is providing the value-added service) makes a request through the gateway to the exemplary convergent communications platform system. Details of the exemplary convergent communications platform system are not shown in FIG. 7, but described and/or shown herein. Based on the rating tables, the pre-paid account available account balance, and the permitted services profile analysis, the exemplary convergent communications platform either authorizes the transaction or rejects the transaction to the external system via the gateway 730. For each authorized transaction, the external system provides the value-added service to the pre-paid roamer customer. At the end of the usage (or at the end of a pre-defined quantum of time), the external system generates an enhanced data rating (EDR), which is sent to the exemplary convergent communications platform system via the gateway. The exemplary convergent communications platform initiates an EDR rating process for each such record, and process the EDR and updates the customer account balance information in the exemplary convergent communications platform database.

It is possible that a pre-paid roamer may use one or more value-added services while the telephony usage is going on. In that scenario, the exemplary convergent communications platform system, as will be explained further herein, would initiate a telephony rating process for the telephony usage. The exemplary convergent communications platform also simultaneously processes the EDRs using EDR rating tables, EDR rules, and process. To avoid any deadlock situations or significant balance overruns, the exemplary convergent communications platform provides for priority allocation of money in the pre-paid customer account for the telephony service (e.g., reserving an amount for a certain predefined period of usage). In this architecture, it is also possible that due to delayed posting of EDR records, the pre-paid roamer user account balance may go below zero. Such a situation is avoided by way of pre-allocating money for the value-added service when the service authorization request arrives.

For example, the customer calls from a visiting network area. The exemplary convergent communications platform handles the call rating as follows:

1. Subscriber calls in via: IVR, walk-in, internet/mobile internet, and any other means
2. The exemplary convergent communications platform validates the subscriber either by telephone number, user-given PIN or other information, or by validation that can be automatic or manual.
3. The IVR locates the customer home account.
4. The IVR sends a query to the customer home account to obtain account information and service profile.
5. The IVR analyzes/processes the query: information service is handled by the CCC, account-related service queries generate further queries to the home network through the exemplary convergent communications platform and recharge service is handled as described later.
6. The customer then connects to the Internet through a WAP service provided by the visiting network, and makes a purchase through a merchant site.
7. For payment authorization, the merchant site (or any other service provider asking for authorization) to the exemplary convergent communications platform at the home network via an IP network (public or private network).
8. The convergent communications platform then verifies with the home network authorization database that the customer is authorized for the commerce transaction (service profile validation) and obtains the location of the customer.
9. The convergent communications platform then makes a request to the convergent communications platform components, which are handling the call at the visitor network (in a distributed architecture these components could be at the visitor location).
10. The convergent communications platform makes a request via a WAN link, either dedicated or public. In a centralized architecture, these components could be available locally.
11. The convergent communications platform makes an authorization request via a network.
12. Once the authorization goes through, the exemplary convergent communications platform component (either at the home network or at the visiting network depending on which type) would commit the complete transaction to the home network database to ensure information consistency.
13. Based on the settlement rules, the exemplary convergent communications platform conducts settlements.

The authorization request could be of two types: Type 1: Tell me what is the current balance of the customer; and block 'X' amount of money towards a commerce transaction ('X' being the amount requested by the merchant for authorization plus any service charges imposed by the home/visiting networks based on the roaming agreement). In this scenario, final authorization is handled by the home network itself. Type 2: Please handle the commerce transaction and deduct X amount if authorized ('X' is the amount requested by the merchant for authorization plus any service charges imposed by the home/visiting networks based on the roaming agreement). In this scenario, it is the commerce rating process at the visiting network, which handles the complete transaction and generates the settlement records for further processing.

In another example, customer A, who is local to network X, has roamed into network Z. He needs to top up/recharge his pre-paid account. The exemplary convergent communications platform can allow this in the following ways:

1. He can purchase a voucher from operator Z in the market.
2. He dials the network Z IVR number.
3. The IVR system, reading his MSISDN number, determines from the network code that he is not a local subscriber.
4. Having the network ID, the IVR makes a query over the TCP/IP network to the LAUT database of network X, where it determines the talk time of Customer A's home network for the value of the voucher purchased.
5. The LAUT database is then updated on the home network.

This process ensures that any money related to recharge is always forwarded to the home network even if it is recharged in any of the visiting networks. Following a successful roaming call, the revenue billed by the exemplary convergent communications platform switch manager must be divided between the partner networks according to their roaming tariff agreement.

The roaming tariff agreement can be stored in any of several locations. The agreement can be stored on the convergent communications platform, a separate billing server, or any other place that supports the settlement of accounts. In addition, the rules for settlement can be located on the convergent communications platform, a separate billing server, or any other place as determined by the parties to the agreement. In addition, the agreements can be between the operator of the convergent communications platform, companies doing business with the operator, the customer, and governments.

At the completion of an arbitrary time period, generally once per day, all Call Description Records (CDRs) for roaming calls are transferred to a settlements process. Alternatively, it is also possible to create usage records in industry standard formats like TAP/Cyber for forwarding the information for settlement purpose. This can be part of each operator's back office, or handled via a clearinghouse running on an application service provider (ASP) model. The exemplary convergent communications platform can compare the revenues of each operator with respect to its partners and organize final net transfers.

These transactions can be stored on the convergent communications platform or off, though the preferred embodiment is for use of a multidimensional database provided on the convergent communications platform. If the preferred embodiment is used, the multidimensional database can store all aspects of the transaction as a dimension, with various dimensions settling at various times according to agreements between the partner networks or vendors. Also, where access is available, the customer may choose his long distance carrier. In such a scenario, the exemplary convergent communications platform would settle the PSTN mobile terminated call in the visiting network with the long distance carrier instead of the home plan long distance mobile network. Also, it is possible that the home plan long distance mobile network and visiting plan long distance mobile network can also be a home plan mobile network and visiting plan mobile network (i.e., to cover the global planned roaming system or 3 G networks). It is also possible that the home network and visitor network may not be based on GSM technology, but instead may be based on another mobile technology.

The exemplary convergent communications platform system can be connected with the telephone company network to act as a pre-paid roaming service management system. In addition, the exemplary convergent communications platform can also be interconnected with a merchant system for managing merchant transactions. Settlements rules for each merchant and network partners are configured on the exemplary convergent communications platform settlement system. The exemplary convergent communications platform controls the payment transaction related to the services or commerce transaction provided. The exemplary convergent communications platform, based on the settlement rules, would settle payments for all the parties involved in the services and/or transactions.

For items like volume discounts, bundled services, the exemplary convergent communications platform can post the appropriate information to the data tables. Periodically (e.g., every minute, day, etc.) the exemplary convergent communications platform would analyze such information and conduct settlements for such services.

The exemplary convergent communications platform can be deployed at a central site and connected to the telephone company network, merchant network and guarantor's customer account system. The exemplary convergent communications platform allows dynamic interaction between a rating engine or table for voice, data and/or events and a customer's pre-paid account. At the choice of the user (either selected every time, or the system itself selecting automatically based on user defined criteria), money can be transferred from a guarantor's customer account (any type of account) to the exemplary convergent communications platform customer pre-paid account.

The exemplary convergent communications platform customer pre-paid account is used for the commerce and communications transaction payment processing. In case the customer's balance runs out in the exemplary convergent communications platform account, the exemplary convergent communications platform account can be recharged as desired by the customer, such as through a guarantor's customer account in a bank mutual fund, or the like. The exemplary convergent communications platform also allows for the simultaneous processing of commerce, communications and data transactions on the plafform's single customer pre-paid account. For every transaction, the exemplary convergent communications platform can also settle payments between all the parties involved in providing the service and/or transaction to the customer.

For example, if John Smith has a bank account (BA001) and a convergent communications platform account (UP987), John Smith can associate his bank account BA001 with his pre-paid platform account UP987. BA001, of course, can be a savings, checking, debit, credit or any other type of account. Moreover, the bank can be some other type of entity that guarantees funds to a customer. Based on the bank-defined criteria, the bank agrees to stand as guarantor for a certain amount for the convergent communications platform account limit on behalf of John Smith. For example, BA001 has $1500 in the customer account and the bank may allow the convergent communications platform customer account limit to be $100. The actual amount in the exemplary convergent communications platform account could vary depending on several factors like John Smith's banking history, amount John Smith would like to have in the exemplary convergent communications platform account, any terms and conditions imposed by the telephone company, merchant community, local regulatory agencies, etc. John Smith can use the exemplary convergent communications platform pre-paid account to pay for any mobile commerce, or communication services using the exemplary convergent communications platform account, with a recharge using the associated customer bank or guarantor account.

For example, in case a user runs out of money in his convergent communications platform account, he can recharge his platform account from BA001. He can further create sub accounts to the convergent communications account (say UP001, UP657, etc.) and use them for specific purposes (e.g., gifting to his family with or without restrictions on what type of services allowed for them, or use one account for online and another for offline transactions, etc.). He can also either set limits for each of his sub account (budget control) or use the main account limit (the convergent communications account) as a free flow limit for all of the sub accounts put together. In any case, bank's guarantee for the customer payment is limited to the amount specified for the exemplary convergent communications platform account.

Also, BA001 need not be a single account and the limit of UP987 need not be a small portion of BA001. For example, BA001 can be a virtual account which combines the entire financial portfolio of John Smith (e.g., balance in savings account, credit account, checking account, current market value of all stocks/mutual funds, etc., held by John Smith) and which can be taken into account to arrive at a monetary number for BA001. Also, the limit at the convergent communications account can be higher or lower or equal to the amount in the BA001 account.

The exemplary convergent communications platform enables the following scenarios: authorization based on only a balance in the convergent communications platform account, authorization based on a balance in the convergent communications platform account, where the platform account integrates with the customer account of an authorized guarantor for real-time or near-real-time transaction (checking the balance and debit), and authorization based on a balance in the convergent communications platform account where another institution guarantees a standing amount, which is the basis of the real-time authorization and real-time balance.

It is possible that in some situations/markets, there is no involvement of banks. In such a scenario, a digital debit account can be issued by either a merchant or merchant community or by a telephone company or by a third party or by a combination of some or all of these entities. This digital debit account works in a very similar fashion, except that a party other than the bank issues the account. In this scenario, the digital debit account-issuing agency may or may not partner with a bank or a financial institution.

This digital debit account is different from the e-wallets that are currently available in the market. E-wallets address only issues related to payment. Wallets focus mainly on the amount of money being authorized. Whereas the digital debit account looks at various other aspects related to the customer (e.g., whether customer is authorized to receive or purchase the service or not). E-Wallets also do not address the issues related to continuous, time based charges (e.g., telephony calls, download of music charged per minute of download, etc.). The digital debit account looks at these issues and allows for a proper calculation of charges. That is, e-wallets do not take decision on how much money to deduct from the e-wallet account (they depend on a third party for this). The digital debit account used in the convergent communications platform is able to take decisions on how much money to deduct.

The exemplary convergent communications platform can be deployed at a central site and connected to the telephone company network either as a service node or an intelligent network node. The exemplary convergent communications platform may also be connected to the bank's customer account system, or the customer's credit card system or any third party system that allows for online/offline convergent communications platform customer account recharge.

For the customer, an exemplary convergent communications platform account can be created with two sub accounts. For example, one sub account is used for online/real-time transactions, which could be for communication services or for commerce services or for both. Another sub account is used for offline transactions. For example, if John Smith has an exemplary convergent communications platform account for $50, he could have account A with $40, which would be used for online/real-time transactions. John Smith has another sub account B with $10. This $10 can be transferred onto the user's read/write memory device (either a separate read/write memory device or phone instrument working as a read/write memory device or any combination).

When John Smith makes a phone call or downloads music on the Internet or any such transaction that requires real-time rating, the exemplary convergent communications platform would automatically or by user choice (pre-selected or at the time of the user request) use the account A for payment. When John Smith goes to a shop and likes to buy some coffee, or coke or newspaper or any such item(s) that do not warrant an online/real-time transaction, the exemplary convergent communications platform would automatically or by user choice (pre-selected or at the time of the user request) use account B. If at the merchant establishments, the equipment allows for online connection to the exemplary convergent communications platform, the exemplary convergent communications platform can update (both directions) information related to the transaction/customer profile.

If the balance in sub account B runs out, the exemplary convergent communications platform allows the customer (either by user choice or by way of preset parameters) to transfer money from account A to account B. If John Smith runs out of money in account B, he can also go to a merchant establishment (which has equipment to update balance information on the read/write memory device) and recharge his account. For example, if John Smith goes to a shop and pays $100, his read/write memory device gets updated for an additional $100 and the next time he uses a merchant equipment that has online connection to the exemplary convergent communications platform system, the exemplary convergent communications platform would automatically update the information and distribute the new $100 to his pre-paid sub accounts A & B as desired by John Smith.

The exemplary convergent communications platform can be connected to the telephone company, merchant networks and banks' customer account system. The exemplary convergent communications platform allows the customer to define various recharge criteria based on configurable rules engine for recharge. Such a rule engine allows for the customer to define: various means of recharge allowed for the customer (IVR, ATM, direct transfer, etc.), various criteria which together specify whether it is time to recharge the account or not, and various criteria that together determine how much money to be recharged into the customer account. Thus, the convergent communications platform system can enable many services through gateways or other means for its customer pre-paid accounts.

FIG. 8 shows an exemplary breakout of charges for communication services for use with the convergent communications platform, system and method. FIG. 8 includes a column for type of charge, charge decided by, amount deducted by, amounts due to the home network and roaming network, and the basis for deciding charges. For example, a commerce transaction may need to pay for mobile originated calls (MOC) in the home network via a service tax rental and recharge fees.

Figure 9:
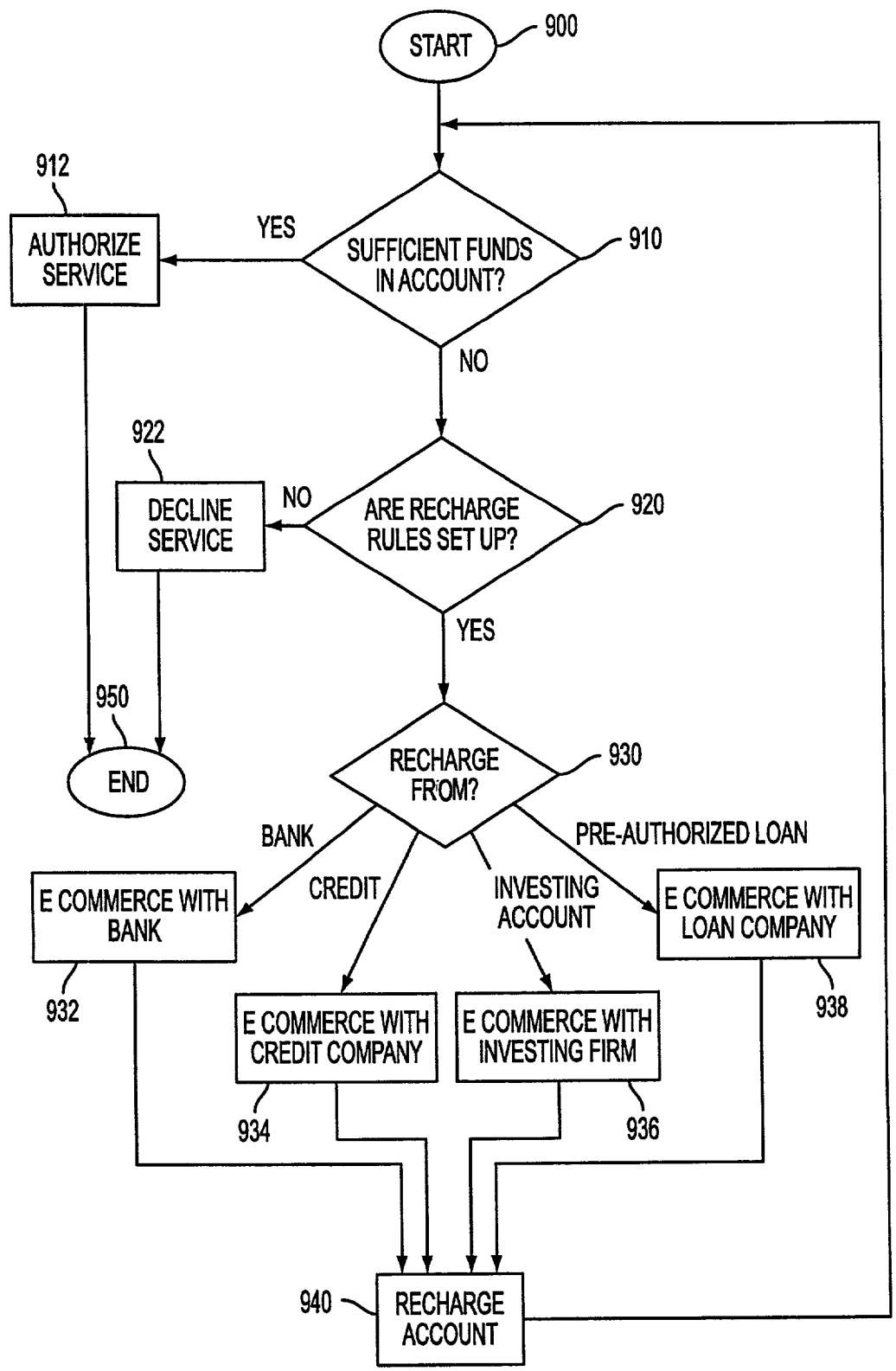
FIG. 9 is an exemplary method of recharging a pre-paid communications account.

FIG. 9 is an exemplary method of recharging a pre-paid customer account for the convergent communications platform, system and method. The method shown in FIG. 9 is an automatic recharge. However, other types of recharge are within the scope of the invention, including additional steps confirming a recharge with the customer, additional steps confirming a recharge with a bank or third party, and additional steps related to checking time or other variables. The method begins at start 900, and continues to determine at 910 if there are sufficient funds in the customer pre-paid account.

In determining if there are sufficient funds in the account at 910, a determination is made whether or not value exists in the pre-paid user's account. If there are not sufficient funds in the account, the method continues at 920 to determine if recharge rules are set up?. If there are sufficient funds in the account, the method goes to step 912 to authorize service. If the method goes to the authorize service step 912, the method would then to continue to end 950.

If the method continues to "the recharge rules setup?" step 920, a determination is made whether or not the customer has authorized pre-paid recharge of his account. If the customer has authorized automatic recharge of the account, the method continues to the step "recharge from?" 930. If the customer has not authorized automatic recharge of his account, the method goes to decline service step 922. If the method goes to decline service 922, the method then continues to end 950.

If the method continues to the "recharge from?" 930, a determination is made to recharge the account by any bank, credit, investing account, or a preauthorized loan. If the "recharge from" action comes from a bank, the method continues to E-commerce with the bank 932. If the recharge is by credit, the method continues to E-commerce with the credit company 934. If the recharge is from an investing account, the method continues to E-commerce with investing firm 936. If the form of recharge is by a preauthorized loan, the method continues to E-commerce with loan company 938. Regardless of the form of the recharge, the method continues to step 940. In step 940, the converging communications platform recharges the pre-paid customer's account and returns to determining if sufficient funds are in the customer pre-paid account 910.

As discussed above, the user can recharge his account from any of several sources. The recharge can be governed by user selections, or rules. For example, a user can predetermine that the first $5,000 of recharge is to come from an investment account, and that thereafter, charges are to come from a credit account. In addition, a user can authorize recharge based on various other variables, such as time, account balances, amount to recharge and other factors. For each recharge account, an agreement is set up between the operator of the convergent communications platform and the recharging entity, and the recharging entity and the customer of both the platform and recharging entity. The agreement can detail such things as the speed of recharge, settlement time frames, notification from the recharging entity of insufficient funds, account balance notification, and other factors as is known in the art. The data relating to the recharge account agreement, rules, and procedures preferably will be stored in the account and/or service manager of the convergent communications platform.

Figure 10:
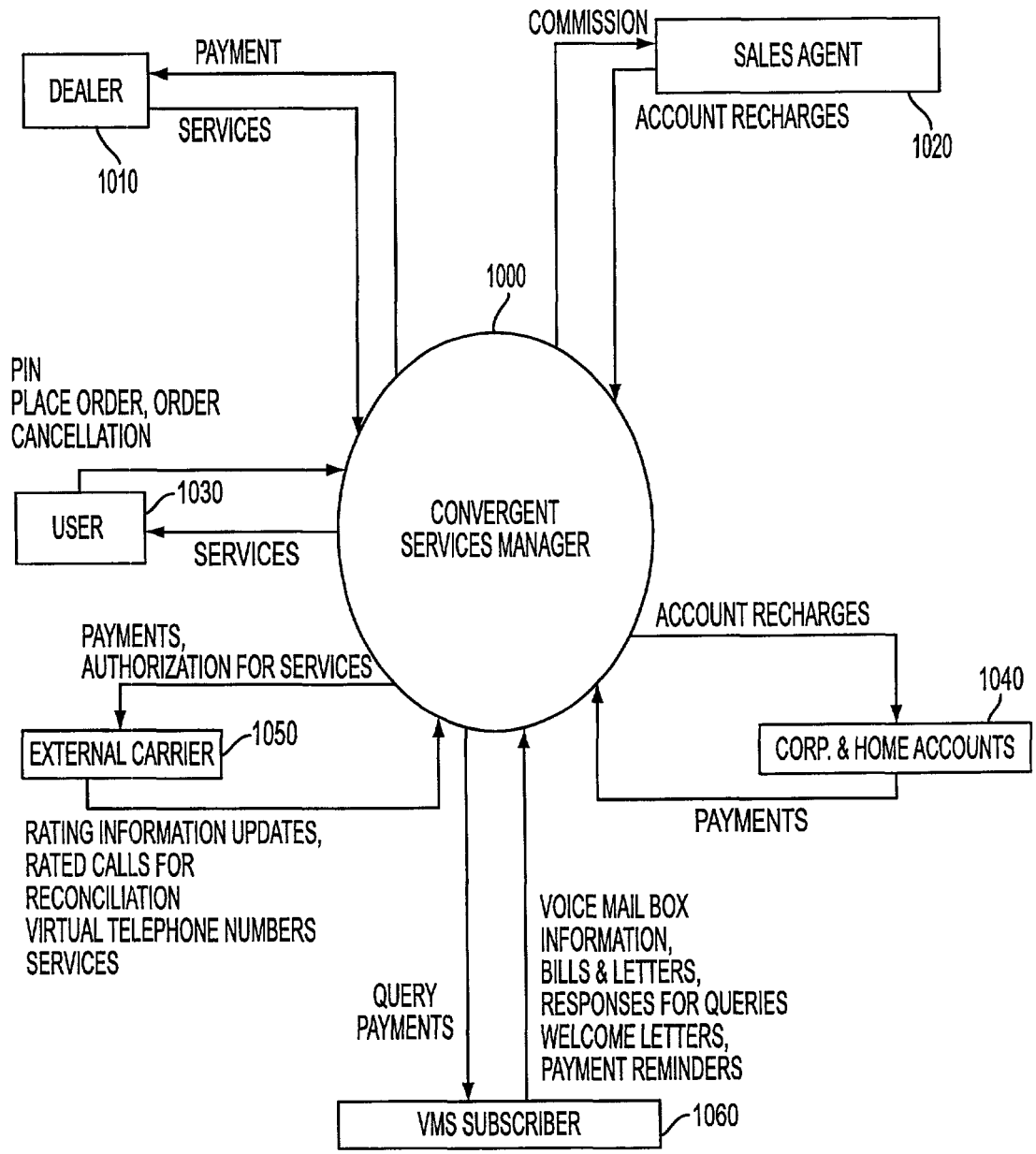
FIG. 10 is an example of the transfer of information between several parties for a convergent communications platform.

FIG. 10 shows an exemplary relationship between the dealer 1010, sales agent 1020 user 1030, external carrier 1050, corporate and home accounts 1040, VMS subscriber 1060 and the convergent service manager 1000. A user 1030 can place an order or order cancellation and enter a pin into the convergent service manager 1000. The user 1030 can then receive services in return. In exchange for the services that the user 1030 receives, the convergent service manager may initiate a payment from the corporate and home accounts 1040. If the user 1030 wishes to recharge their account, he can go to sales agent 1020. Sales agent 1020 can then recharge the account in the convergent services manager 1000 and receive a commission in return. The convergent services manager can then forward the account recharges to the corporate and home accounts 1040. With the account that is recharged, the user can then authorize a payment to dealer 1010 in return for the services, which the user can receive. In addition, external carrier 1050 can receive a payment or authorization for services such as forwarding services, as well as virtual telephone numbers reconciliation and rating information updates to the convergent services manager 1000. Alternately, VMS subscriber 1060 can receive queries or payments for maintaining voice mailbox information, bills and letters, responses for queries, welcome letters and payment reminders.

Figure 11:
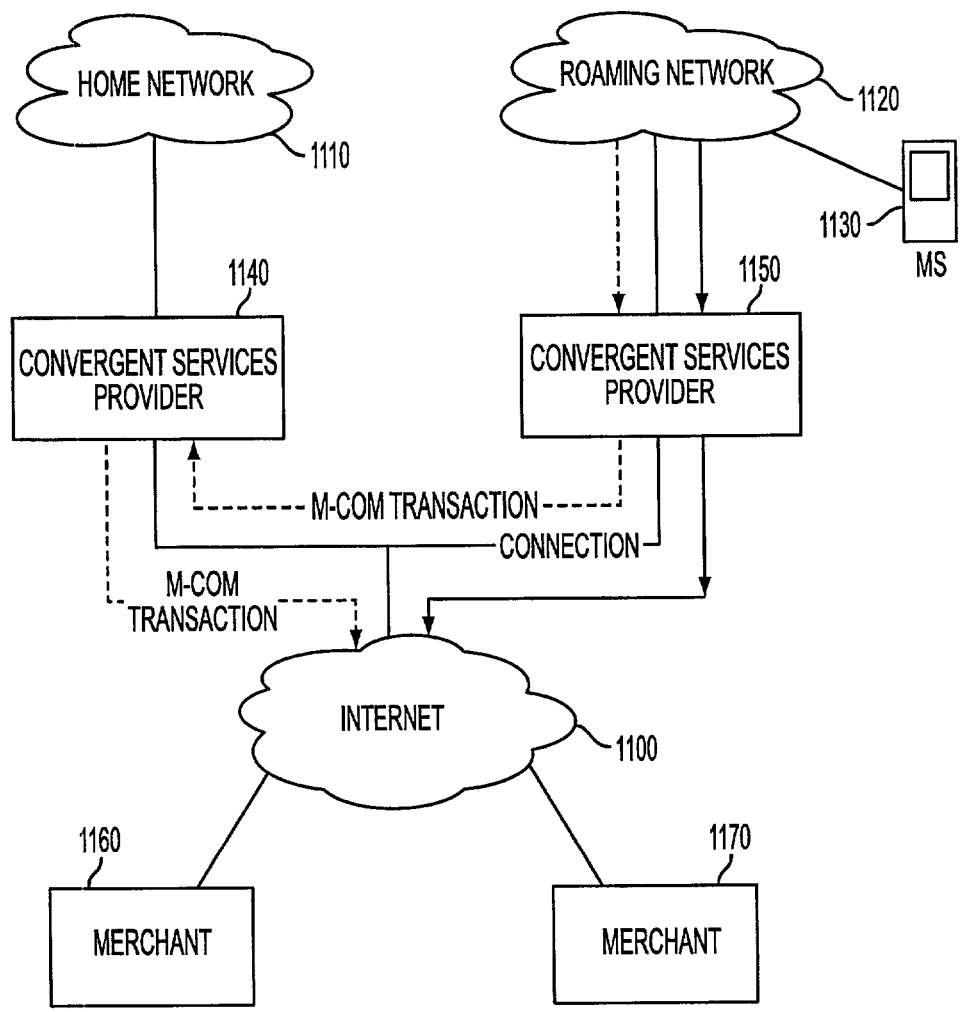
FIG. 11 is a block diagram of conducting mobile commerce while roaming.

FIG. 11 is an exemplary embodiment of a convergent system for enabling mobile commerce in a roaming network. User device 1130 connects to roaming network 1120. Roaming network 1120 connects to convergent services provider 1150. Convergent services provider 1150 can be connected to the internet 1100 and convergent services provider 1140. Merchants 1160 and 1170 can be connected to internet 1100. The home network 1110 can then be also connected to convergent services provider 1140. The convergent services providers 1150 and 1140 are both organizations that maintain a convergent communication system with varying areas of service.

In operation, the user device 1130 while in the roaming network 1120 can connect to a convergent services provider 1150 to initiate a mobile commerce transaction. The convergent services provider 1150 then forwards the request for the mobile commerce transaction to convergent services provider 1140 in the home network 1110. The convergent services provider 1150 can also be connected to the internet 1100 to contact merchant 1160 and merchant 1170 to provide delivery of services to the user device 1130 or confirmation of delivery of goods to the user device 1130.

Figure 12:
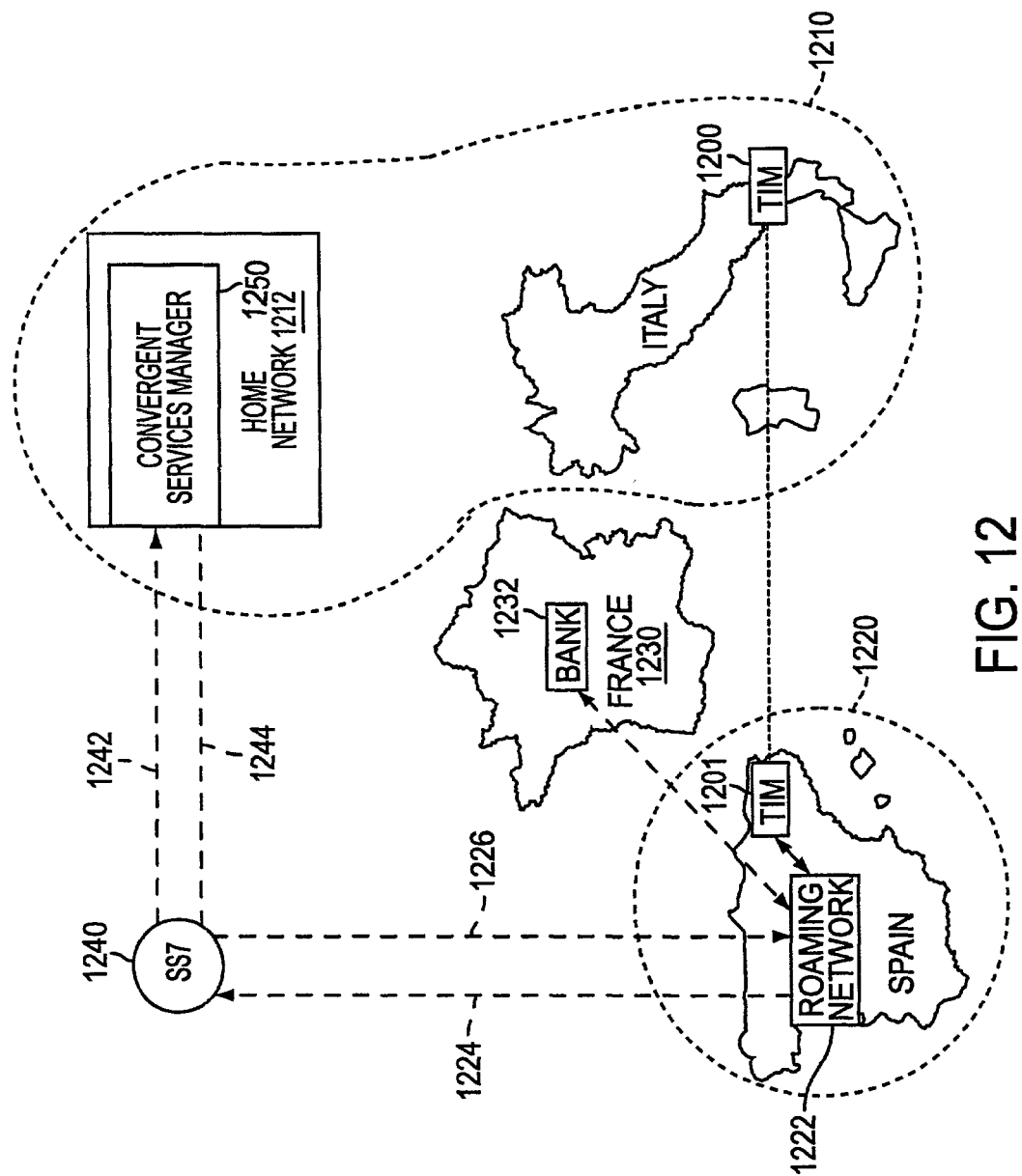
FIG. 12 is an example of a user requesting a roaming service with a convergent communications platform.

FIG. 12 shows an example of a pre-paid roaming service activity in accordance with exemplary embodiments of the invention. The mobile phone pre-paid user Tim at location 1200 whose home network 1212 is in Italy 1210 travels to Spain 1220, which has roaming network 1222. While in Spain 1201 Tim wishes to recharge his pre-paid customer account. Tim at location 1201 then contacts the roaming network 1222, which establishes link 1224 to SS7 1240, which establishes link 1242 to convergent services manager 1250. Convergent services manager 1250 then sends via link 1244, SS7 1240 and link 1226 Tim's current account information to the roaming network 1222. The roaming network 1222 can then contact bank 1232 in France 1230 to recharge Tim's pre-paid customer account in convergent services manager 1250.

Figure 13:
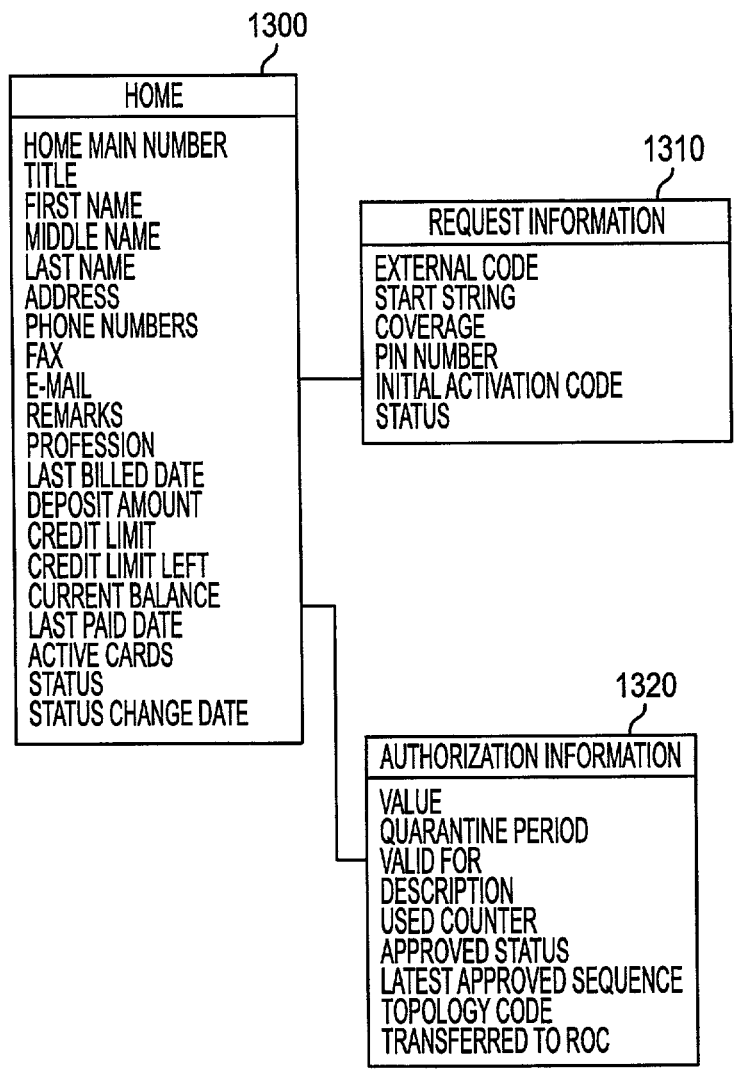
FIG. 13 is an exemplary user and transaction record used for a convergent communications platform.

FIG. 13 shows an exemplary embodiment of the information data and structure of a user's account for a convergent communications platform. The customer account can include, but is not limited to, home table 1300, request information tables 1310 and authorization information table 1320. Home information table 1300 can include, but is not limited to, the home main number, the title, first name, middle name, last name, address, phone numbers, fax, e-mail, remarks, profession, last bill date, deposit amount, credit limit, credit limit left, current balance, last paid date, active cards, status and status change date. Authorization information table 1320 can include value, quarantine, valid for description, used counter, approved status, latest approved sequence, topology code and transferred to ROC. The request information table 1310 can include, but is not limited to, external code, start string, coverage, pin number, initial activation code and status.

Figure 14:
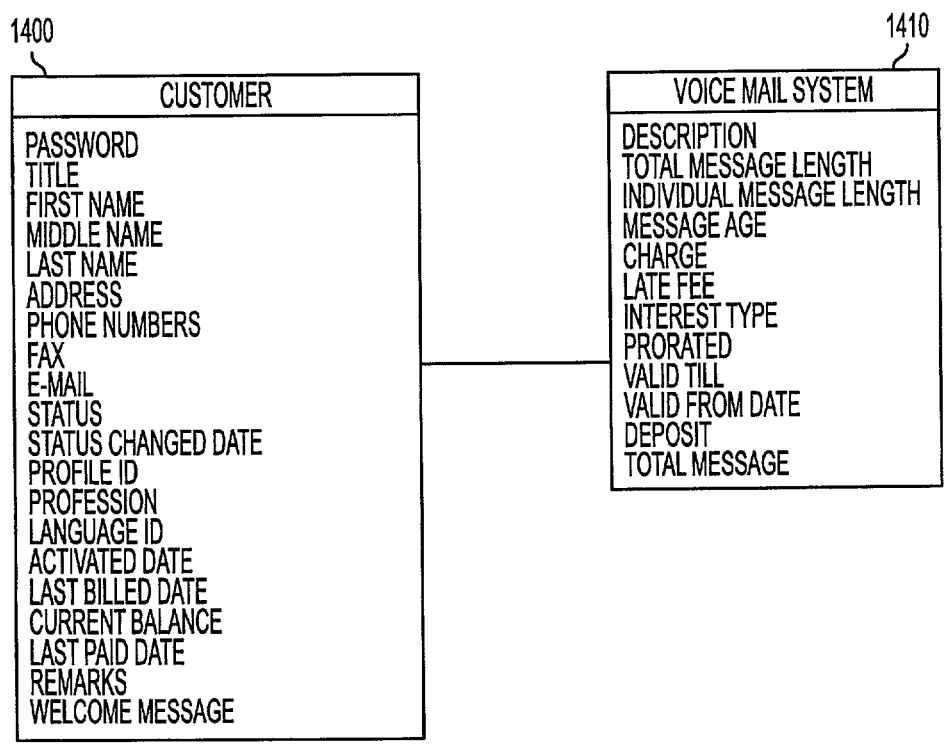
FIG. 14 is an exemplary user account in a convergent communications platform.

FIG. 14 shows an exemplary embodiment of a customer account linked to a voice mail system for a convergent communications platform. The customer account can include, but is not limited to, customer table 1400, voice mailbox 1410. Customer table 1400 can include, but is not limited to, the password, title, first name, middle name, last name, address, phone numbers, fax, e-mail, status, status change date, profile ID, profession, language ID, activated date, last bill date, current balance, last paid date, remarks and welcome message. Voice mailbox 1410 can include, but is not limited to, operator name status, and import box numbers to accept. A voice mail system profile could be added and would include description, total message link, individual message link, message age, charge, late fee, interest type, prorated, valid until, valid from date, deposit and total message.

Figure 15:
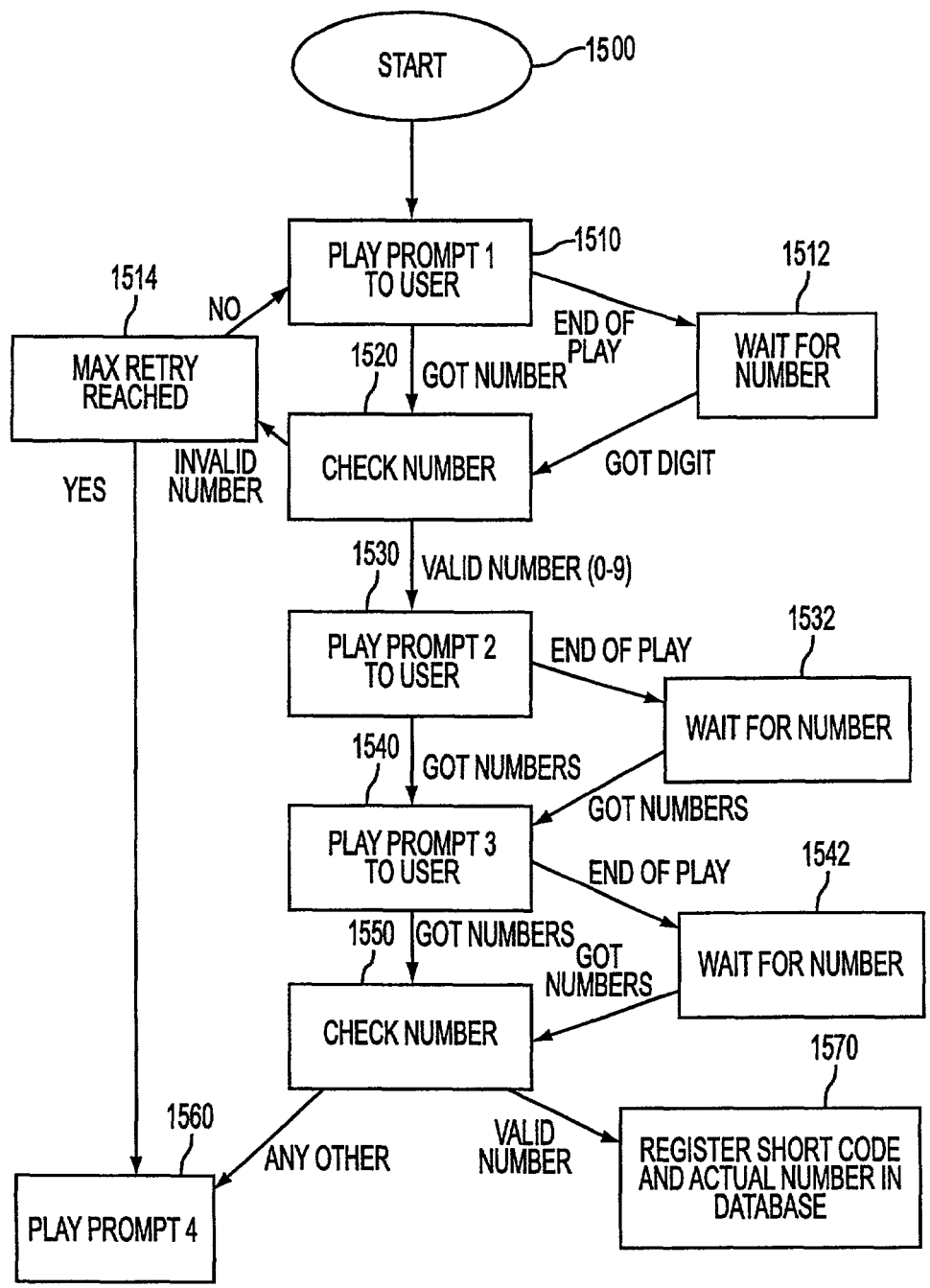
FIG. 15 is an exemplary embodiment of an interactive voice response system as used in a convergent communications platform.

FIG. 15 shows an exemplary embodiment of an interactive voice response system as may be used in a convergent communications platform. The method in FIG. 15 starts at start 1500. The method then continues to play prompt number 1 to user 1510. After prompt number 1 is played to the user in 1510, the method moves to waiting for a number 1512. If a digit is entered, the method follows that number to check number 1520. In check number 1520, if the number is a valid number the method continues to 1530. If the number is an invalid number, the method returns to 1514.

In 1514, a determination whether the maximum retry has been reached is made. If the maximum retry has not been reached, the method continues to play prompt 1 to user 1510. If the maximum retry has been reached, the method continues to play prompt 4 1560.

In the Play prompt 2 to user 1530, a determination is made whether it received a number or reached the end of play. If play prompt to user 1530 reached the end of play, the method goes to wait for number 1532. If the play prompt to user 1530 got a number, the method continues to play prompt 3 to user 1540. In the wait for number 1532 there is a wait until it gets a number. Once a number is received, the method goes to play prompt 3 to user 1540.

Play prompt 3 to user 1540 then determines whether it reached the end of play or it received numbers. If play prompt 3 to user 1540 reaches the end of play, the method goes to wait for number 1542. If the play prompt 3 to user 1540 receives a number, it continues on to check number 1550. In check number 1550, if the number is a valid number, the method goes to register short code and actual number in database 1570. Otherwise, the method goes to play prompt 4 1560.

Figure 16:
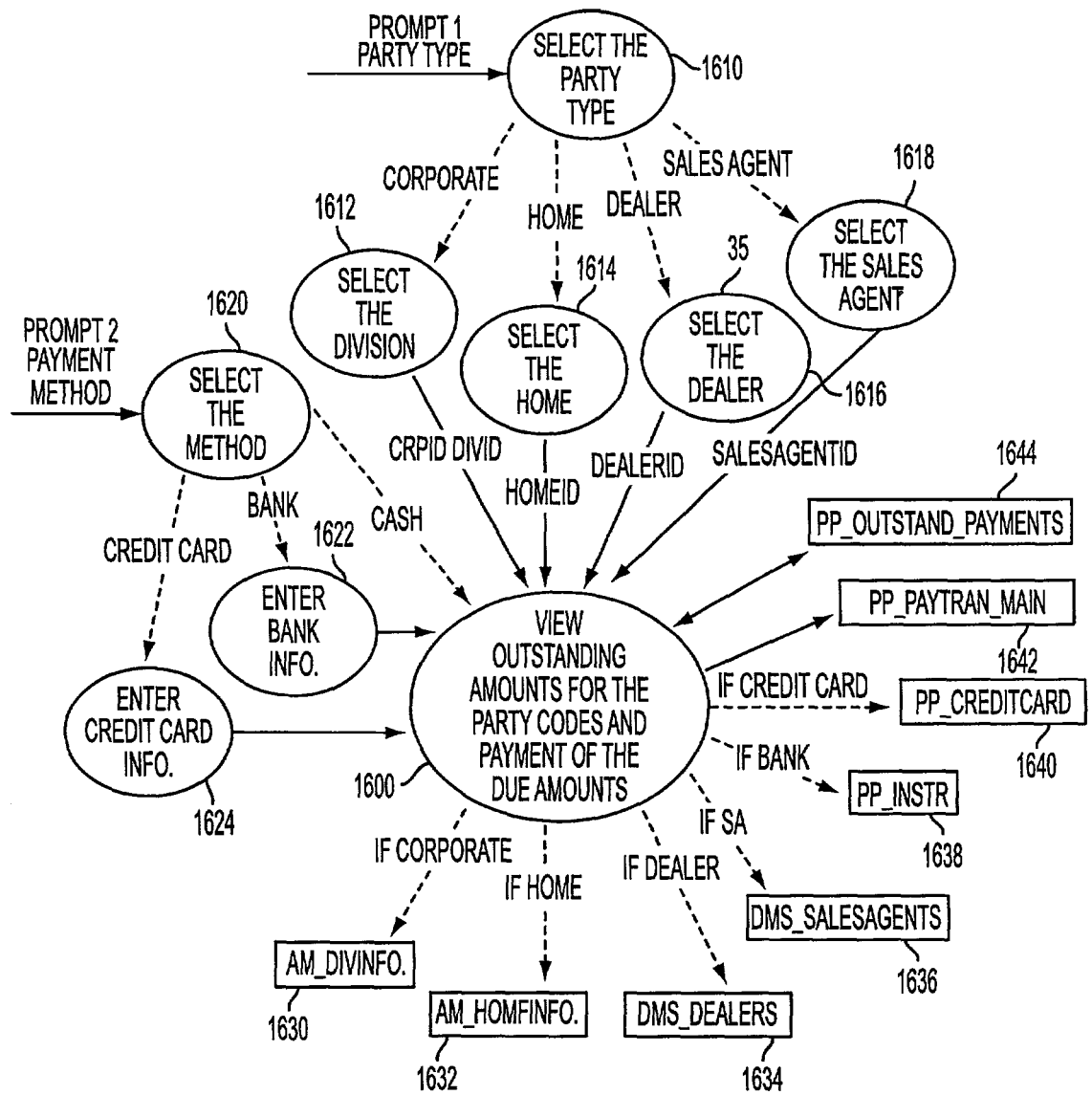
FIG. 16 is a flow chart showing the use of a pre-paid account in a convergent communications platform for multi-party settlement.

FIG. 16 is a flow chart showing the use of a pre-paid account in a convergent communications platform for a multiparty settlement. Prompt 1 can prompt the convergent communications platform to select a party type based on previously established rules. The party type can then be entered into the select the party type 1610. A select a party type 1610 can be any one of a corporate, home, dealer, or sales agent type. If the party type is corporate, the method moves to select the division 1612. If the party type is home, the method moves to select the home 1614. If the party type is a dealer, the method moves to select the dealer 1616. If the party type is a sales agent, the method goes to select a sales agent 1618.

Depending on the party type selected, the appropriate type of ID is sent to view outstanding amounts for the party codes and payments of the due amounts 1600. Thereby a user can recharge or establish a pre-paid account. The relevant information is stored in view outstanding amounts for the party codes and payments of the due amounts 1600 on the convergent communications platform.

Prompt 2 payment method prompts the convergent communications platform to select the method of payment based on previously defined rules. In the select the method of payment 1620, a type of payment method is selected from credit card, bank and cash. If credit card is selected, the method moves to enter credit card information 1640. If bank is selected, the method moves to enter bank information 1622. The method then moves to view outstanding amounts and party codes and payment of the due amounts 1600.

In view outstanding amounts for the party codes and payment of the due amount 1600 can then proceed to any of am_di_info 1630 am_home_info 1632 dms_dealer 1634 dms_sales_agent 1636 pp_instr 1638 pp_credit_card 1640 pp_paid_trans_main 1642 pp_outstand_payment 1644. Thus settling the multiparty transaction.

Figure 17:
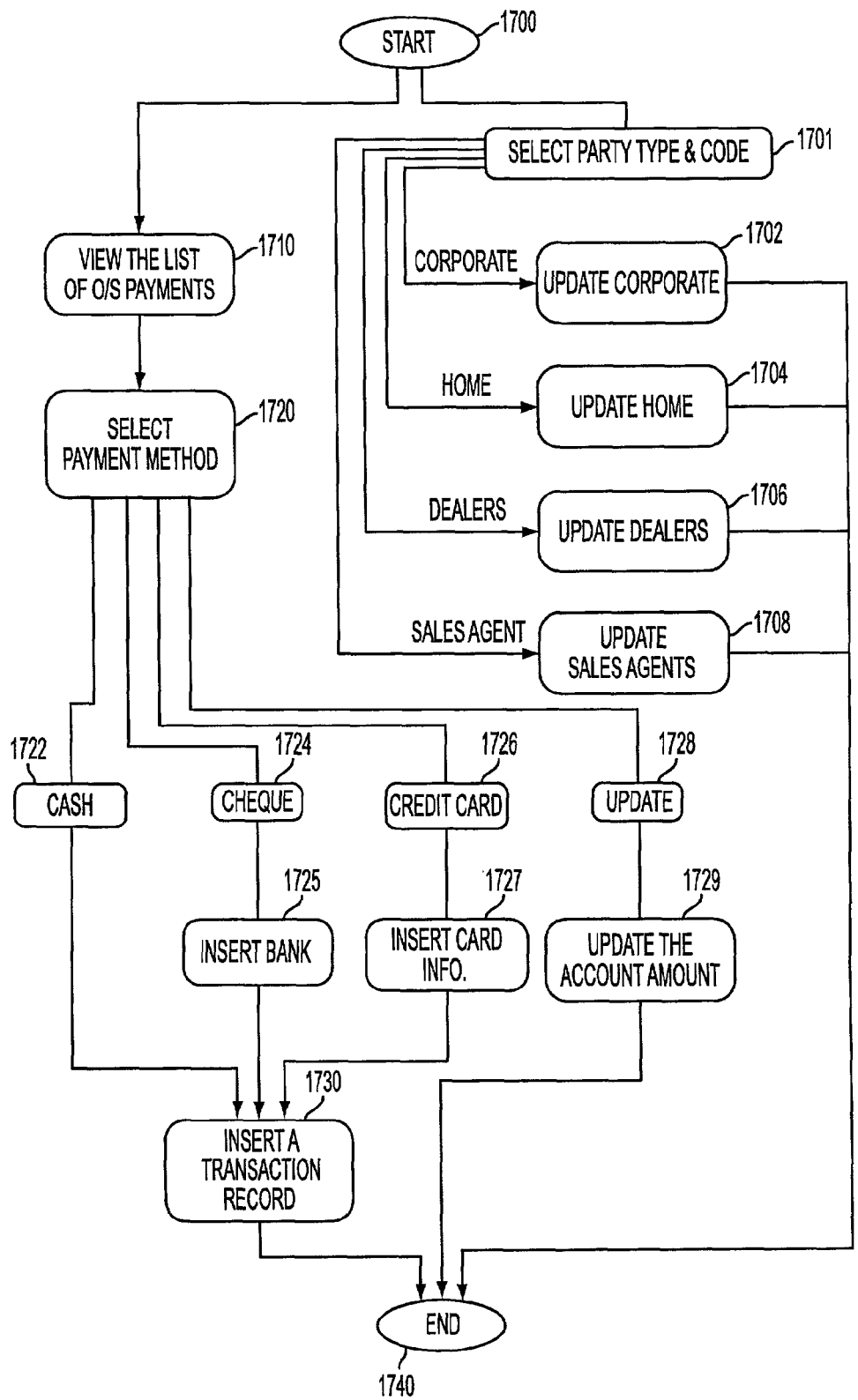
FIG. 17 is an exemplary method of a semi automated method for recharging a pre-paid account and setting up rules for multi-party settlement in a convergent communications platform.

FIG. 17 is an exemplary embodiment of a semi-automated method for recharge of a pre-paid account, and setting up of rules for multiparty settlement that can occur within a convergent communications device. The method starts at start 1700 and continues to either select party type 1701 and code or view the list of O/S payments 1710.

If the method goes to view the list of outstanding and Settling (O/S) payment 1710, the method will determine a first or currently due payment. The method then continues to select payment method 1720. In select payment method 1720, the method will then determine the type of payment based on previously defined rules. If the rule indicated cash, the method moves to cash 1722. If the rule indicated a check the method moves to check 1724. If the rule indicated a credit card, the method moves to credit card 1726. If the rule indicated another payment mechanism other than cash, check, or credit card, the method moves to a general update 1728.

If the rule indicated check 1724, the method then continues to insert bank information 1725. If the rule indicated credit card 1726, the method moves to insert credit card information 1727. The method then continues to insert a transaction record 1730, after entering appropriate information as previously stored on the convergent communications platform. If the rule indicated is the general update 1728, the method moves to update the account amount 1729. The method then continues to end 1740.

If the rule indicated a party type and code, the method then continues to step 1712. At the select party type and code the method then determines a type of party needing an account update. If the rule indicated corporate, the method moves to update corporate 1702. If the rule indicated home, the method continues to update home 1704. If the rule indicated dealers, the method moves to update dealer 1706. If the rule indicated sales agent, the method moves to update sales agent 1708. The method then continues to end 1740.

Figure 18:
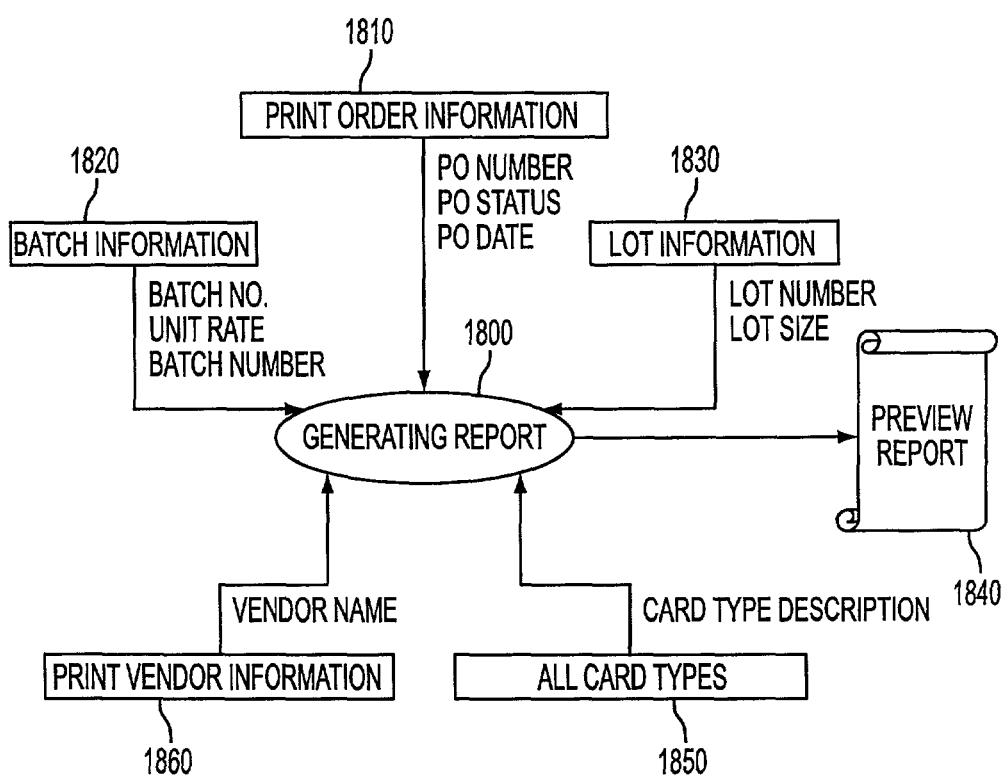
FIG. 18 is an exemplary method of generating a reconciliation report in a convergent communications platform.

FIG. 18 shows an exemplary method of generating a report for use with a convergent communications platform and system. The method can begin at any of batch information 1820, print order information 1810, lot information 1830, print vendor information 1860 or all card types 1850. The method then continues to generating report 1800, and continues to previewing report 1840. If the method starts at batch information 1820, the batch number unit rate and batch number will need to be entered from a memory device on the convergent communications platform. If the method starts at print order information 1810, the PO number, PO status and PO date needs to be entered. If the method starts at lot information 1830, the lot number and lot size will need to be entered. If the method starts at all card types 1850, credit card type description will need to be entered. If the method starts at print vendor information 1860, the vendor's name will need to be entered.

Figure 19:
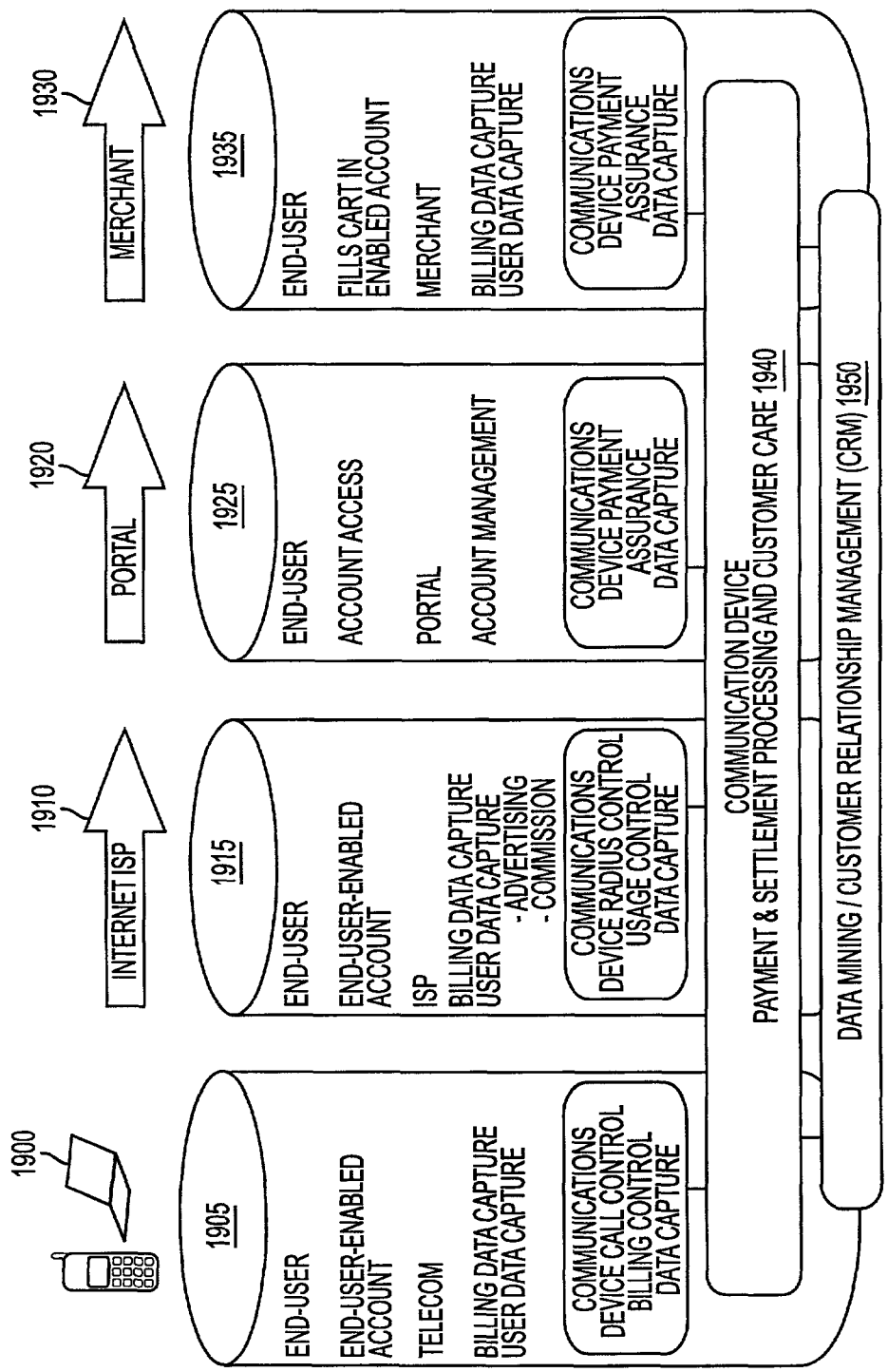
FIG. 19 is an example of the data transfer in a convergent communications platform.

FIG. 19 is an example of the data transfer in a convergent communications platform. As shown in FIG. 19, a user device 1900 can contain a data storage structure such as 1905 which contains end user information, the end user enabled account information, telecom information, billing data capture information and user data capture information. The user data structure 1905 can also contain a communications device call control and billing control and data capture function, which can communicate with communication device for payment, and settlement processing and customer care 1940. Internet ISP 1910 can contain data structure 1915 which contains information on the end user, the end user enabled account, the ISP, the billing data capture, and user data capture related to advertising and commissions. Data structure 1915 can also contain a module for communications device radius control, usage control and data capture which communicates with communication device or payment or settlement processing and customer care 1940. Portal 1920 can contain data structure 1925. Data structure 1925 can contain end user information, account access information, portal information and account management information. Data structure 1925 can also contain a module for communications, device payment, assurance and data capture that can communicate with communication's device for payment and settlement processing and customer care 1940. Merchant 1930 can contain a data structure 1935. Data structure 1935 can contain information on the end user, filling the cart in an enabled account, merchant, billing data capture, and user data capture. The data structure 1935 can also contain a module for communications, device payment, assurance and data capture that communicates with communication device for payment and settlement processing in customer care 1940. The communication device for payment and settlement processing and customer care 1940 can communicate with the data mining/customer relationship management (CRM) 1950.

Figure 20:
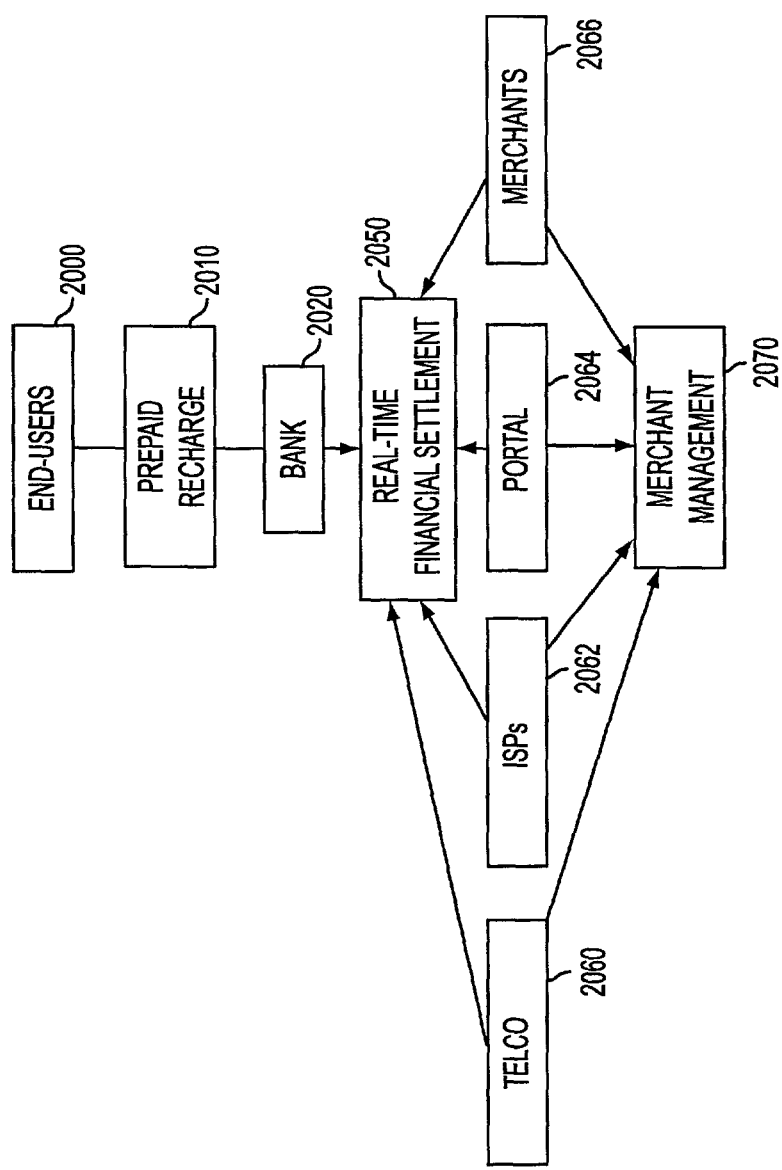
FIG. 20 is an exemplary method of multi-party real time settlement in a convergent communications platform.

FIG. 20 is an exemplary method and system for multiparty real time settlement for services and/or transactions made by a customer with a pre-paid, recharge-type account using a convergent communications platform. A method begins with end users 2000 initiating the method. The method then continues to pre-paid recharge 2010.

In pre-paid recharge 2010, a user determines in advance, automatically or at the time of requesting service and/or transactions what other of his off platform accounts and what amounts related to each of those accounts are to be recharged into his pre-paid platform account. The method then continues to the bank 2020. In bank 2020, funds are transferred from the bank to the real-time financial settlement 2050.

Real-time financial settlement 2050 receives requests for payment from telephone company 2060, ISPs 2062, portal 2064 and merchants 2066. Merchant management 2070 is the means for achieving the real-time and direct financial settlement 2050. Merchant management 2070 specifies whether settlement for the multi-parties involved is to be instantaneous, delayed, involving additional authorizations, or any other features as well known in the art. Thus, there are exemplary embodiments of the convergent communications platform that can settle transactions involving multiple parties over multiple time frames.

Figure 21:
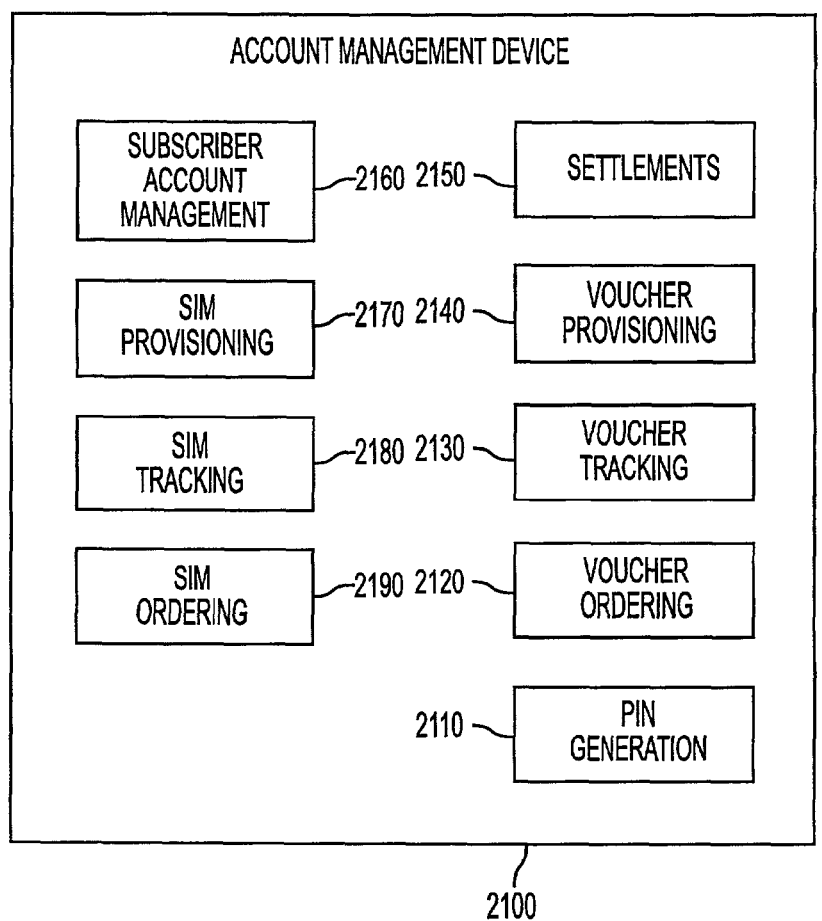
FIG. 21 is a block diagram of an exemplary account management device for a convergent communications platform.

FIG. 21 is an exemplary embodiment of account management device 2100 for use in the convergent communications platform. The account management device 2100 may have a subscriber account manager 2160, an SIM provisioning 2170, SIM distribution 2180, SIM ordering 2190, settlements 2150, voucher provisioning 2140, voucher distribution 2130, voucher ordering 2120 and PIN generation 2110.

Figure 22:
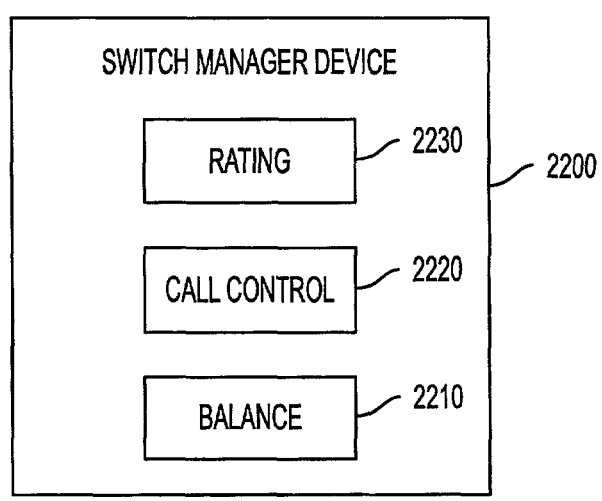
FIG. 22 is a block diagram of an exemplary switch manager device for a convergent communications platform.

FIG. 22 is block diagram of an exemplary switch manager 2200 for use in the convergent communications platform. Switch manager 2200 can contain rating 2230, call control 2220 and balance 2210. Rating 2230 can be a real time, or by various increments, rating the cost of a requested service. Rating can also determine the surcharges or risks involved in a commerce transaction. Call control 2220 can keep track of all simultaneous debits to a user's account, and send signals to either the user or various third parties for authorizing additional amounts to recharge the user account, or authorization to conduct recharge, or terminating a call. Balance control 2210 can keep track of the instantaneous balance in a user's account, or provide warnings when a user's account reaches a predetermined level.

Figure 23:
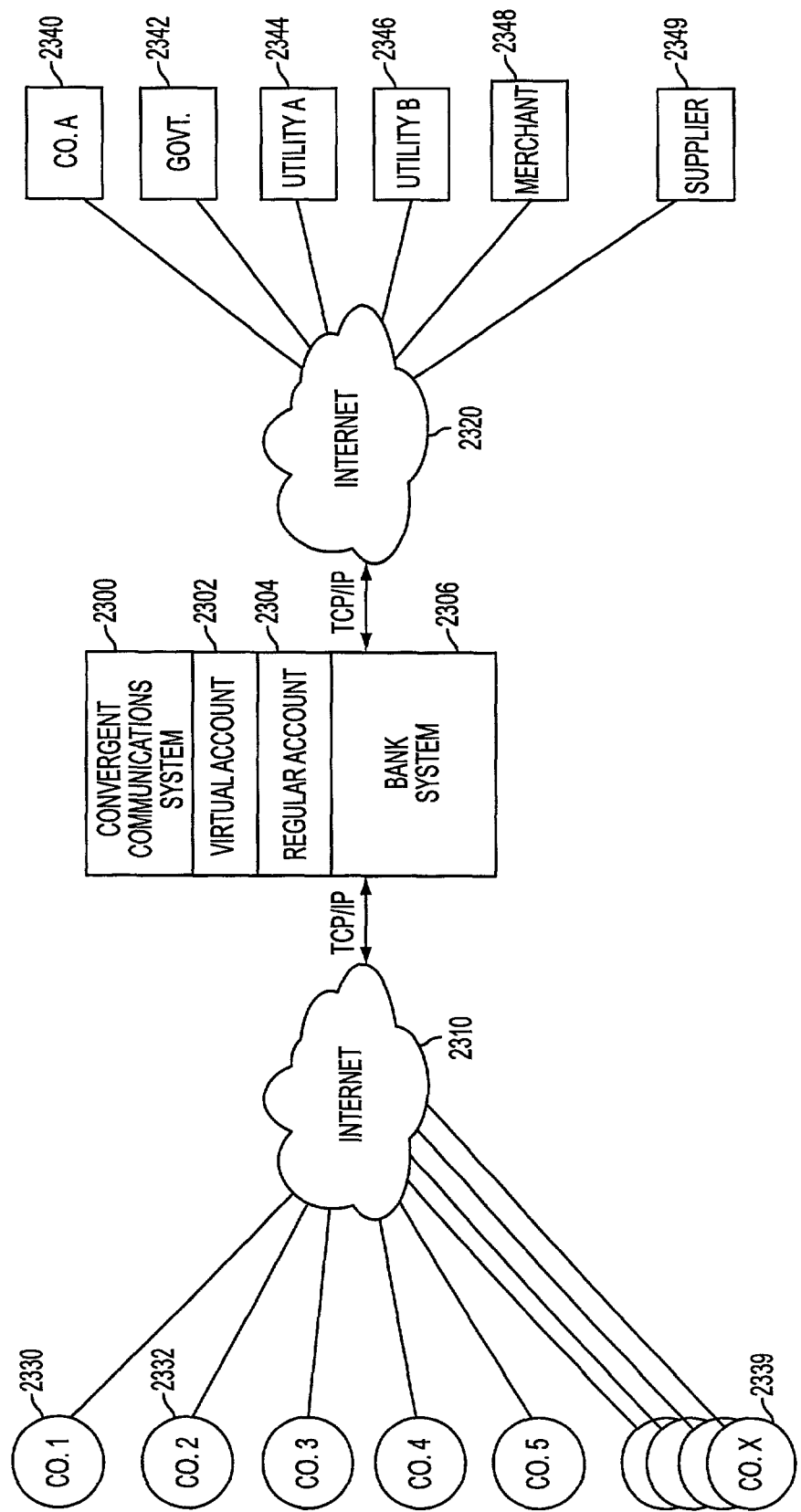
FIG. 23 is an example of business to business transactions using a convergent communications platform.

FIG. 23 is a block diagram showing an example of a business to business (B2B) convergent communications system. As seen in FIG. 23, company 1 2330, company 2 2332 through company x 2339 connect via Internet 2310 to the convergent communications system 2300. In addition, company A 2340, government 2342, utility A 2344, utility B 2346, merchant 2348 and supplier 2349 connect via internet 2320 to the convergent communications system 2300. Convergent communications system 2300 can be connected or integrated with virtual account 2302, regular account 2304 and bank system 2306. Thus, a company such as company 1 2330 needs only have one connection to the internet 2310 in order to conduct business to business transactions with any of company A 2340 through supplier 2349.

Figure 24:
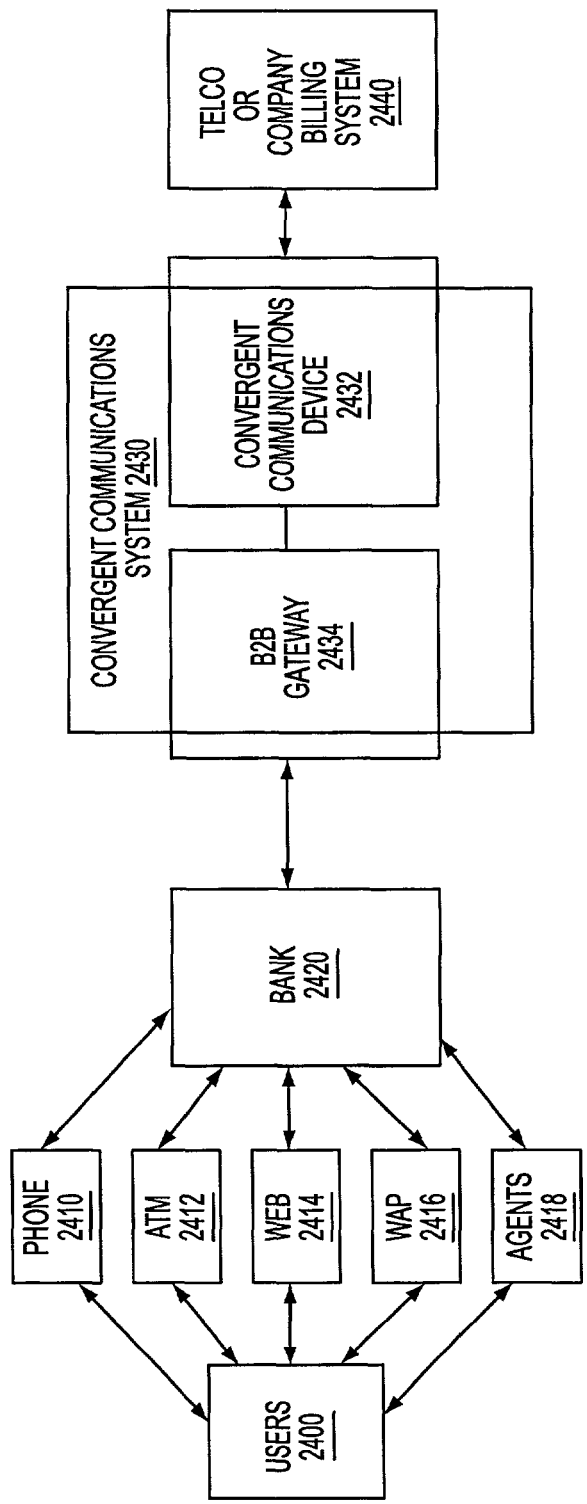
FIG. 24 is a block diagram of a convergent communications system conducting business to business commerce.

FIG. 24 is a block diagram showing another example of a business to business convergent communications system. In FIG. 24, users 2400 connect via phone 2410, ATM 2412, WEB 2414, WAP 2416 and agents 2418 through bank 2420. Bank 2420 connects to the B2B gateway 2434. The B2B gateway 2434 is part of the convergent communications system 2430 which also contains convergent communications device 2432. Convergent communications device 2432 connects to the telephone company or other company billing system 2440. Thus users 2400 can deposit or transfer funds using a phone 2410, ATM 2412, the WEB 2414 or WAP 2416 or agent 2418 to transfer funds between accounts and/or designate a business to business transaction utilizing the bank 2420 to a telephone company or company billing system 2440. In addition, as shown in FIG. 24, bank 2420 needs only have one connection to the convergent communication system 2430 to conduct business to business commerce with many different entities.

Figure 25:
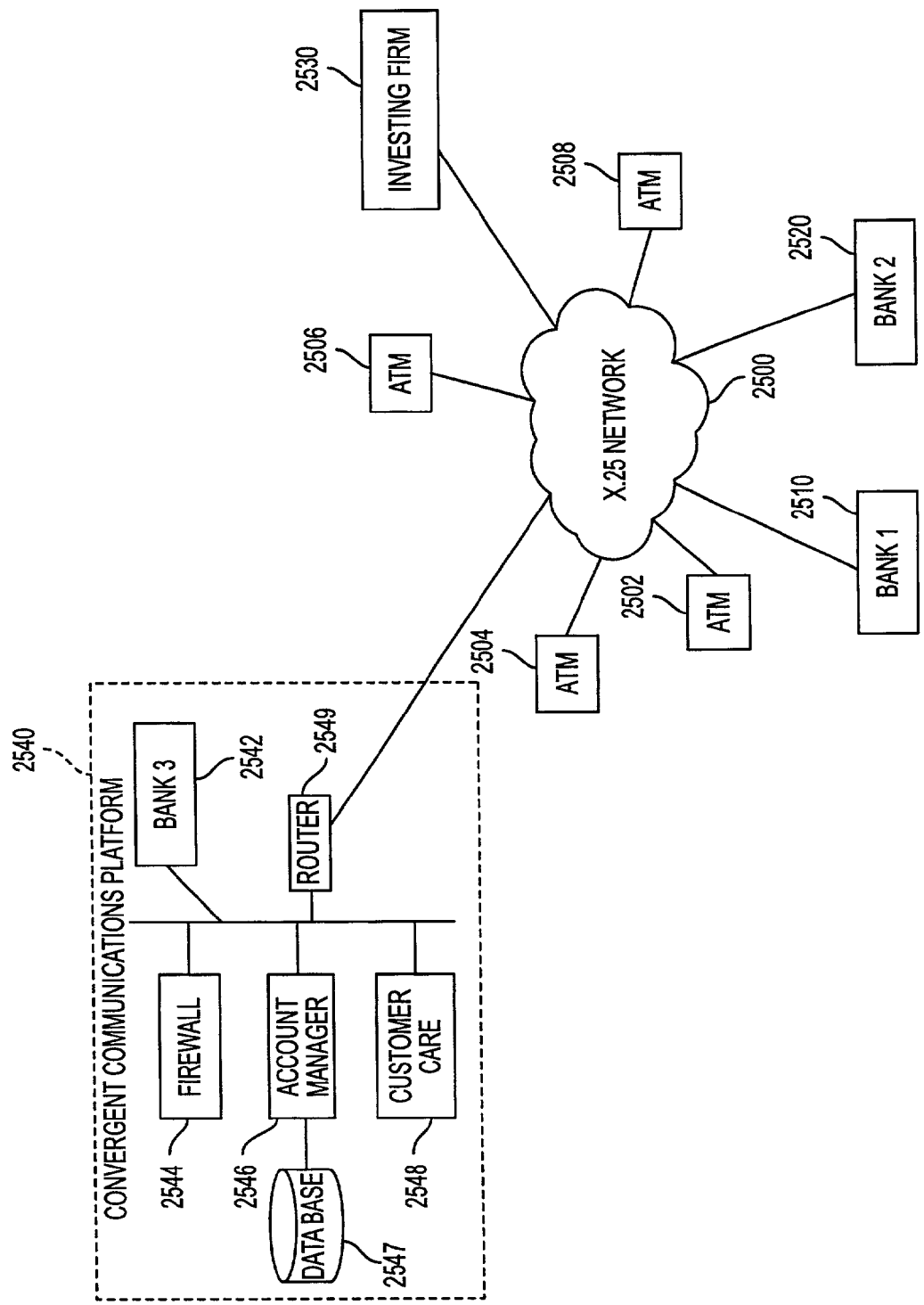
FIG. 25 is a block diagram of an exemplary system for account recharge for a convergent communications platform.

FIG. 25 is a block diagram of an exemplary system for recharging a customer pre-paid account in a convergent communications platform. In FIG. 25, various devices such as ATM 2506, ATM 2504, ATM 2502, ATM 2508, investing firm 2530, bank 2 2520 and bank 1 2510 are connected to X.25 network 2500. The X.25 network 2500 is connected to router 2549 as part of the convergent communications platform

2540. Convergent communications platform 2540 can contain firewall 2544, account manager 2546, customer care 2548 and bank 3 2542. Account manager 2546 can be connected to database 2547. Thus, a customer user can access his account in the convergent communications platform 2540 from any remote means, such as ATM 2506.

Figure 26:
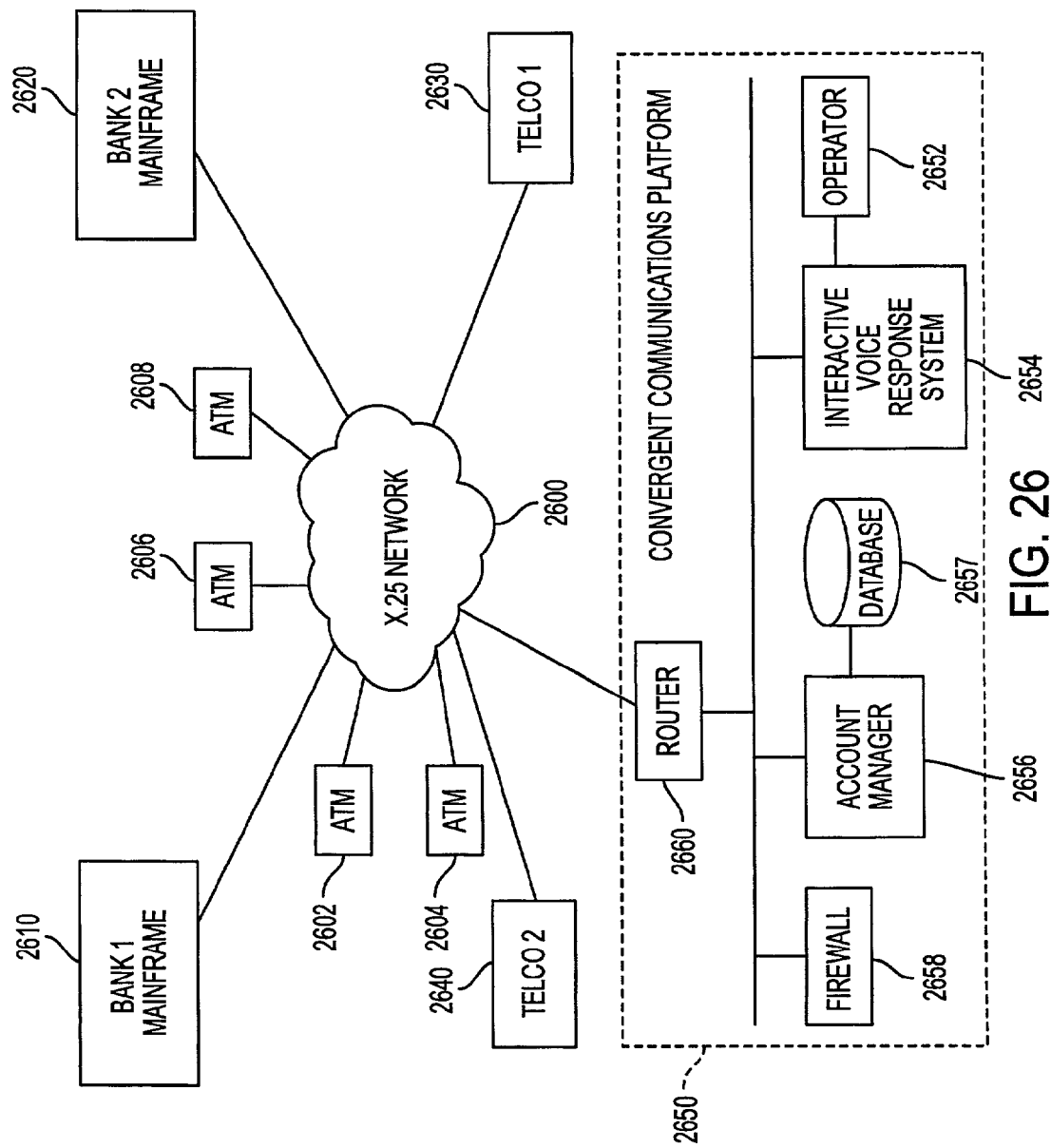
FIG. 26 is a block diagram of an exemplary system for recharging a pre-paid account using an interactive voice response system in a convergent communications platform.

FIG. 26 is a block diagram of an exemplary system for recharging a customer pre-paid account using an interactive voice response system in a convergent communications platform. As shown in FIG. 26, bank 1 mainframe 2610 can be connected via X.25 network 2600 to anyone of ATMs 2602 through 2608, telephone company 2 2640, telephone company 1 2630 and bank 2 mainframe 2620. The convergent communications platform 2650 can also be connected to the X.25 network 2600. The convergent communications platform 2650 can contain router 2660, firewall 2658, account manager 2656, database 2657, interactive voice response system 2654 and operator 2652.

Thus, a customer user connecting to the convergent communications platform 2650 through telephone company 1 2630 can have his request routed through the X.25 network 2600 to the router 2660. The router 2660 can authenticate the user using firewall 2658 and determine that the request should use the interactive voice response system 2654. The interactive voice response system 2654 can either handle the account recharge, or if the customer is having difficulty, the interactive voice response system 2654 can forward the call to operator 2652. If the interactive voice response system 2654 can handle the account recharge, the user by speaking commands or entering digits can transfer funds from the user's bank 2 mainframe 2620 using the X.25 network 2600 to the platform account manager 2656 where it is recorded in the platform database 2657.

Figure 27:
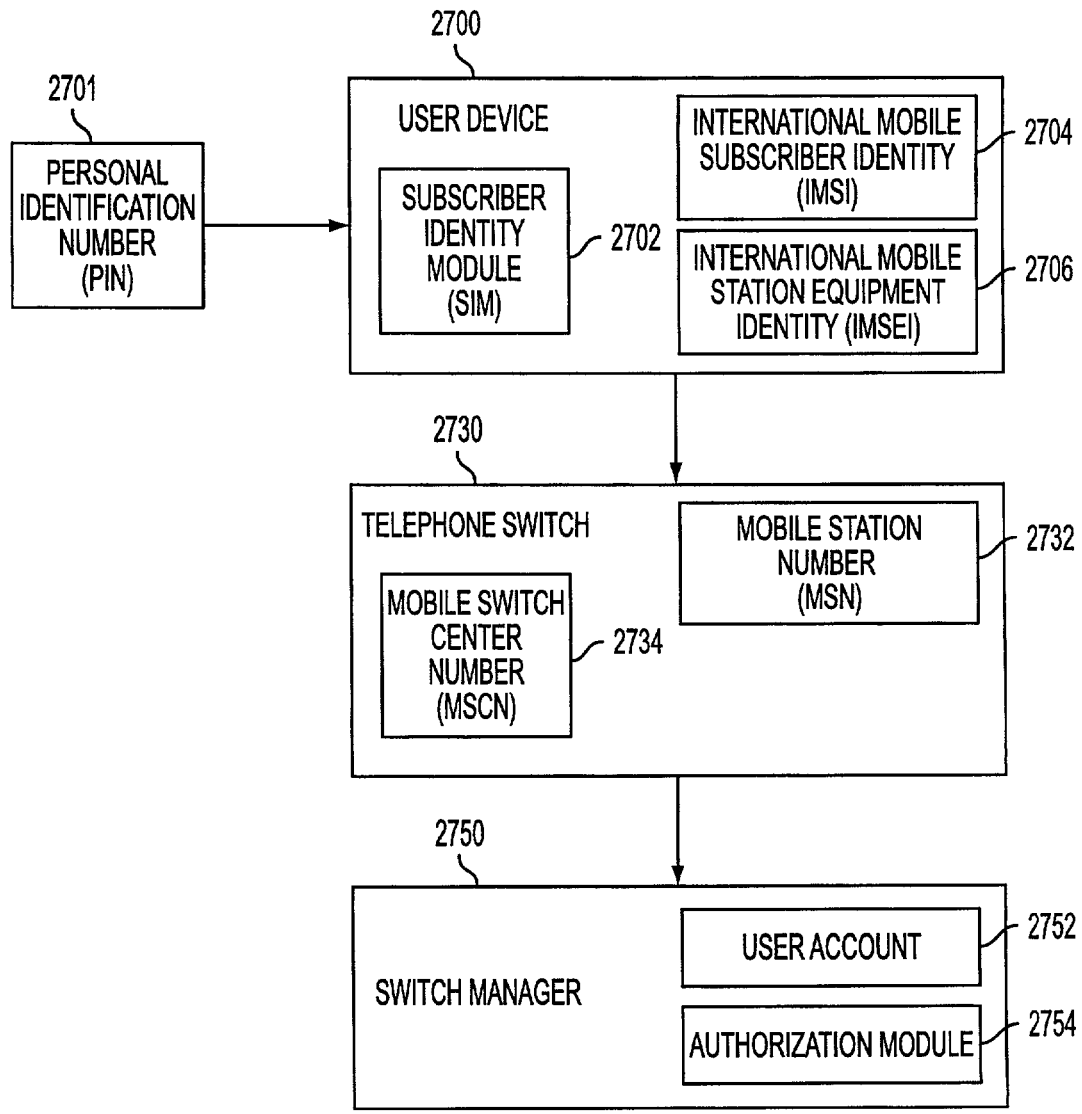
FIG. 27 is a block diagram of an exemplary security system used by a convergent communications platform.

FIG. 27 is a block diagram of an exemplary security system used by the convergent communications platform. As seen in FIG. 27, a personal identification number (PIN) 2701 can be entered into a user device 2700. The user device 2700 can contain a subscriber identity module (SIM) 2702, an international mobile subscriber identity (IMSI) 2704 and an international mobile station equipment identity (IMSEI) 2706. The user device 2700 can then transfer any of those numbers required for security to the telephone switch 2730. Telephone switch 2730 can contain mobile switch center number (MSCN) 2734 and mobile station number (MSN) 2732. The telephone switch can forward any of the above numbers or identification codes to the switch manager 2750. The switch manager 2750 can contain user account 2752 and authorization module 2754.

The exemplary convergent communications platform allows for secure financial transactions (either based on ISO 8583 or any such secure financial transaction protocol), which effects the actual recharge of a customer's pre-paid account. The exemplary convergent communications platform provides for various interfaces that allow for withdrawing money from third party systems (e.g., the exemplary convergent communications platform initiating transactions to take money out of a customers bank account system) or depositing the money into the exemplary convergent communications platform system by third party systems (e.g., a customer's bank account system depositing money into the customer's pre-paid account of the exemplary convergent communications platform).

Thus, in conducting a regular commerce transaction, the convergent communications platform can have protection from fraud from credit card and debit card unauthorized users and a merchant's establishment fraud. Thus, the exemplary convergent communications system method and platform can use any now known or later device security system for authenticating pre-paid convergent communication platform users.

Figure 28:
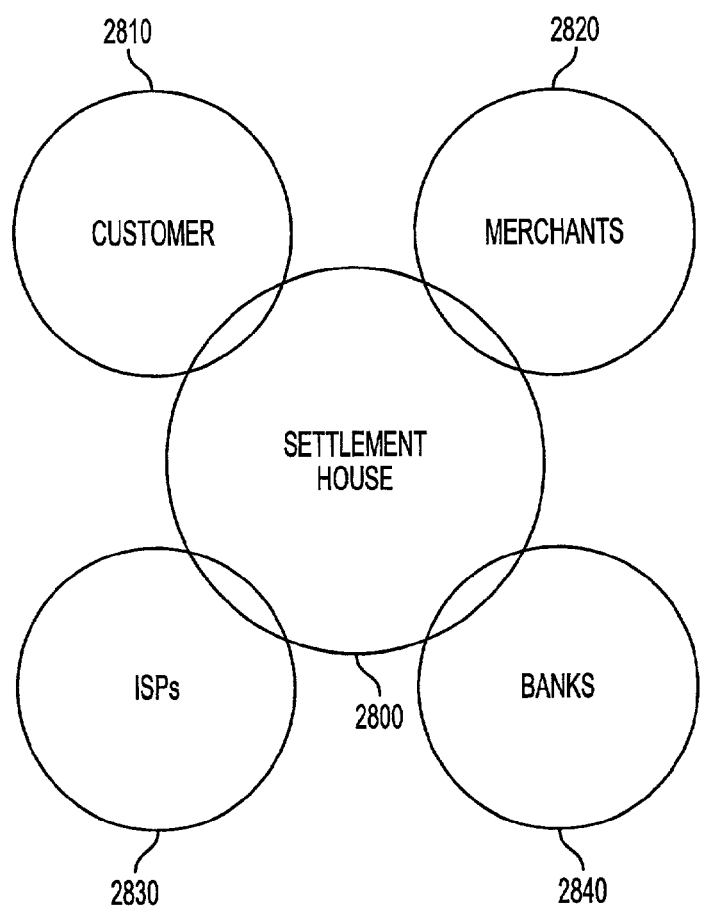
FIG. 28 is an example of multiparty settlement using a convergent communications platform as a settlement house.

FIG. 28 shows an exemplary embodiment of multiparty settlement using the convergent communications platform as a settlement house. As seen in FIG. 28, the settlement house 2800 can be related to banks 2840, merchants 2820, internet service providers 2830 and customers 2810. The convergent communications platform, can thus act as a single conduit for multiparty financial settlements, in addition to acting as a single conduit for multiple services and transactions via a heterogeneous networks.

FIG. 29 is an exemplary screen shot of vendor, merchant and service provider information for settlement in a convergent communications platform. As seen in FIG. 29, various rules for interaction and settlement arrangements with various vendors, service providers and merchants can be stored. For example, the exemplary convergent communications platform can store and display the merchant, the condition of settlement, the value of settlement, the units for settlement, time stamps, currency, contract versions, valid dates for the contract and any additional rules related to the contract. For example, Satyam online wishes to settle E-commerce transactions after receipt, with a value greater than 5, where it is collecting a percentage of total receipts. In addition, the contract is valid from Nov. 23, 2000 through Nov. 23, 2000.

FIG. 30 is an exemplary screen shot of adding vendor/service provider/merchant information to a convergent communications platform. As shown in FIG. 30, a merchant, for example, Sify@Info.com can have such information as contract, valid from, valid till, condition, payment mode, value, timestamp, merchant, condition, payment mode, value, time stamp and save relating to the merchant.

Figure 31:
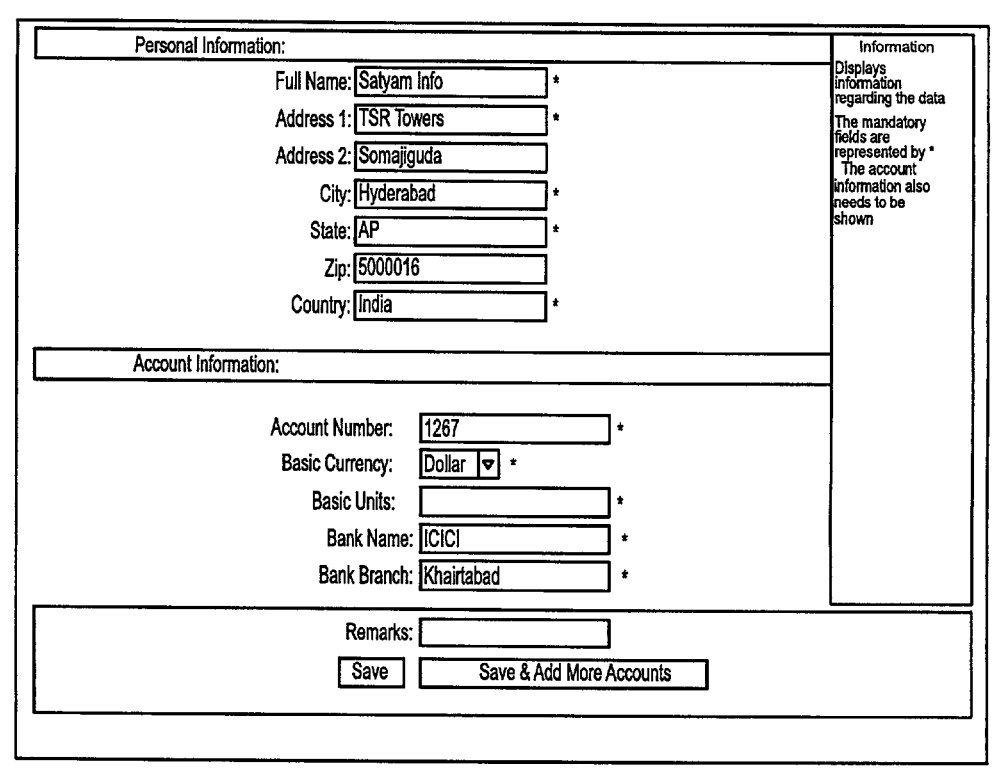

FIG. 31 is an exemplary screen shot of adding details about vendors/service providers/merchants to an exemplary communications platform. As seen in FIG. 31, such details as full name, address 1, address 2, city, state, zip, country, account number, basic currency, basic units, bank name, bank branch, bank city, and remarks relating to the merchant can be stored in the convergent communications platform.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A method of providing mobile commerce services via a plurality of networks, the method comprising:
   receiving in a roaming network from a user device, an identification number and a request for a service;
   forwarding from the roaming network, to a home network, the identification number, the request for the service, and adding a service provider identification number identifying a service provider that does not provide the roaming network and a cost of the service;
   verifying, by a convergent communication platform located on the home network, that the identification number relates to a valid user account, that the user device is authorized to receive the service and that the valid user account has sufficient value to pay for the service;
   providing an authorization to the service provider, if the identification number relates to the valid user account, the user device is authorized to receive the service and the valid user account has sufficient value; and
   charging the valid user account for providing the service.

2. The method of claim 1, wherein the roaming network is at least one of a wireless network, a simple messaging service network, a public switched telephone network, a packet switched network, a circuit switched network, an asynchronous network, the Internet, an Intranet, a microwave network, a cable network, an ethernet network, a token ring network and a wide area network.

3. The method of claim 1, wherein the user device is at least one of a wireless phone, a wired phone, a modem, a computer, a personal digital assistant, a pager, a cell phone and a radio transmitter.

4. The method of claim 1, wherein the identification number is at least one of a personal identification number, a subscriber identity module, an international mobile subscriber identity, an international mobile station equipment identity, a mixture of alphabetic and numeric digits and a hexadecimal number.

5. The method of claim 1, wherein the service is at least one of a telephone connection, a simple messaging service message, a facsimile transmission, a data transmission, a purchase request for goods/services, a data download and a recharge request.

6. The method of claim 1, wherein the service provider includes a plurality of businesses that each receives a portion of the cost of the service.

7. The method of claim 1, further comprising sending the amount charged to the service provider.

8. The method of claim 1, further comprising:
automatically determining that the valid user account does not have a sufficient balance;
automatically determining that the valid user account has authorized a recharge mechanism; and
automatically recharging the valid user account using the recharge mechanism.

9. The method of claim 8, further comprising:
determining that the valid user account has authorized the recharge mechanism after a user intervention;
contacting the user device in the roaming network requesting authorization to recharge; and
authorizing the recharging only if the user device replies correctly to the request for authorization to recharge.

10. The method of claim 8, wherein the recharging is based on a user defined rule that specifies at least one of an account, an amount and a source of funds.

11. The method of claim 10, wherein the user defined rule specifies a plurality of accounts, with a priority of recharge based on at least one of account, past recharges, account balance and time.

12. The method of claim 8, wherein the recharging recharges from at least one of a bank account, an investment account, a credit account and a pre-authorized loan account.

13. The method of claim 1, further comprising storing the charging and the service provider identification number.

14. An apparatus that provides mobile commerce services via a plurality of networks, the apparatus comprising:
a receiver in a roaming network that receives a request for a service from a service provider that does not provide the roaming network, the request including an identification number from a user device located on a roaming network, and the service requested, a service provider identification number related to the service provider and a cost of the requested service from the roaming network;
a verifier that verifies that the identification number relates to a valid user account, that the user device is authorized to receive the service and that the valid user account has sufficient value to pay for the service;
a sender that provides an authorization to the service provider, if the identification number relates to the valid user account, the user device is authorized to receive the service and the valid user account has sufficient value; and
a charger that charges the valid user account for providing the service.

15. The apparatus of claim 14, wherein the roaming network is at least one of a wireless network, a simple messaging service network, a public switched telephone network, a packet switched network, a circuit switched network, an asynchronous network, the Internet, an Intranet, a microwave network, a cable network, an ethernet network, a token ring network and a wide area network.

16. The apparatus of claim 14, wherein the user device is at least one of a wireless phone, a wired phone, a modem, a computer, a personal digital assistant, a pager, a cell phone and a radio transmitter.

17. The apparatus of claim 14, wherein the identification number is at least one of a personal identification number, a subscriber identity module, an international mobile subscriber identity, an international mobile station equipment identity, a mixture of alphabetic and numeric digits and a hexadecimal number.

18. The apparatus of claim 14, wherein the service is at least one of a telephone connection, a simple messaging service message, a facsimile transmission, a data transmission, a purchase request for goods/services, a data download and a recharge request.

19. The apparatus of claim 14, wherein the service provider includes a plurality of businesses that each receives a portion of the cost of the service.

20. The apparatus of claim 14, wherein the sender also sends the amount charged to the service provider.

21. The apparatus of claim 14, further comprising:
a determiner that determines that the valid user account does not have a sufficient balance and that the valid user account has authorized a recharge mechanism; and
a recharger that recharges the valid user account using the recharge mechanism.

22. The apparatus of claim 21, further comprising:
the determiner also determining that the valid user account has authorized the recharge mechanism after a user intervention;
the sender also sending the user device in the roaming network a request for authorization to recharge; and
an authorizer that authorizes the recharge only if the user device replies correctly to the request for authorization to recharge.

23. The apparatus of claim 21, wherein the recharge is based on a user defined rule that specifies at least one of an account, an amount and a source of funds.

24. The apparatus of claim 23, wherein the user defined rule specifies a plurality of accounts, with a priority of recharge based on at least one of account, past recharges, account balance and time.

25. The apparatus of claim 21, wherein the recharger recharges from at least one of a bank account, an investment account, a credit account and a pre-authorized loan account.

26. The apparatus of claim 14, further comprising a storage device that stores a charged amount and the service provider identification number.

27. At least one non-transitory computer-readable medium encoded with a computer program that when executed controls at least one processor to perform a method of providing mobile commerce services via a plurality of networks, the method comprising:

receiving in a roaming network from a user device, an identification number and a request for a service;

forwarding from the roaming network, to a home network, the identification number, the request for the service, and adding a service provider identification number that relates to a service provider and a cost of the service;

verifying, by a convergent communication platform located on the home network, that the identification number relates to a valid user account, that the user device is authorized to receive the service and that the valid user account has sufficient value to pay for the service;

providing an authorization to the service provider, if the identification number relates to the valid user account, the user device is authorized to receive the service and the valid user account has sufficient value; and charging the valid user account for providing the service.

* * * * *